United States Patent
Lafruit et al.

(10) Patent No.: US 7,149,362 B2
(45) Date of Patent: Dec. 12, 2006

(54) 2D FIFO DEVICE AND METHOD FOR USE IN BLOCK BASED CODING APPLICATIONS

(75) Inventors: Gauthier Lafruit, St.-Lambrechts Woluwe (BE); Bart Masschelein, Lendelede (BE)

(73) Assignee: Interuniversitair Microelektronica Centrum (IMEC) vzw, Leuven (BE)

( * ) Notice: Subject to any disclaimer, the term of this patent is extended or adjusted under 35 U.S.C. 154(b) by 692 days.

(21) Appl. No.: 10/254,053

(22) Filed: Sep. 23, 2002

(65) Prior Publication Data

US 2003/0142873 A1    Jul. 31, 2003

Related U.S. Application Data

(60) Provisional application No. 60/324,302, filed on Sep. 21, 2001.

(51) Int. Cl.
G06K 9/36    (2006.01)
G06K 9/46    (2006.01)

(52) U.S. Cl. .................................................... 382/240
(58) Field of Classification Search ................. 382/240
See application file for complete search history.

(56) References Cited

U.S. PATENT DOCUMENTS

| | | | | |
|---|---|---|---|---|
| 5,067,023 | A * | 11/1991 | Kim ........................... | 382/166 |
| 6,640,015 | B1 * | 10/2003 | Lafruit et al. ................ | 382/260 |
| 6,681,051 | B1 * | 1/2004 | Hoppe et al. ................ | 382/240 |
| 6,834,123 | B1 * | 12/2004 | Acharya et al. ............. | 382/240 |
| 2003/0108247 | A1 * | 6/2003 | Acharya et al. ............. | 382/240 |

FOREIGN PATENT DOCUMENTS

EP    0 938 061 A    8/1999

OTHER PUBLICATIONS

Lafruit et al, "Reduction of the memory requirements for the VLSI implementation of the fast wavelet transform, using a space filling curve", Proceedings of the Third Int. conf. on Electronics, Circuits, and Systems, 1996, vol. 2, pp. 836-839.*

Lafruit et al, "An Efficient VLSI Architecture for 2-D Wavelet Image Coding with Novel Image Scan", IEEE Trans. on Very Large Scale Integration (VLSI) Systems, vol. 7, Issue 1, Mar. 1999 pp. 56-68.*

(Continued)

Primary Examiner—Joseph Mancuso
Assistant Examiner—Yuzhen Ge
(74) Attorney, Agent, or Firm—Knobbe Martens Olson & Bear LLP

(57) ABSTRACT

Coding, transcoding and iterative filtering methods and apparatus are described wherein a 2D FIFO is used to implement CACLA processing, and wherein the processing methods are block-oriented. A block-by-block processed input image or input coded image, which is delayed in an arbitrary number of lines and columns, is provided such that the output image is produced in a block-by-block schedule at a reduced or minimal memory access and memory size cost. A 2D FIFO which is memory-efficient in image block coding and decoding applications is described. The 2D FIFO has an associated scheduling mechanism for enabling delay of a block-by-block coded input signal, such as an image, in an arbitrary number of lines and columns, such that the output image is produced in a block-by-block schedule.

17 Claims, 37 Drawing Sheets

OTHER PUBLICATIONS

Chrysafis et al, "Line-based, reduced memory, wavelet image compression", IEEE Transactions on Image Processing vol. 9, Issue 3, Mar. 2000 pp. 378-389.*

Schelkens et al, "Implementation of an integer wavelet Transform on a Parallel TI TMS320C40 Platform", 1999 IEEE Workshop on Signal Processing Systems, Oct. 20-22, 1999 pp. 81-89.*

Andreopoulos, et al., "A Local Wavelet Transform implementation versus an optimal Row-Column algorithm for the 2D multilevel decomposition", IEEE, pp. 330-333, (2001).

Andreopoulos, et al., "A wavelet-tree image coding system with efficient memory utilization", IEEE, pp. 1709-1712.

Andreopoulos, et al., "Analysis of Wavelet Transform Implementations For Image and Texture Coding Applications in Programmable Platforms", IEEE, pp. 273-284, (2001).

Bao, et al., "Design of Wavelet-Based Image Codec in Memory-Constrained Environment," IEEE Transactions on Circuits and Systems for Video Technology, vol. 11, No. 5, pp. 642-650, (May 2001).

Chang, et al., "A high speed VLSI architecture of discrete wavelet transform for MPEG-4", IEEE Transactions On Consumer Electronics, vol. 43 No. 3, pp. 623-627, (Aug. 1997).

Chrysafis, et al., "Line-based, reduced memory, wavelet image compression", IEEE Transactions On Image Processing, vol. 9, No. 3, pp. 378-389, (Mar. 2000).

Knowles, "VLSI architecture for the discrete wavelet transform", Electronics-Letters, vol. 26, No. 15, pp. 1184-1185, (Jul. 19, 1990).

Lafruit, et al., "The Local Wavelet Transform: a memory-efficient, high-speed architecture optimized to a Region-Oriented Zero-Tree Coder", Integrated Computer-Aided Engineering vol. 7, No. 2, pp. 89-103, (Mar. 2000).

Lafruit, et al., "Optimal Memory Organization for scalable texture codecs in MPEG-4" IEEE trans. on Circuits & Systems for Video technology vol. 9, No. 2, pp. 218-243, (Mar. 1999).

Lian, et al., "Lifting based discrete wavelet transform architecture for JPEG2000", IEEE International symposium on Circuits and Systems, pp. 445-448, (2001).

Nibouche, et al., "Design and FPGA implementation of orthonormal discrete wavelet transforms", IEEE, pp. 312-315, (2000).

Nibouche, et al., "Design and FPGA implementation of biorthogonal discrete wavelet transforms", IEEE, pp. 103-106, (2001).

Nibouche, et al., "Rapid prototyping of orthonormal wavelet transforms on FPGA's", IEEE, pp. 577-580, (2001).

Omaki, et al., "Realtime wavelet video coder based on reduced memory accessing", IEEE, pp. 15-16, (2001).

Shapiro, "Embedded Image Coding using Zerotrees of Wavelet Coefficients," IEEE Transactions on Signal Processing, vol. 41, No. 12, pp. 3445-3462, (Dec. 1993).

Sheu, et al., "A VLSI architecture design with lower hardware cost and less memory for separable 2-D discrete wavelet transform", IEEE, pp. 457-460, (1998).

Simon, et al. "An ultra low-power adaptive wavelet video encoder with integrated memory", IEEE Journal of Solid-State Circuits, vol. 35 No. 4, pp. 572-582, (Apr. 2000).

Singh, et al., "A distributed memory and control architecture for 2-D discrete wavelet transform", IEEE, pp. 387-390 (1999).

Sweldens, "The Lifting Scheme: A New Philosophy in Biorthogonal Wavelet Constructions", Proceedings of the SPIE vol. 2569, pp. 68-79, (1995).

Taubman, "High Performance Scalable Image Compression with EBCOT", IEEE Transactions on Image Processing, vol. 9, No. 7, pp. 1158-1170, (Jul. 2000).

Vishwanath, et al., "VLSI Architectures for the Discrete Wavelet transform", IEEE Transactions on Circuits and Systems-II: Analog and Digital Signal Processing, vol. 42, No. 5, pp. 305-316, (May 1995).

Bao Y. et al. "Design Of Wavelet-Based Image Codec In Memory-Constrained Environment" Ieee Transactions On Circuits And Systems For Video Technology, IEEE Inc. New York, US, vol. 11, No. 5, May 2001, pp. 642-650, XPOO1096943 ISSN: 1051-8215.

Lafruit G. et al. "Optimal Memory Organization For Scalable Texture Codecs In MPEG-4" IEEE Transactions On Circuits And Systems For Video Technology, IEEE Inc. New York, US vol. 9, No. 2, Mar. 1999, pp. 218-242, XP000805528 ISSN: 1051-8215.

Masoudnia A. et al. "A FIFO-based architecture for high speed image compression" 8th IEEE International Conference on Electronics, Circuits and Systems, 2001, vol. 1, Sep. 2, 2001, pp. 221-224, XP010562975.

Nachtergaele L. et al. "Implementation of a scalable MPEG-4 wavelet-based visual texture compression system" Design Automation Conference, 1999. Proceedings. 36th New Orleans, LA, USA Jun. 21-25, 1999, Piscataway, NJ, USA,IEEE, US, Jun. 21, 1999, pp. 333-336, XP010344003 ISBN: 1-58113-092-9.

Schelkens P. et al. "Efficient implementation of embedded zero-tree wavelet encoding" Electronics, Circuits and Systems, 1999. Proceedings of ICECS '99. The 6th IEEE International Conference on PAFOS, Cyprus Sep. 5-8, 1999, Piscataway, NJ, USA,IEEE, US vol. 2, Sep. 5, 1999, pp. 1155-1158, XP010361619 ISBN: 0-7803-5682-9.

Shapiro J. M. "Embedded Image Coding Using Zerotrees Of Wavelet Coefficients" IEEE Transactions On Signal Processing, IEEE, Inc. New York, US, vol. 41, No. 12, Dec. 1, 1993, pp. 3445-3462, XP000426658 ISSN: 1053-587X.

* cited by examiner

Mallat numbering

In-place numbering

Mallat numbering

In-place numbering

- a -

- b -

- c -

- a -

- b -

- c -

Fig. 45
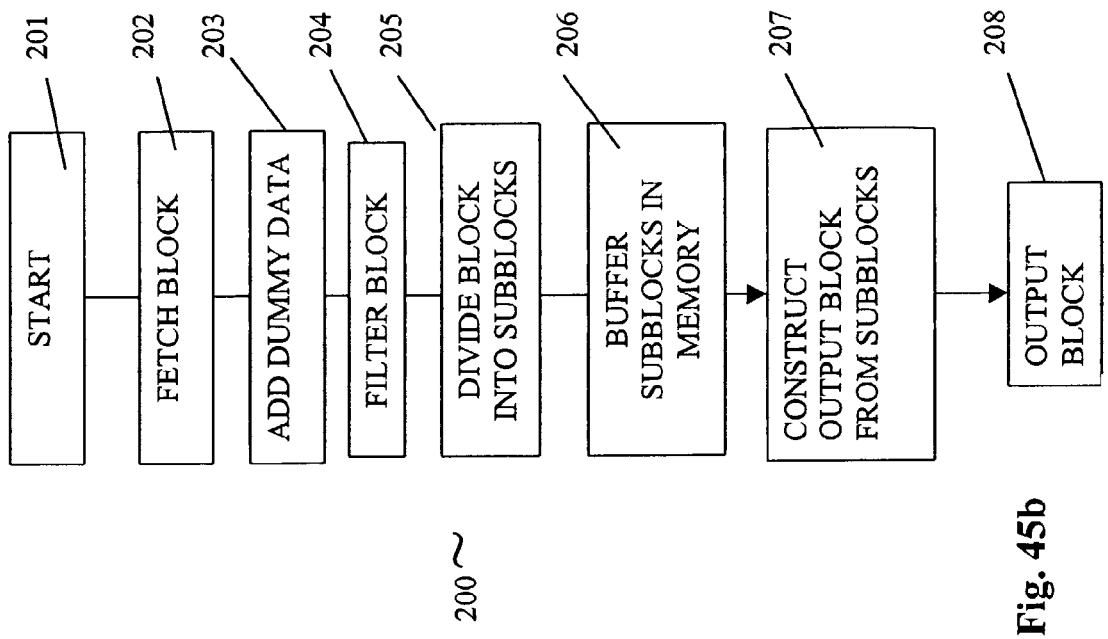
Fig. 45b
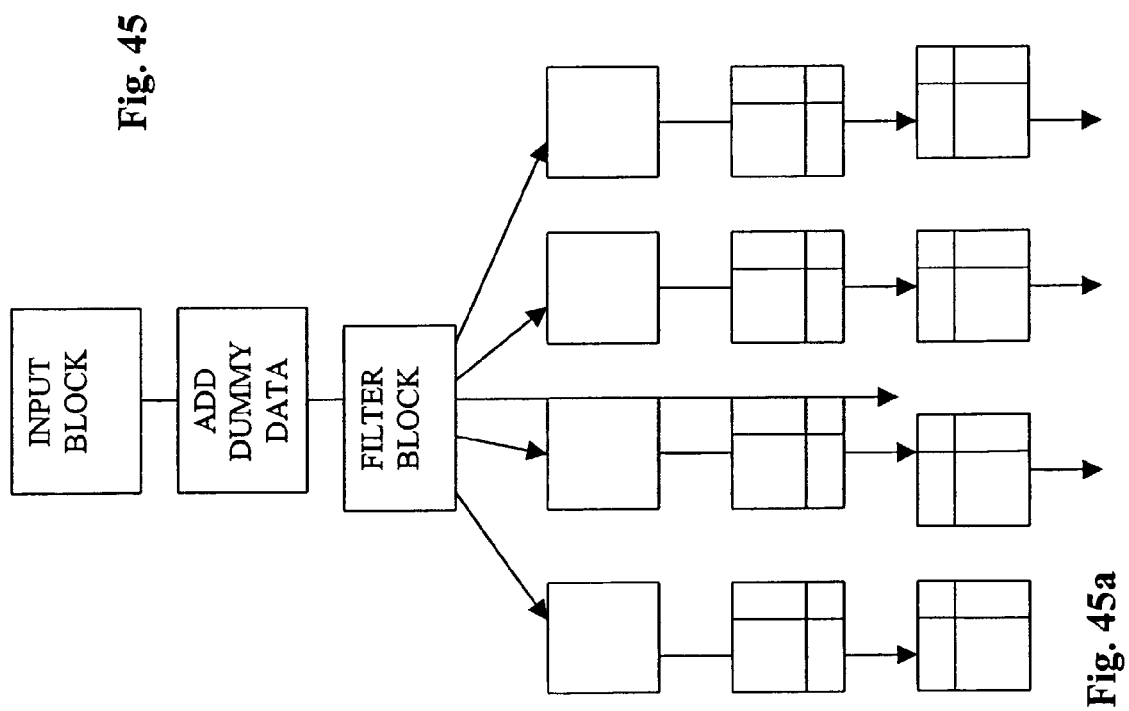
Fig. 45a

2D FIFO DEVICE AND METHOD FOR USE IN BLOCK BASED CODING APPLICATIONS

CROSS REFERENCE TO RELATED APPLICATION

This application claims priority, under 35 U.S.C. § 119(e), to U.S. Provisional Patent Application No. 60/324,302 entitled "A 2D DELAYING DEVICE AND METHOD AND USE THEREOF" and filed on Sep. 21, 2001. The disclosure of the above-described filed application is hereby incorporated by reference in its entirety.

BACKGROUND OF THE INVENTION

1. Field of the Invention

The present invention relates to a 2D FIFO memory device, apparatus, and method for processing blocks of data in block-based coding applications such as image coding. The present invention also relates to a memory controller for controlling the storage and access of data in block based coding applications.

2. Description of the Related Technology

Block or tile processing is a well accepted approach in image analysis and/or compression (e.g. morphological filtering, wavelet analysis), e.g. in JPEG, JPEG2000, MPEG-2, MPEG-4. Such algorithms involve a sequence of elementary tasks, the results of which are fused together to create the final outcome. Unfortunately, the intermediate results of these tasks are typically not available at the same time stamp and should therefore be temporarily stored in memory. Because of the very nature of these image processing tasks, it is often required to delay intermediate results for obtaining a coherent end result at a minimal implementation cost. Previous implementations use frame buffers between intermediate processing steps, but memory efficient implementations favor small delay lines for resynchronization and fusion of intermediate results. The straightforward implementation of FIFO (First-In, First-Out) buffers is often inappropriate, especially in two dimensional signal processing.

For an efficient transmission of image data over the Internet, Intranet, or Extranet, block-based compression techniques are typically used, i.e. JPEG, JPEG2000, MPEG-4 video and block-based wavelet coding and wavelet zero-tree coding (e.g. tiling in MPEG-4 VTC) and efficient implementations of wavelet transforms, with block-based processing schedules. With the advent of active networks, transcoding between different image formats will become useful. Note that in any such transcoding scheme, it is not mandatory that the image block sizes are integer multiples of each other in different compression formats (e.g. the block size in JPEG2000 can arbitrarily be chosen), nor is it guaranteed that equally sized blocks coincide with each other.

Optimized implementations of image applications often require the storage of data that has been created in a process, but that is not yet consumed in the next process of the pipeline. For simplicity, we refer to such a region as a Created Already Consume Later Area (CACLA). Additionally, image data is typically created/consumed in line-by-line or even band-by-band fashion (i.e. line-by-line of e.g. 8×8 blocks), starting from the top-left corner of the image. During the processing of the image, the CACLA is constantly moving around and a special memory management system is required for storing the corresponding data adequately.

FIG. 1 illustrates a simple transcoding example wherein input and output blocks do not coincide. The idea is to drop a portion of the image along the borders of the JPEG-coded (or similar coded) image, e.g. for discarding company specific labels, drop annoying image edge effects, etc. In the example of FIG. 1, the number of image rows and columns that is discarded (respectively 5 and 3) is not equal to a multiple of the DCT block size (8×8) of the original image grid (the white grid). Therefore, special actions should be taken to cluster the remaining fractions of blocks into new 8×8 output blocks, which will be DCT coded along a perfectly aligned 8×8 output image grid (the black grid). In low-latency applications, this block realignment should be performed without having to first fully decode the input image, followed by a realignment action and terminated by a transcoding to JPEG.

Low power applications will also benefit from lowering the input-output delay because of reduced memory requirements. For example, the MPEG-4 still texture coding tool (VTC) uses wavelet compression techniques, enabling essential scalable compression features of very large textures. As the MPEG-4 texture sizes can be as large as 64 k×64 k pixels, a memory efficient wavelet transform is advantageous for a low-cost/low-power implementation.

Many wavelet transform implementations have been described in literature. They can be classified in 3 major categories:

1. Implementations of a first category describe implementations of the wavelet transform without taking the memory requirements into account [7–12].
2. In a second category, a combined wavelet transform and wavelet coefficient compression engine are described. These implementations are either implementing a modified wavelet transform scheme in order to minimize the system memory requirements [13–14] or an ultra low-power, but fixed wavelet transform [15].
3. A third category focuses on low-memory implementation. They do not consider the extraction of MPEG-4 compliant parent-children tree. These systems will require the storage of the complete wavelet transformed image before the extraction of the trees can be started [16]. The line-based JPEG2000 wavelet transform implementations fit in this category [17].

SUMMARY OF CERTAIN INVENTIVE EMBODIMENTS

It is an object of the present invention to provide an apparatus and a method for processing blocks of data in block-based coding applications, such as image coding, wherein the memory size is reduced.

It is an object of the present invention to provide an apparatus and a method for processing blocks of data in block-based coding applications, such as image coding, wherein the number of memory accesses is reduced.

The present invention provides coding, transcoding and iterative filtering methods and apparatus using a concept of a 2D FIFO to implement a CACLA processing. The processing methods are block-oriented. The present invention provides, in one aspect, a block-by-block processed input image or input coded image which is delayed in an arbitrary number of lines and columns, in such a way that the output image is still produced in a block-by-block schedule, at a reduced or minimal memory access and memory size cost. The described technique can also be implemented using basic 2D data block copy operations, supported by the software development toolkits of recent media processors.

It is an aspect of the invention to present a 2D FIFO which is memory-efficient (hence at a minimal memory (access and size) cost) in image block coding and decoding applications. With a 2D FIFO is meant a device and associated scheduling mechanism used in said device for enabling delaying of a block-by-block coded input signal such as an image (e.g. a JPEG, JPEG2000, MPEG-4 or similar image) in an arbitrary number of lines and columns, in such a way that the output image is still produced in a block-by-block schedule.

It is an aspect of the invention to present the use of such a 2D FIFO tailored memory schedule mechanism for achieving the realignment process at reduced or minimal memory (access and size) cost. The process is functionally identical to delaying the rows and columns of the input image along a set of horizontal and vertical FIFOs, as shown in FIG. 2, except that the pixels remain clustered in blocks rather than lines. Hence it is referred to as a 2D FIFO with minimal memory cost.

The present invention provides a PC-based scalable image compression apparatus using the LWT processor implementation. The images are compressed in real-time from a camera capturing device and are decoded according to the resolution and quality requirements at the decoder side.

The present invention provides a CACLA memory management system for a wavelet-based decoder performed using a 2D delay line memory.

It is an aspect of the invention to present a low memory cost MPEG-4wavelet transform processor, more in particular the features of a hardware implementation of the Local Wavelet Transform (LWT) architecture [1][2] achieving close to the theoretical minimal memory size and memory access count. The invention presents a unique combination of a low-memory implementation combined with the flexibility of extended functionality. Due to the data dependencies introduced by the wavelet FIR filters, this functionality requires a non-trivial data storage and computation scheme as explained in [18–19]. Moreover it has been proven that the invented approach not only provides an efficient hardware implementation as well as an efficient software solution, but also outperforms different software schemes when run on general-purpose processors both in terms of data cache misses as well as execution time [20–22].

One aspect of the invention comprises a method of coding an input signal or decoding an input coded signal, wherein the input signal or the input coded signal is in the form of a plurality of blocks arranged in rows and columns, and wherein coding of the input signal or decoding of the input coded signal includes filtering each of the plurality of block to form an output block. The method comprises receiving the blocks from the input signal as a plurality of input blocks, filtering each input block to generate a plurality of filtered input blocks, splitting each of the filtered input blocks into a number of subblocks to form a plurality of subblocks, buffering at least some of the plurality of subblocks in a memory, and constructing an output block from a number of selected subblocks, wherein the number of selected subblocks is the same number as the number of subblocks into which one of the filtered input blocks is split.

Another aspect of the invention comprises a coder configured to code an input signal or decode an input coded signal, wherein the input signal or the input coded signal is in the form of a plurality of blocks, wherein coding of the input signal or decoding of the input coded signal includes performing a transform on each of the blocks to form an output block. The coder comprises means for receiving the plurality of blocks from the input signal as input blocks, a filter configured to filter each input block so as to provide a filtered input block, means for splitting each filtered input block into a number of subblocks to form a plurality of subblocks, a memory configured to buffer at least some of the plurality of subblocks in a memory, and means for constructing an output block from a number of selected subblocks, wherein the number of selected subblocks is the same number as the number of subblocks into which one of the filtered input blocks is split.

BRIEF DESCRIPTION OF THE DRAWINGS

FIG. 14($b$) is an illustration of one embodiment of a mapping process of input subblocks to memory locations (and output subblocks), for SE subblocks.

FIG. 14($c$) is an illustration of one embodiment of a mapping process of input subblocks to memory locations (and output subblocks), for NW subblocks.

FIG. 14($d$) is an illustration of one embodiment of a mapping process of input subblocks to memory locations (and output subblocks), for SW input subblocks.

FIG. 45 is a flow diagram of one embodiment of a method of processing initial blocks of an image.

DETAILED DESCRIPTION OF CERTAIN INVENTIVE EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

The present invention will be described with reference to certain embodiments and drawings, however, these are examples only and a person skilled in the technology will appreciate that the present invention has wide application. In particular, the embodiments of the invention will be described with reference to the LWT, but the invention is not limited thereto. The invention may find advantageous use in other filtering methods including morphological processing of images. The invention can be particularly useful with windowed (sometimes called mask) block-based digital filtering processes wherein the window (or mask) is larger than the block in the process. The invention may also be particularly useful in multilevel iterative mask processes of which LWT is only one example.

Figure 3:
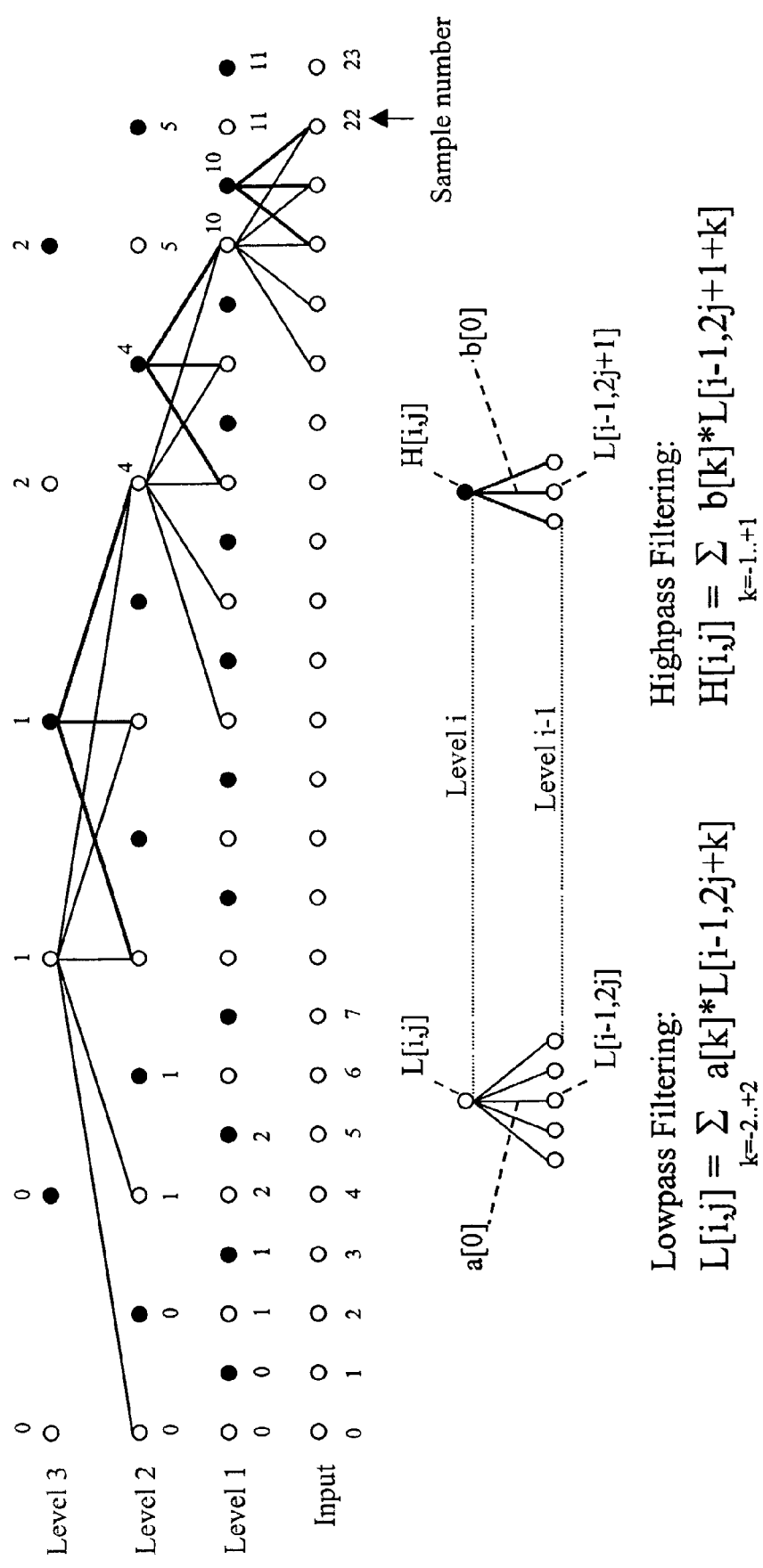
FIG. 3 illustrates successive 5-tap Lowpass (a[k]) and 3-tap Highpass (b[k]) filtering operations in a one dimensional 5/3-tap Wavelet Transform.

To create a Wavelet Transform, the input signal is successively Lowpass and Highpass filtered, according to the process illustrated in FIG. 3, creating a pyramid of signal levels. FIG. 3 shows successive 5-tap Lowpass (a[k]) and 3-tap Highpass (b[k]) filtering operations in a one dimensional 5/3-tap Wavelet Transform. The Lowpass L[i,j] and Highpass H[i,j] results are interleaved, according to the in-place data organization. The data dependencies imposed by these filtering processes have a counter effect wherein the creation of any level is always delayed, in comparison to its preceding level, on which each filtering process relies. In particular, samples that coincide topologically are always created at different time stamps. Unfortunately, specialized tasks (e.g. zero-tree coding [23]), require these samples to be available at rigorously the same time stamp. However, according to one embodiment of the invention, this can be made possible—at minimal memory cost—by implementing delay lines with appropriate time delays as illustrated in FIG. 4a.

Figure 4A:
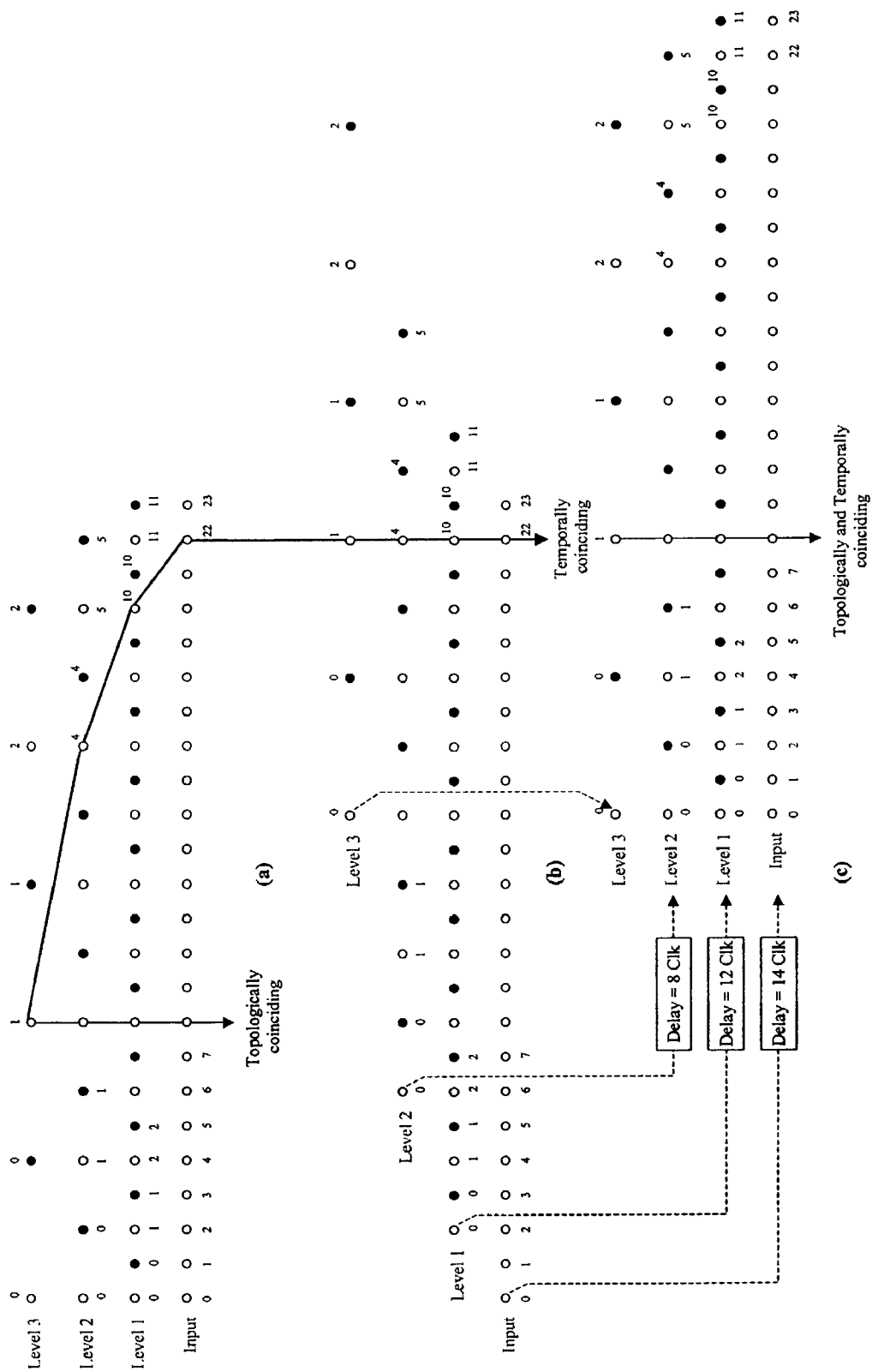
FIG. 4a is a topological illustration of delay lines wherein coinciding samples (a) are created at different time stamps (b).
Figure 4B:
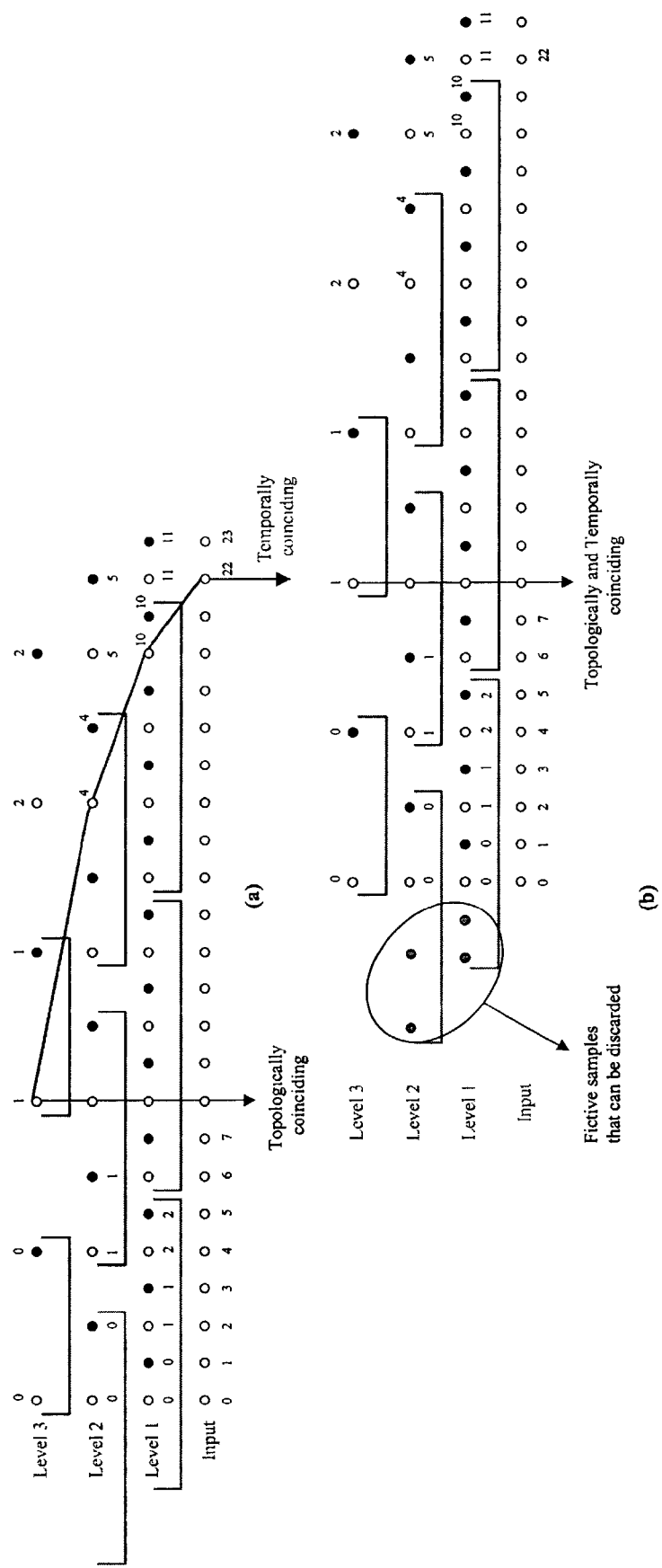
FIG. 4b is an exemplary illustration of block filtering techniques wherein the subdivision of the data is in blocks of 2Highest_Level-i Lowpass and Highpass samples in level i.

FIG. 4a illustrates the creation of topologically coinciding samples (a) at different time stamps (b) due to the data dependencies imposed by the filtering process. Delay lines (c) can readjust topologically coinciding samples to appear at the same time stamp. In [1, 2], this approach is extended to compensate for the filtering delays in both the horizontal and vertical filtering directions of a 2D Wavelet Transformed image. One aspect of the invention is a two dimensional delay line which is a building block for an efficient implementation of the Wavelet Transform, or similar single level or multilevel iterative mask processes, using a block-oriented processing. For example, block filtering techniques are used in [1, 2, 24] for minimizing the memory size and memory access cost. For reasons of implementation efficiency, explained in [1], blocks are temporally aligned with respect to the highest level samples as illustrated in FIG. 4b. FIG. 4b illustrates block filtering techniques requiring the subdivision of the data in blocks of 2Highest_Level-i Lowpass and Highpass samples in level i. The block boundaries are temporally aligned with respect to the highest level (a), creating blocks with irrelevant (fictive) samples (b). Consequently, the first block of each level contains some irrelevant (zero) data, that should be discarded.

Figure 1:
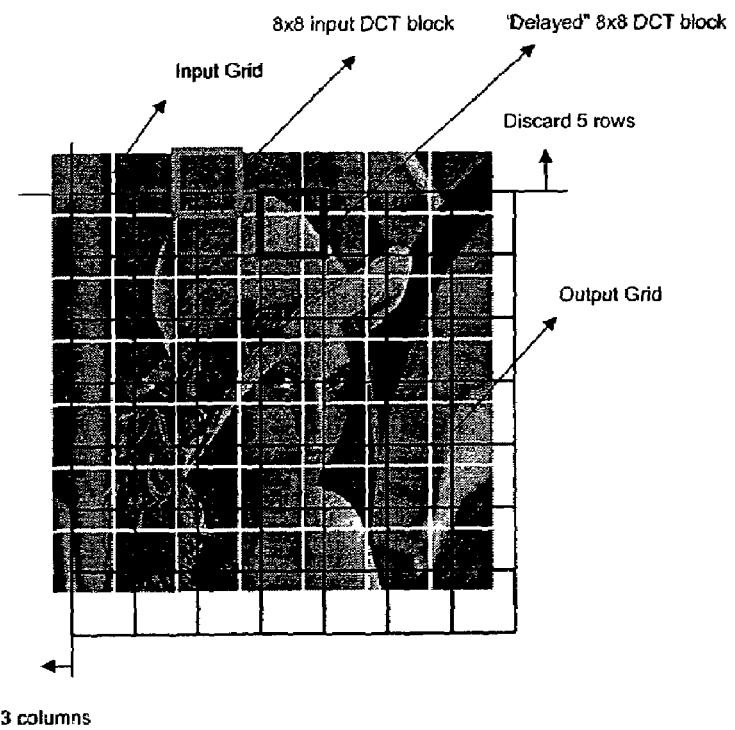
FIG. 1 is an exemplary illustration of an Input and Output grid of a transcoding scheme.

Certain embodiments of the invention provide for the full process of block-based 2D filtering and zero-tree coding realignment, a block-based 2D delay line, in which the left and top border data blocks should be partially discarded, in a similar fashion as illustrated in FIG. 1. In accordance with embodiments of the invention, the optimized implementation of the 2D Wavelet Transform in [1,2] is based on a 2D delay line approach. These embodiments can be implemented both in hardware and software (running on a suitable processing engine), and in combinations of these two.

Figure 5:
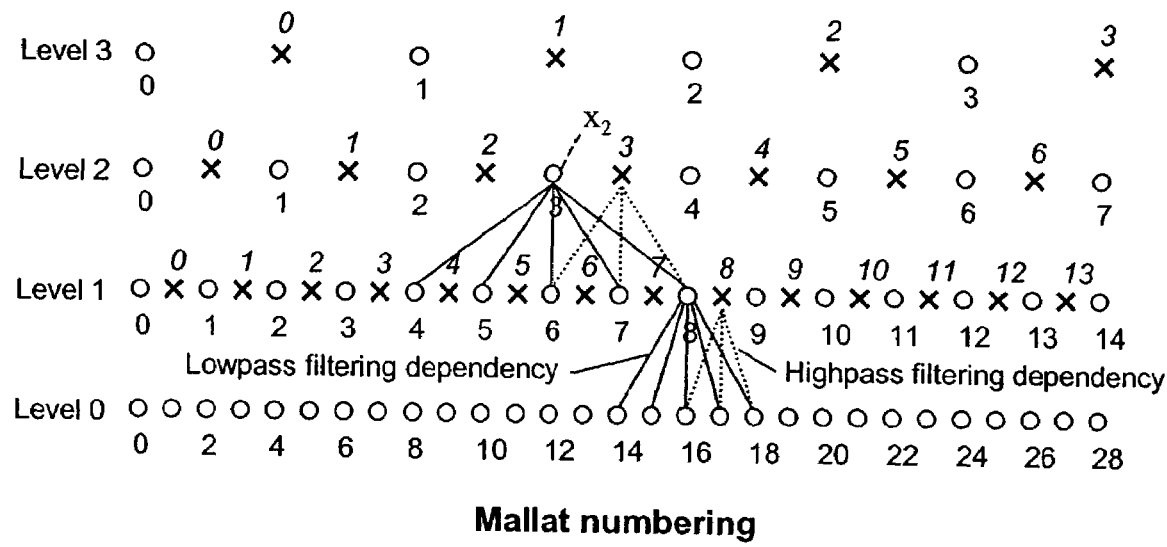
FIG. 5 is an illustration of one embodiment of a numbering system for describing the WT.
Figure 5:
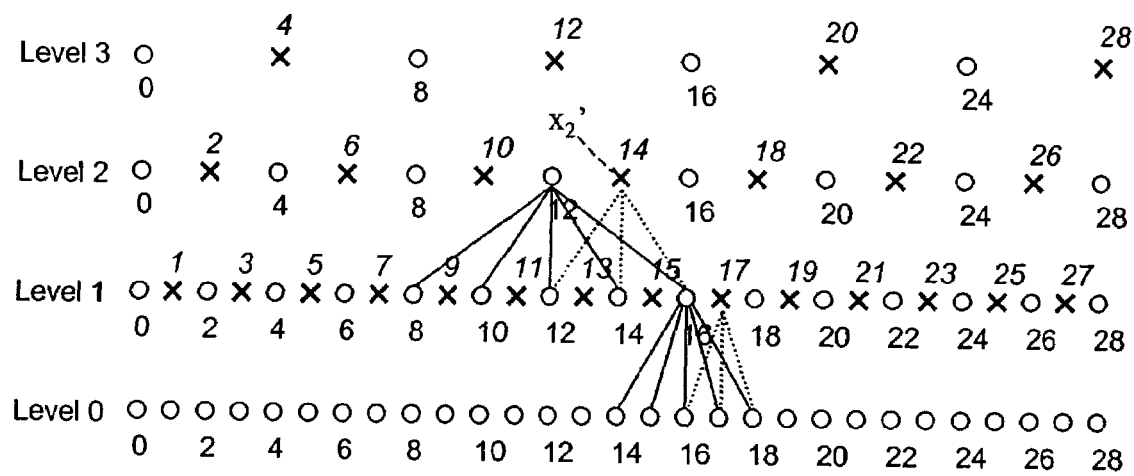

FIG. 5 shows the construction of the Wavelet Transform by successively calculating Lowpass and Highpass filterings throughout the different wavelet levels.

As shown in FIG. 5, two different sample numberings can be followed in the Wavelet Transform (WT): the Mallat numbering giving successive numbers for the Lowpass and the Highpass samples separately in each level, and the in-place numbering that does not make any distinction between the Lowpass and the Highpass values throughout the levels. The Mallat numbering will be represented by using the notation $x_i$ in level i, while the notation $x_i'$ refers to the in-place numbering system.

In order to calculate sample $x_i$ (Lowpass or Highpass) in level i (i=1, 2, 3, . . . ) in the Mallat numbering system, Lowpass samples up to sample $x_{i-1}$ are required in level i−1:

$$x_i = \left\lfloor \frac{x_{i-1} - M}{2} \right\rfloor \quad (1)$$

wherein M gives a data dependency displacement to the left, the denominator "2" corresponds to the downsampling effect and $\lfloor x \rfloor$ accounts for the effect of misalignment, e.g. sample 8 in level 1 can create up to sample 3 in level 2, but an additional sample in level 1 (sample 9) does not necessarily create an additional sample in level 2.

In the in-place numbering, the last Highpass sample that can be created has number $x_1'$, with:

$$x_1' = 2^i \cdot x_1 + 2^{i-1} \quad (2)$$

The cumulative effect of Equation (1), i.e. finding e.g. $x_3$ directly from $x_0$ without an iterative calculation, is expressed by the following equations:

$$x_i = \left\lfloor \frac{x_0 - M \cdot (2^i - 1)}{2^i} \right\rfloor \quad (3)$$

wherein the denominator is the cumulative downsampling factor over all levels, while the second term in the numerator comes from the cumulative displacement M to the left, accompanied by an up-sampling operation:

$$\sum_{j=0}^{i-1} M \cdot 2^j = M \cdot (2^i - 1) \quad (4)$$

Equation (3) determines up to which Lowpass/Highpass couple the WT can be calculated, given that the input has been read up to sample $x_0$. Equation (2) then gives the possibility to determine the last calculated Highpass sample in the in-place numbering system.

Figure 6:
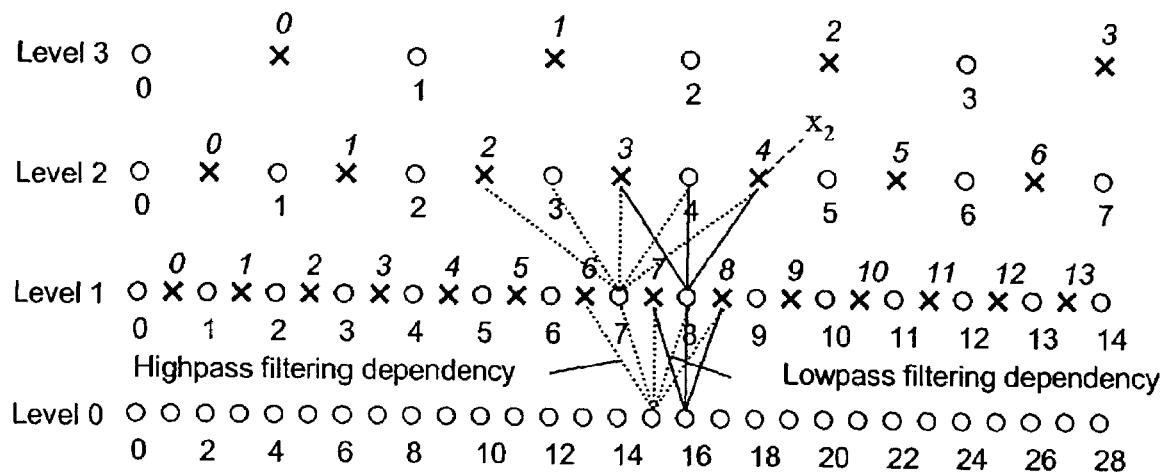
FIG. 6 is an illustration of one embodiment of filtering operations in IWT
Figure 6:
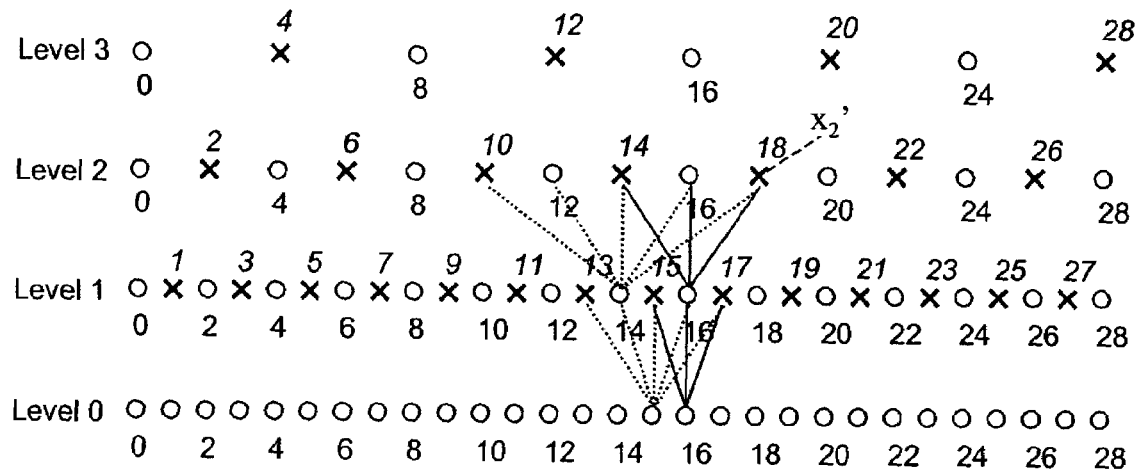

The Inverse WT (IWT) creates Lowpass values from Lowpass and Highpass samples. The filtering rules involve zero-insertion, followed by up-sampling operations. It is possible to hide the zero-insertion intelligently by redefining the filtering taps. In fact, the filtering dependency ranges between Lowpass to Lowpass and Highpass to Lowpass filterings are switched compared to the forward WT, as shown in FIG. 6. This implies that the right-most filter for setting up the data dependencies is the Lowpass to Lowpass filter, not the Highpass to Lowpass one, as would be expected from FIG. 5. Also, the Lowpass and Highpass samples are interleaved in this representation, thereby justifying that the in-place numbering system is used. Finally, it can be noted that the Lowpass samples are calculated, while the Highpass values are basically made available by the decoded bitstream. Also the Lowpass samples in the highest level are provided by the external bitstream.

Figure 7:
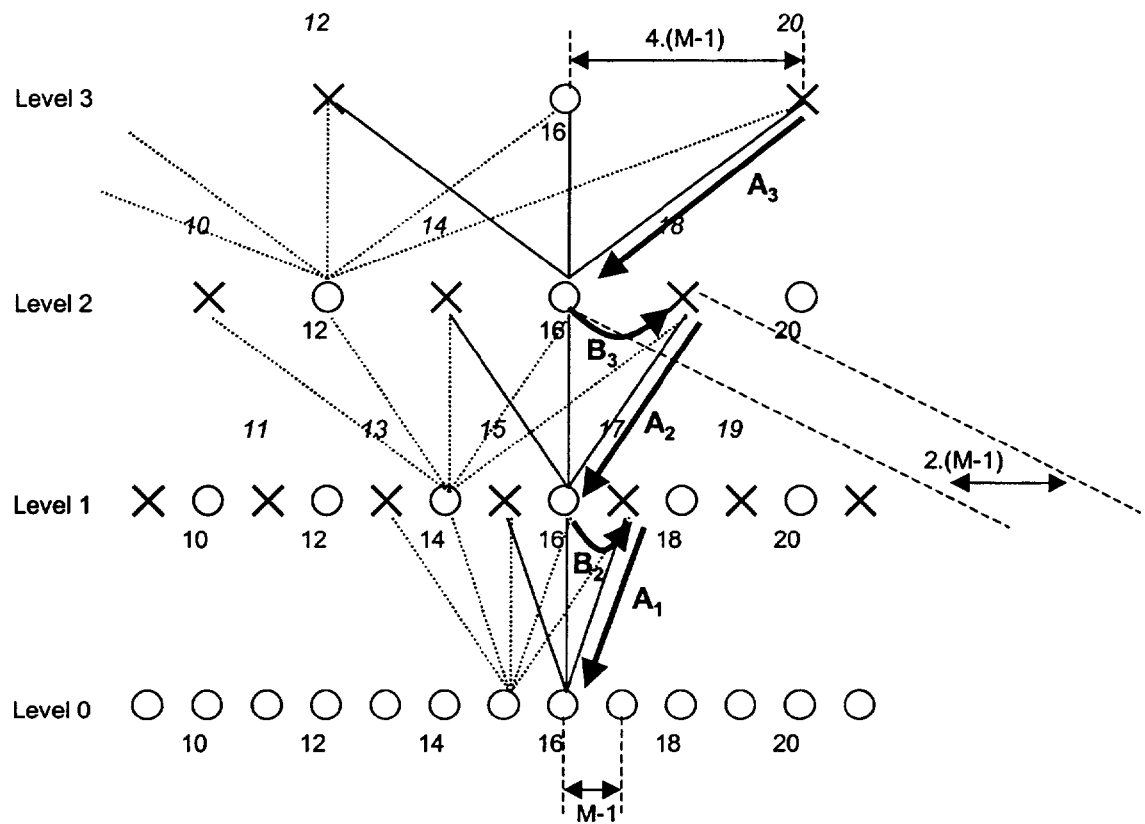
FIG. 7 is an illustration of data dependencies in IWT for a 5/3 wavelet analysis filter pair (M even).
Figure 8:
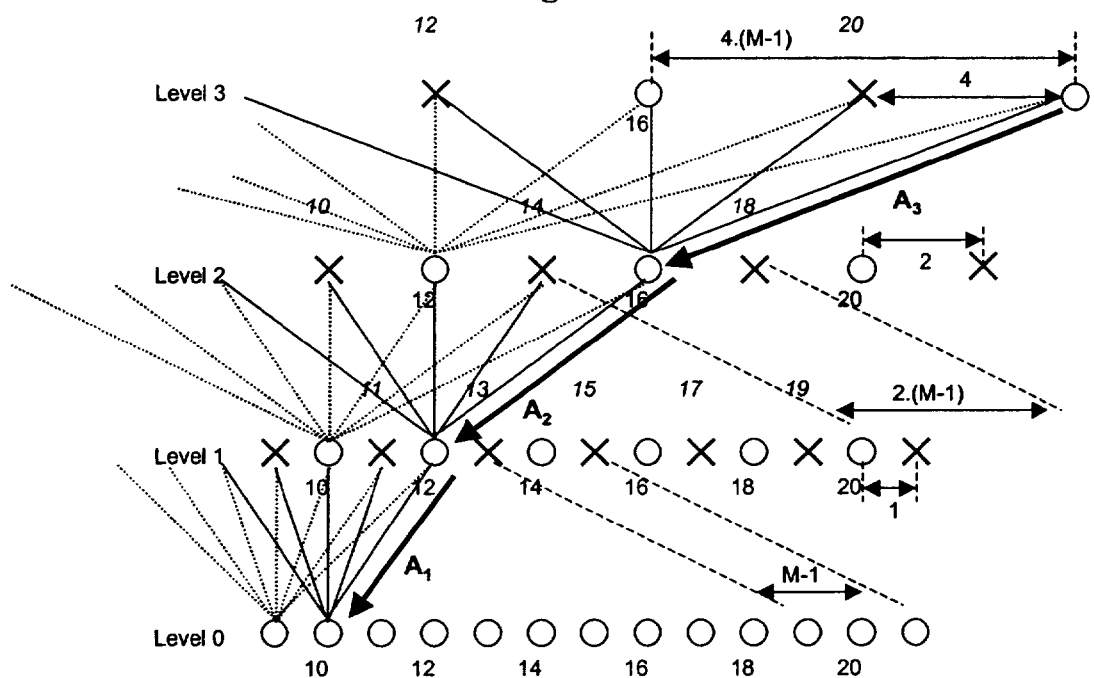
FIG. 8 is an illustration of data dependencies in IWT for a 7/5 wavelet analysis filter pair (M odd).

FIG. 7 and FIG. 8 show a zoomed-in version of the data dependencies for the IWT with respectively a 5/3-tap and a 7/5-tap wavelet filter pair. When starting the IWT at level i (level 3 in FIG. 7) and stopping at level j (level 0 in FIG. 7), the process jumps successively through arrows $A_i$ and $B_i$ from one level to the next lower level. A, corresponds to the displacement induced by the filter length (M−1) (it is the Lowpass to Lowpass filter, which is in the best case one tap smaller than the Highpass to Lowpass filter), while $B_i$ corresponds to a displacement in order to point to the next Highpass sample. It is notable that in the highest wavelet level, all samples are considered to be known, so that the rightmost sample to consider in the data dependencies can either be a Lowpass or a Highpass sample. Also of note is that $B_i$ is not required in the lowest level, since one is always interested in the final reconstructed Lowpass values.

It should also be noted that the $B_i$ jumps in FIG. 8 are advantageously not required since the Lowpass to Lowpass filters are directly aligned and in the right-most position with $B_i = 0$. In general, when M is odd, the $B_i$ coefficients are not required. Thus, if the following is defined:

$$\delta(x) = \begin{cases} 0 & x \text{ odd} \\ 1 & x \text{ even} \end{cases} \quad (5)$$

then from FIG. 7 the following relations cab be obtained:

$$A_i = 2^{i-1} \cdot (M-1) \quad (6)$$

$$B_i = \delta(M) \cdot 2^{i-2} \quad (7)$$

Thus, when sample $x_i'$ is known in level i, all samples up to $x_j'$ can be calculated in level j, with the following equation:

$$x_j' = x_i' - \sum_{k=j+1}^{i} A_k + \delta(M) \cdot \sum_{k=j+2}^{i} B_k \quad (8)$$
$$= x_i' - (M-1) \cdot (2^i - 2^j) + \delta(M) \cdot (2^{i-1} - 2^j)$$

Equation (8) can advantageously be found to always be valid: the rightmost filter taps to consider belong always to the Lowpass filter and therefore always point to a Lowpass sample, from which a jump through an arrow $B_i$ has to be done to start the next filter. Moving the filter taps of FIG. 8 to the left or right, in order to start with a Highpass sample in the highest level, does not change anything in the inter-level dependencies.

Figure 9:
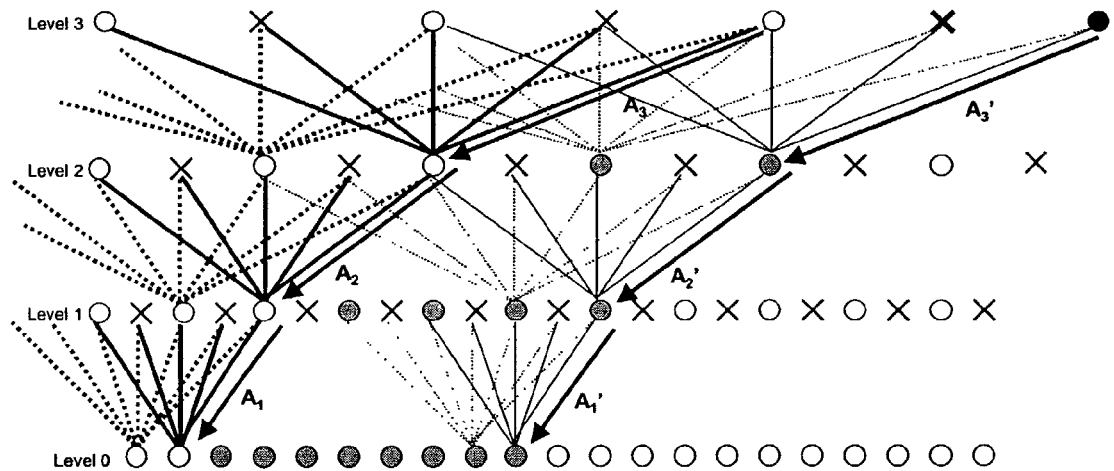
FIG. 9 is an illustration of IWT data dependencies wherein M is odd.

Also, in contrast to Equations (2) and (3), there is no rounding operation involved due to the use of the in-place numbering system. In the forward WT, this is not possible because each additional input sample does not necessarily create additional Lowpass/Highpass couples throughout all levels. This phenomenon is reflected by the rounding operation. In the IWT, each additional sample (in fact two additional samples: a Lowpass and a Highpass) in the highest level automatically creates a multitude of additional samples throughout all levels, as suggested by the shaded dots in FIG. 9.

Figure 10:
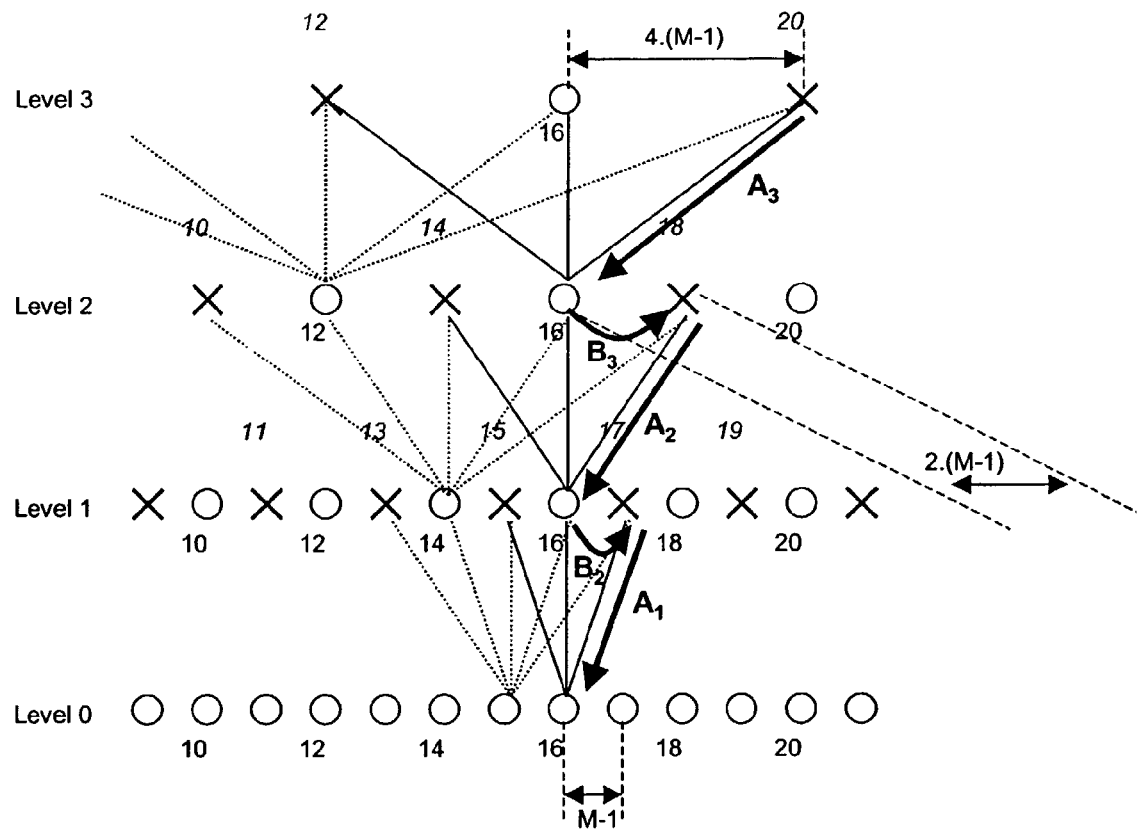
FIG. 10 is an illustration of IWT data dependencies wherein M is even.

Equations (2), (3) and (8) can be combined to determine the minimal delay which occurs when performing a forward and backward wavelet filtering operation. In these calculations, a new input sample can create new samples throughout all levels of the WT, i.e. there is a perfect alignment that has the effect of discarding the rounding operation in Equation (3). Combining Equations (2) and (3) in the in-place numbering system, the following equation can be obtained:

$$x_i' = x_0' - M \cdot (2^i - 1) + 2^{i-1} \quad (9)$$

wherein the last term refers to an additional displacement for pointing to the created Highpass value. This is the starting point for calculating the IWT with M even, as in the example of FIG. 10. In the situation of FIG. 8, where M is odd, the starting point is rather the last created Lowpass sample in the highest level. For this situation, the last term of Equation (9) should be removed. Therefore, the general formulae are:

$$x_1' = x_0' - M \cdot (2^i - 1) + \delta(M) \cdot 2^{i-1} \quad (10)$$

Element $x_1'$ of Equation (10) can now be used as the starting point for Equation (8), yielding:

$$x_{j,WT+IWT}' = x_{0,input}' - M \cdot (2^i - 1) + \delta(M) \cdot 2^i - (M-1) \cdot (2^i - 2^j) - 2^j \quad (12)$$

Taking the particular case of even tap wavelet analysis filters (e.g. 5/3 and 9/7 filters), the following can be obtained ($\delta(M)=1$):

$$x_{j,WT+IWT}' = x_{0,input}' - 2^{i+1}(M-1) + 2^j(M-2) + M \quad (13)$$

If additionally, the image is reconstructed at the highest resolution (j=0), the following can be obtained:

$$x_{0,WT+IWT}' = x_{0,input}' - 2 \cdot (M-1) \cdot (2^i - 1) \quad (14)$$

The worst-case delay can therefore be given by:

$$\text{Delay} = 2 \cdot (M-1) \cdot (2^i - 1) \quad (15)$$

Figure 11:
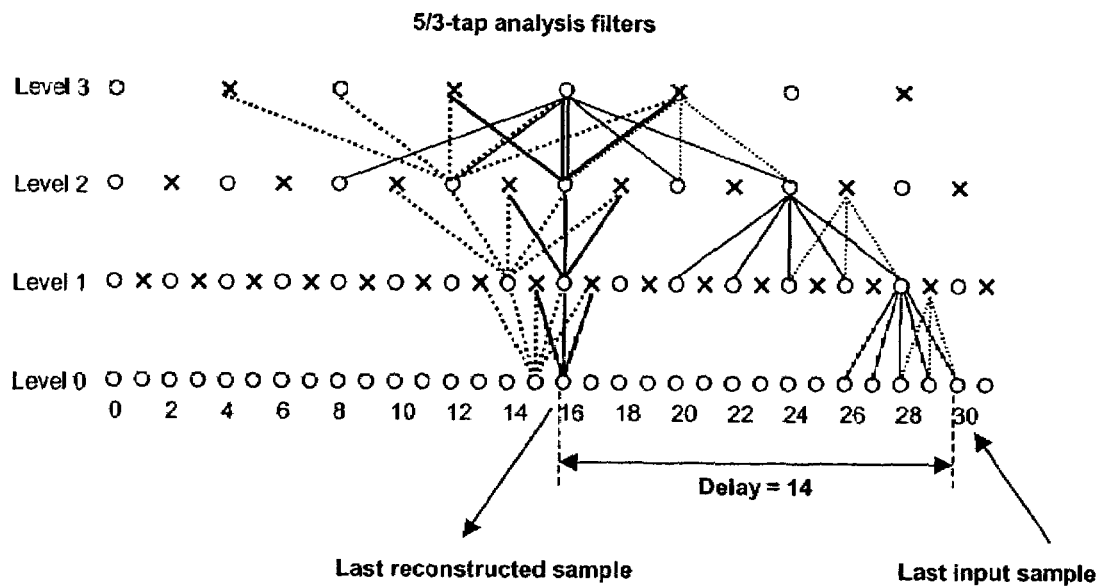
FIG. 11 is an illustration of the calculation delay in the WT-IWT.

An example is illustrated in FIG. 11 for the 5/3-tap wavelet analysis filter pair. A large asymmetry can be observed between the forward and inverse wavelet transform data dependencies.

Figure 12:
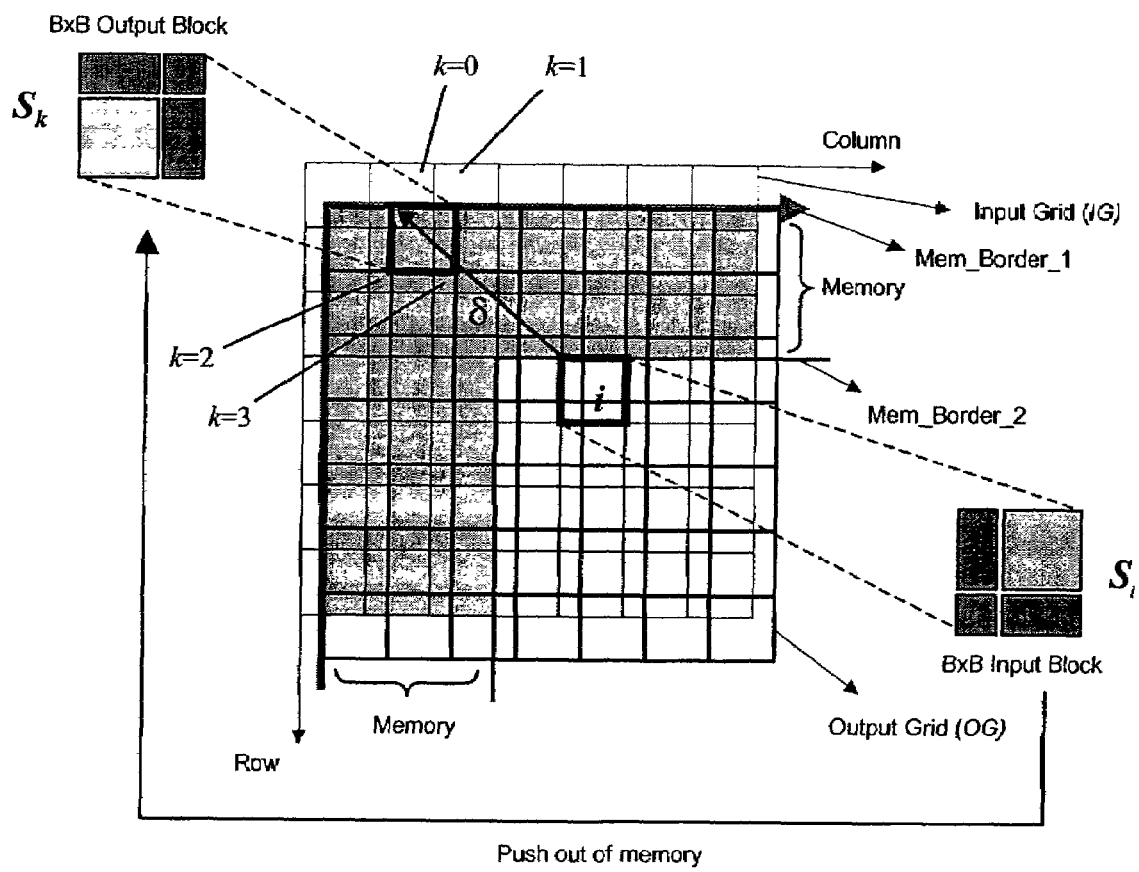
FIG. 12 is an illustration of one embodiment of a method of formation of subblocks Si from an input block i in order to replace the memory locations Sk from previously stored input blocks k.

One embodiment of the invention includes a 2D Block Delay Line (2D-BDL) with which a realignment process between the input and output grid can be established, as shown in FIG. 12. The realignment process generally comprises, firstly, cutting each input block i, which is naturally aligned along the input grid IG, into a number of suitably sized sub-blocks. These sub-blocks are selected to achieve the realignment process mentioned above. For example each input block is cut into four constituent subblocks $S_i$ by the grid lines of the output grid OG. These subblocks $S_i$ are stored into a 2D-BDL memory and replace some previously stored subblocks $S_k$, emanating from four different previously read input blocks k (k=0..3).

Figure 2:
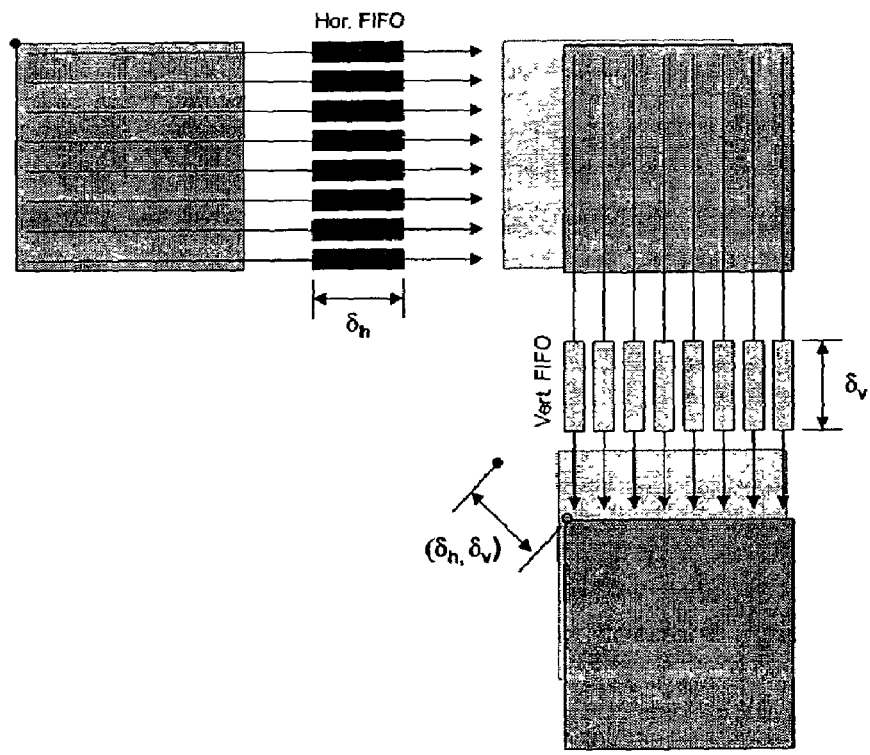
FIG. 2 is an exemplary illustration of a 2D delay line.

The memory replacement mechanism is configured such that the subblocks $S_k$, pushed out of the memory by the subblocks $S_i$, automatically create a delayed output block, aligned along the output grid OG. Each pixel from the output block is read once from memory, while each pixel of the associated input block is written once to memory, at the corresponding memory locations. Consequently, the 2D-BDL schedule only requires one write operation per input pixel and one read operation per output pixel. This is far less than the number of read/write operations that are involved in the successive FIFO transfers of FIG. 2, i.e. $\delta_h$ and $\delta_v$ reads and the same amount of writes per input/output pixel for respectively the horizontal and vertical FIFOs. The gain factor in the number of memory accesses with the 2D-BDL approach of the present invention, compared to the structure of FIG. 2 is therefore equal to $\delta_h + \delta_v$, demonstrating its superiority. Even if the FIFOs of FIG. 2 were to be implemented with cyclic pointers, it would require 2 read and 2 write operations per pixel: one read and one write for each direction. The 2D-BDL approach is then still a factor 2 more efficient in number of memory accesses. Moreover, 2D-BDL is more appropriate when 2D block data copy instructions are available (e.g. video and 2D graphics libraries for TriMedia, TMS320C6xx). For 2D-BDL each B×B input block, four addresses are calculated in a very particular way, but this is a negligible overhead for the classical left-to-right/top-to-bottom image traversal.

Figure 13:
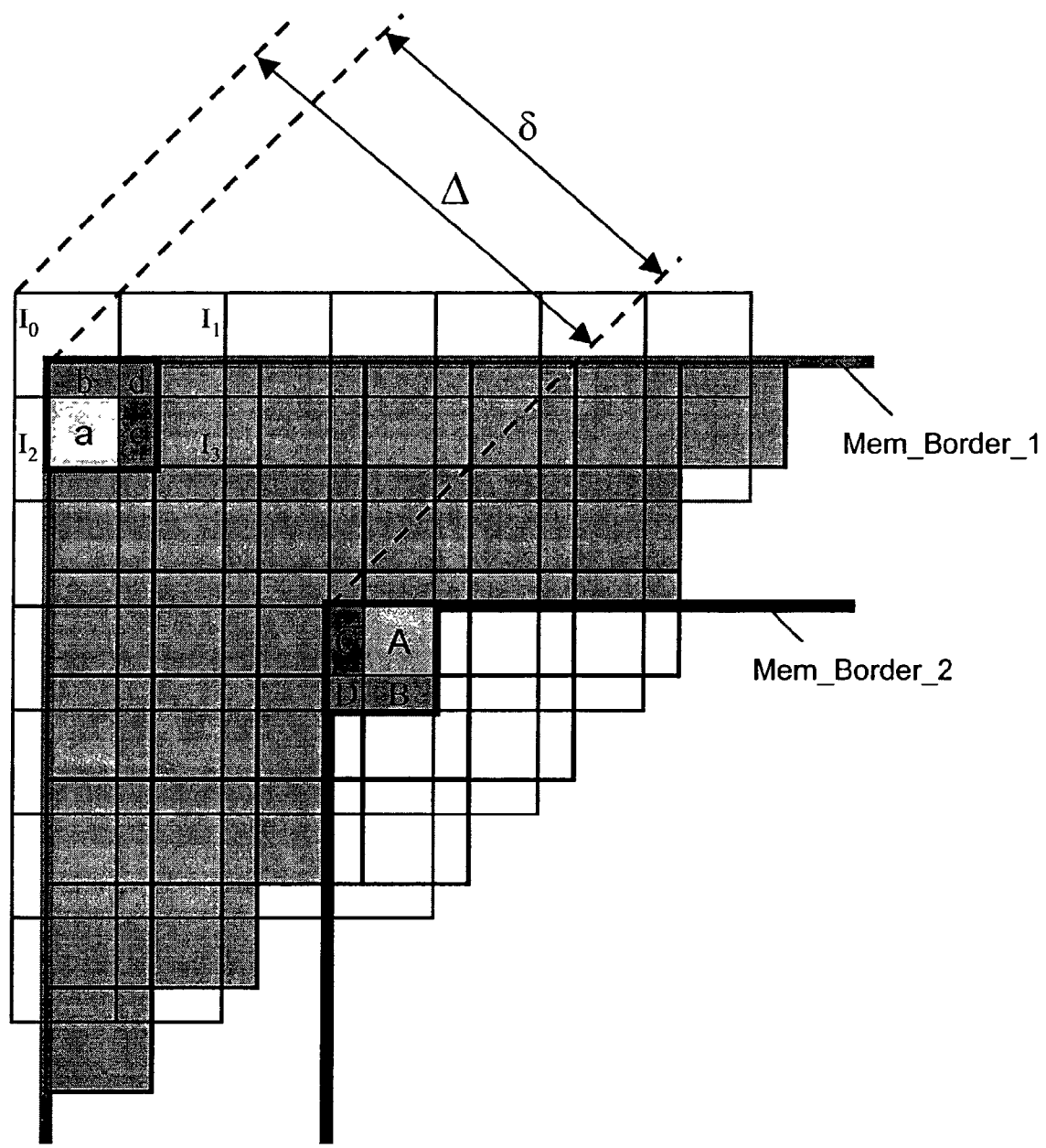
FIG. 13 is an illustration of the Delay Vector δ between the input block (A, B, C, D) and output block (a, b, c, d), aligned respectively along the interleaving grids IG and OG according to one embodiment of the invention.

For each input block, a 2D Block Delay Line effect is obtained by outputting a block of pixels, which is delayed or rather shifted, i.e. positioned $\delta_v$ rows and $\delta_h$ columns from the current input block. Meanwhile, the current input block is momentarily stored into memory, waiting to be recalled $\delta_v$ rows and $\delta_h$ columns later. FIG. 13 shows the Delay Vector $\delta$ between the input block (A, B, C, D) and output block (a, b, c, d), aligned respectively along the interleaving grids IG and OG in accordance with an embodiment of the present invention. As shown in FIG. 13, the obtained two-dimensional delay is represented by a 2D Delay Vector (DV) $\delta = (\delta_v \text{ rows}, \delta_h \text{ columns})$, pointing from the current input block (A, B, C, D) to the output block (a, b, c, d), read from memory. The buffer zone, delimited by the right-rotated L-shaped borders Mem_Border_1 and Mem_Border_2, in FIG. 13 having their corners at the endpoints of the 2D Delay Vector, is used to store delayed pixel values. The shaded region of FIG. 13 defined by the memory borders therefore represents the extent of the 2D Delay Line Memory (2D-DLM).

Since the length of $\delta$ does not necessarily correspond to a multiple of the block size, the output block is made of subblocks (a, b, c, d) originating from four adjacent image blocks ($I_0, I_1, I_2, I_3$). Thus, while the input block having subblocks A, B, C, D is aligned along the input grid IG of FIG. 13, the corresponding output block (a, b, c, d) is aligned along the output grid OG, interleaving IG. Blocks aligned along one grid are thus cut in quarters by the other grid, thus defining the 4 subblocks A, B, C and D of the input blocks and a, b, c, d of the output blocks. Thus, whereas the number of blocks in the delay vector is non-integral, the number of subblocks is integral.

Figure 14:
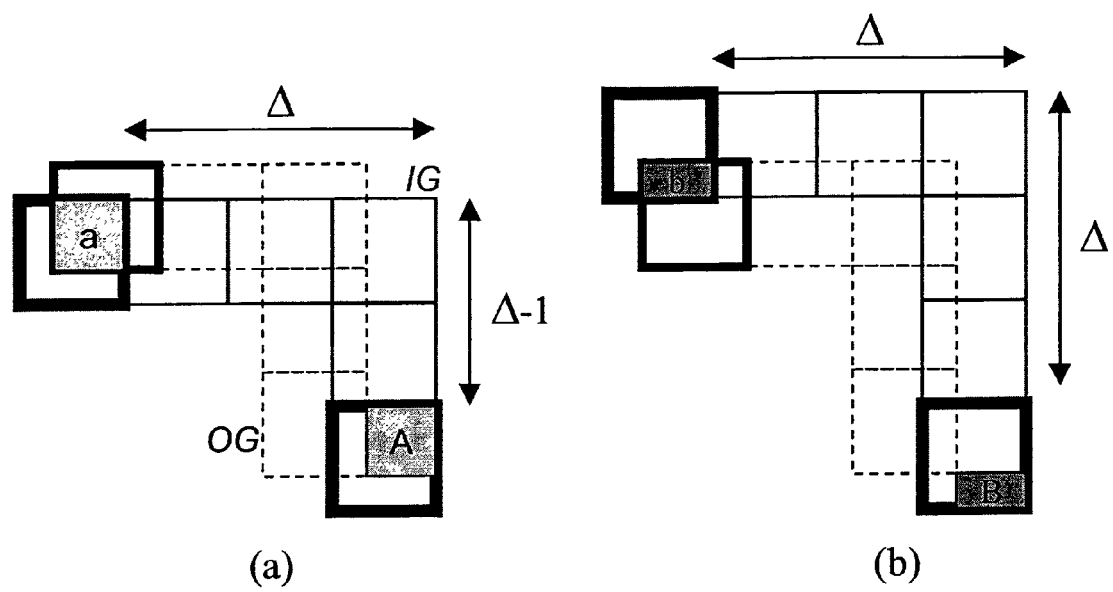
FIG. 14($a$) is an illustration of one embodiment of a mapping process of input subblocks to memory locations (and output subblocks), for NE subblocks.
Figure 14:
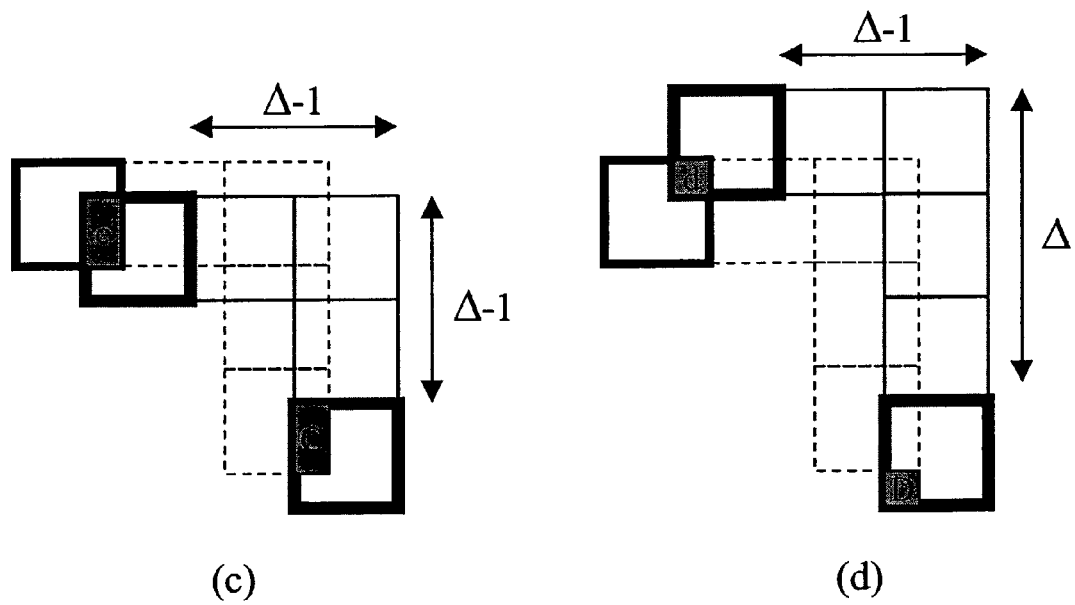

For each new input block, an output block is created by successively outputting the subblocks a, b, c, and d from memory, and replacing them respectively by input subblocks A, B, C, and D, having matching sizes and therefore perfectly fitting in memory. The subblocks cut from one block may have different sizes. In the following, each type of A, B, C, D subblock will be referred to as A-type, B-type, etc. Referring to FIG. 13, the relative position of the subblocks in the input and output blocks is different, and therefore specialized address calculations are used to locate the blocks in the correct position from the address information alone. Thus, one embodiment of the invention includes a memory controller configured to control reading and writing of subblocks. To avoid confusion, all address calculations are referred to only one grid, i.e. the input grid IG. Therefore, output subblocks are not referred to the output grid OG, but rather to the corresponding, underlying input block Ii, aligned along the input grid IG. With $\Delta$ equal to the up-rounded, integer number of blocks separating the left-top corner of the input and output blocks (i.e. $\Delta$=ceil($\delta$/B)), FIG. 14 shows the criteria used for pointing to the correct subblocks in memory for each new input block. The criteria are expressed with the input grid IG as reference, but the output grid OG is drawn in dashed lines for clarity. The rules are further summarized in Table 1.

Figure 15:
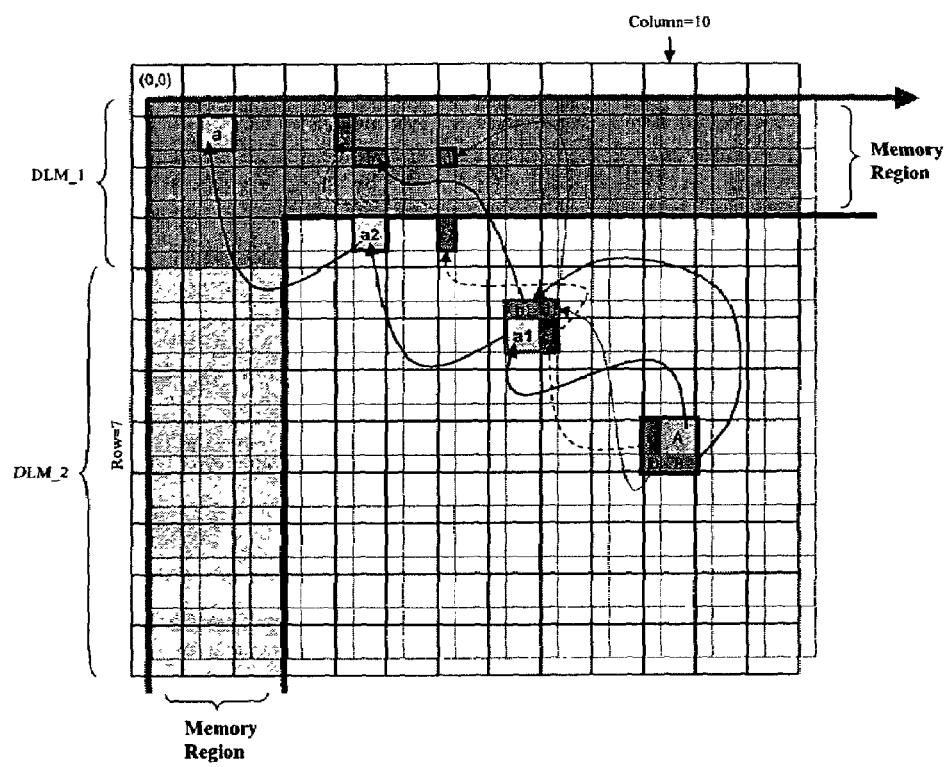
FIG. 15 is an illustration of the repetitive application of the mapping process of FIGS. 14($a$)–($d$) wherein the subblocks of the input block (A, B, C, D) at the row/column index position (7,10) are mapped within the memory region with Δ=3.

Each input subblock is mapped onto a memory location, which is positioned $\Delta$ or $\Delta$−1 rows and columns from the current input block. Thus, for each subblock to process, the row and column index of the input block is mapped to a row and column index of a memory block, in which the subblock should be stored. Care should be taken to map an input subblock to a position in the memory region. For example, applying only once the criteria of FIG. 14 on the (7,10) input block (A, B, C, D) of FIG. 15 would map the input to the subblocks a1, b1, c1 and d1, which lie outside the memory region. In fact, these subblocks a1, b1, c1 and d1, are part of some input blocks that have themselves previously been stored in memory, and that can advantageously now be recalled. The storage operation from the subblocks a1, b1, c1 and d1 has thus previously been performed by applying the rules of FIG. 14 on the input blocks containing the subblocks a1, b1, c1 and d1. Accordingly, the criteria of FIG. 14 can be applied repetitively on each input subblock until the subblock is mapped onto the DLM (DLM_1+DLM_2) memory region. In the example of FIG. 15, the A- and C-type input subblocks undergo three times the mapping process, while the B- and D-type input subblocks apply it only twice. This effect is correctly obtained by the function Combined_Modulo of pseudocode Listing 1, as confirmed by the numerical values of Table 2, with (Input_row, Input_column)=(7,10) and $\Delta$=3.

TABLE 1

Translation operations of FIG. 14 for mapping input subblocks (A, B, C, D) onto their corresponding output subblocks.

| Subblock Type | Grid Position | Vertical translation Modulo_row | Horizontal translation Modulo_column |
|---|---|---|---|
| A | NE | $\Delta$−1 | $\Delta$ |
| B | SE | $\Delta$ | $\Delta$ |
| C | NW | $\Delta$−1 | $\Delta$−1 |
| D | SW | $\Delta$ | $\Delta$−1 |

TABLE 2

Numerical values for the repetitive remapping process of FIG. 15, using the parameters of Table 1 ( = 3) in the function Combined_Modulo of Listing 1.

| Subblock Type | Grid Position (Row, Column) | Modulo_ Row | Modulo_ column | Q_row | Q_ column | Q |
|---|---|---|---|---|---|---|
| A | (7, 10) & NE | 2 | 3 | 3 | 3 | 3 |
| B | (7, 10) & SE | 3 | 3 | 2 | 3 | 2 |
| C | (7, 10) & NW | 2 | 2 | 3 | 5 | 3 |
| D | (7, 10) & SW | 3 | 2 | 2 | 5 | 2 |

```
Combined_Modulo(Input_row, Modulo_row,
           Input_column, Modulo_column,
           Memory_row, Memory_column) {
 Q_row=floor(Input_row/Modulo_row);
 Q_column=floor(Input_column/Modulo_column);
 Q=min(Q_row, Q_column);
 Memory_row = Input_row − Q*Modulo_row;
 Memory_column = Input_column − Q*Modulo_column;
 if
((Memory_row<Number_Of_NW_Rows)||(Memory_column<Number_Of_NW_Columns)) {
       Memory_row += Modulo_row;
            Memory_column += Modulo_column;
   }
}
Write_Output_Subblock_Read_Input_Subblock(Input_Image,
               Memory_Image,
               Output_Image,
               Input_row, Input_column,
               Output_row, Output_column,
```

```
                N_rows, N_columns,
                Pixels_Delay_row, Pixels_Delay_column){
// Calculate the memory addresses
Combined_Modulo(Input_row, Pixels_Delay_row, Input_column, Pixels_Delay_column,
                Memory_row, Memory_column);
// read NW/SW/SE/NE output subblock from memory and write to output
Copy_Block(Memory_Image,Output_Image,
        Memory_row, Memory_column,
        Output_row, Output_column,
        N_rows, N_columns);
// write SE/NE/NW/SW input subblock into memory on the same place
Copy_Block(Input_Image,Memory_Image,
        Input_row, Input_column,
        Memory_row, Memory_column,
        N_rows, N_columns);
}
Process_One_Input_Block(Input_Image,
                Memory_Image,
                Output_Image,
                Input_row, Input_column,
                Image_Width,Image_Height,
                Blocks_Delay, // Delay in block units
                Number_Of_NW_Rows, Number_Of_NW_Columns,
                Block_Size){
// Blocks_Delay =
Pixels_Delay = Blocks_Delay * Block_Size;
Base_Output_row = Input_row - Pixels_Delay;
Base_Output_column = Input_column - Pixels_Delay;
// *** SE input subblock pushes out NW memory subblock,
// to create NW output subblock
Write_Output_Subblock_Read_Input_Subblock(
        Input_Image, Memory_Image, Output_Image,
        Input_row+Number_Of_NW_Rows, Input_Columns+Number_Of_NW_Columns,
        Base_Output_row, Base_Output_column,
        Block_Size-Number_Of_NW_Rows,Block_Size-Number_Of_NW_Columns,
        Pixels_Delay,Pixels_Delay);
// *** NE input subblock pushes out SW memory subblock,
// to create SW output subblock
Write_Output_Subblock_Read_Input_Subblock(
        Input_Image, Memory_Image, Output_Image,
        Input_row, Input_column+Number_Of_NW_Columns,
        Base_Output_row+(Block_Size-Number_Of_NW_Rows), Base_Output_column,
        Number_Of_NW_Rows,Block_Size-Number_Of_NW_Columns,
        Pixels_Delay-Block_Size,Pixels_Delay);
// *** NW input subblock pushes out SE memory subblock,
// to create SE output subblock
Write_Output_Subblock_Read_Input_Subblock(
        Input_Image, Memory_Image, Output_Image,
        Input_row, Input_column,
        Base_Output_row+(Block_Size-Number_Of_NW_Rows),
        Base_Output_column+(Block_Size-Number_Of_NW_Columns),
        Number_Of_NW_Rows,Number_Of_NW_Columns,
        Pixels_Delay-Block_Size,Pixels_Delay-Block_Size);
// *** SW input subblock pushes out NE memory subblock,
// to create NE output subblock
Write_Output_Subblock_Read_Input_Subblock(
        Input_Image, Memory_Image, Output_Image,
        Input_row+Number_Of_NW_Rows, Input_column,
        Base_Output_row, Base_Output_column+(Block_Size-Number_Of_NW_Columns),
        Block_Size-Number_Of_NW_Rows,Number_Of_NW_Columns,
        Pixels_Delay,Pixels_Delay-Block_Size);
}
```

Listing 1: Pseudo Code for Extraction of an Output Block for each New Input Block, Applying the Rules of FIG. 14.

The process of the 2D delay line is thus obtained through Listing 1 as follows. For each Block_Size×Block_Size input block at index position (Input_row, Input_column) of the Input_Image, an output block (Input_row–$\delta_v$, Input_column–$\delta_h$) is created in the Output_Image, through the Memory Image containing the 2D Delay Line Memory DLM. Each input block is processed through Process_One_Input_Block, by calling Write_Output_Subblock_Read_Input_Subblock once for each subblock. This latter function calculates the appropriate memory addresses through the function Combined_Modulo, followed by two Copy_Block operations. The first one reads a subblock from memory and writes it at the appropriate place in the Output_Image, while the second one stores the input subblock at the freed memory location. Of course, input blocks overlapping the DLM memory region (left and top borders of the image) are directly written to memory without any output operation (not shown in Listing 1), since they are positioned within the buffering zone delimited by the 2D Delay Vector. It can be verified that all input pixels at the left and top (respectively Number_Of_NW_Columns and Number_Of_NW_Rows pixels) of this memory region are discarded by applying the appropriate parameters in the Copy_Block function.

Figure 21:
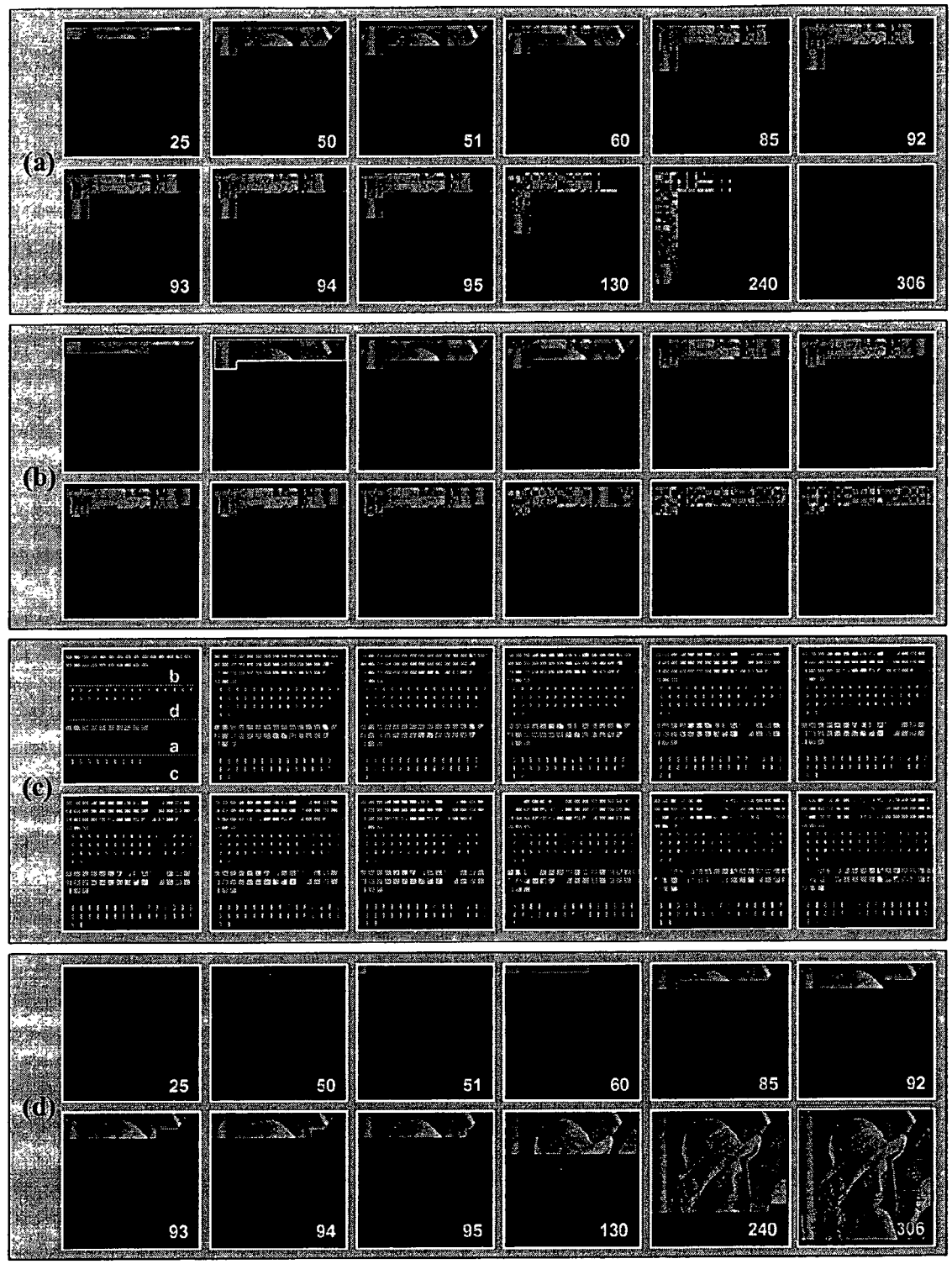
FIG. 21 is an exemplary illustration of intermediate results of the 2D Block Delay Line for a raster scanned 128×128 input image, processed in 8×8 blocks according to one embodiment of the invention.

FIG. 21(*a*) shows the intermediate memory content obtained for the 128×128 Lena input image, with 8×8 input blocks read along a classical image scan, i.e. from left to right and top to bottom. The output image (FIG. 21(*d*)) is delayed over 50 blocks, compared to the input image, i.e. 3 blocks horizontally and 3 blocks vertically ($\Delta=3$). The 5 top rows (Number_Of_NW_Rows=5) and the 2 left columns (Number_Of_NW_Columns=2) of the input image are discarded and hence the output image contains 5 bottom rows and 2 right border columns of black pixels. The output image is created in chunks of 8×8 blocks, thanks to the special subblock subdivision and re-clustering operations, explained above.

Figure 16:
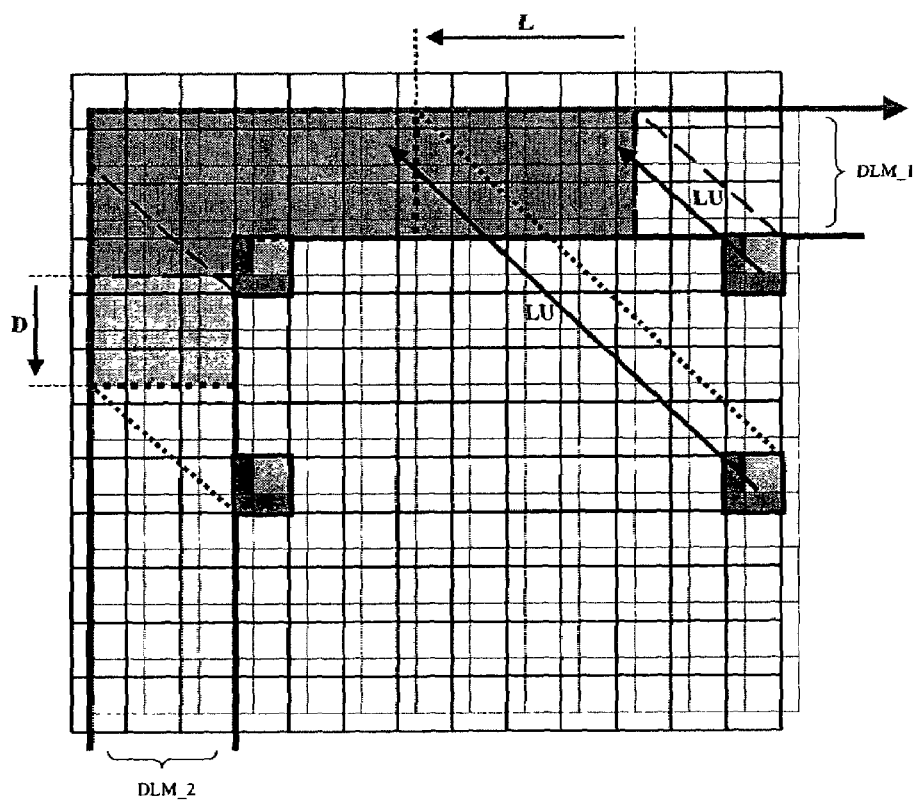
FIG. 16 is an illustration of the movement (D and L) of the active memory region (DLM_1) with the input row to process, as a consequence of the Left-Up (LU) mapping of an input block onto the memory region according to one embodiment of the invention.

Most image, processing algorithms traverse the image along a so-called raster scan, i.e. the input blocks are read from left to right and top to bottom. In accordance with an embodiment of the present invention. The modulo memory address calculations of Table 1 and Listing 1 are then reduced to counter increments and counter resetting operations, guaranteeing a very efficient implementation of the 2D delay line process. Accordingly, the generic process of Listing 1 can be simplified to the efficient 2D delay line calculations of Listing 2 for a raster scan image traversal.

represented by the Left-Up (LU) arrow in FIG. 16. As a consequence, the active memory region is moving to the left or down for each next input row to process: see arrows L and D in FIG. 16. This theoretical analysis is confirmed by the practical results shown in FIG. 21(*a*). In accordance with an embodiment of the present invention the physical memory region is limited to DLM_1 in FIG. 16, instead of using the full DLM memory buffer (DLM_1+DLM_2). This memory region is the minimal amount of memory that should be allocated for storing all input blocks for which no output blocks are created at the time of the input block reading, as a consequence of the start-up phase of the delay line. The memory region is represented by the shaded areas in FIG. 17, FIG. 18, FIG. 19 and FIG. 20, for each subblock type separately. The numbers in these figures correspond to the sequence in which the associated subblocks are processed. Input subblocks are referenced by plain numbers, while memory subblocks have underlined numbers. For instance, in FIG. 17, the input block with type A subblock number i (aligned along the input grid IG) is associated to subblock i (aligned along the output grid OG) of the DLM_1 memory region for creating the 2D delay line effect for the i-th output block. In particular, all type A input subblocks, labeled 1 to 10 are mapped to the corresponding memory subblocks 1 to 10, according to the mapping rules of FIG. 14(*a*). The same rules can be followed for the input subblocks 14 to 23

```
2D_Delay_Raster_Scanned_Image(Δ,Image_width,Position_Of_Mem_Border_1){
// Initialization of memory sizes(in corresponding subblock units)
Mem_Size[A] = (Δ-1)*Image_width+Δ;
Mem_Size[B] = Δ*Image_width+Δ;
Mem_Size[C] = (Δ-1)*(Image_width-1)+(Δ-1);
Mem_Size[D] = Δ*(Image_width-1)+(Δ-1);
// Initialization of memory counters MC_[X] and output status
for (each subblock type X = A → D) {
    MC_[X] = 0;
    Output_Status[X]= false;// Is set to true once the corresponding
                           // memory is filled
}
// Traverse the image
for (each input block I){
    for (each input subblock Y of type X = A → D){
        if (input subblock Y positioned at the left of, or above Mem_Border_1){
            Discard this input subblock Y;
        }
        else {
            // Increment the memory counter and check for overflow
            MC_[X]++;
            if (MC_[X]>Mem_Size[X]){
                // reset Counter
                MC_[X] = 1;
                // from now on, the corresponding subblocks can be output
                Output_Status[X] = true;
            }
            // Write to memory and possibly first output what was in memory
            if (Output_Status[X] == true){
                Read a subblock Z of type X from memory address MC_[X];
                Write this subblock Z to output;
            }
            Write the input subblock Y to memory address MC_[X];
        }
    }
}
}
```

Listing 2: Pseudo Code for the 2D Delay Line Process for a Left to Right, Top to Bottom Image Traversal.

As observed from FIG. 15, the subblocks of an input block are spatially translated left-up in order to be mapped to the DLM memory region. This phenomenon is pictorially (mapped onto subblocks 14 to 23 in memory) and input subblocks 27 to 29 (mapped onto subblocks 27 to 29 in memory). However, in order to avoid that the storage of subblocks 11 to 13 and 24 to 26 starts moving the active memory region as explained in FIG. 16, it is better to store these subblocks in the right part of the DLM_1 memory region. Obviously, input subblocks 11 to 13 are stored at positions 11 to 13 in memory, thus behind the memory subblocks 1 to 10, while input subblocks 24 to 26 are stored behind the memory subblocks 14 to 23. In summary, all input subblocks positioned right and down the Mem_Border_2 line of FIG. 17 follow the memory mapping rule of FIG. 14(*a*), while all input subblocks at the left of Mem_Border_2 are mapped to the still empty regions of the memory. This latter mapping is done in such a way that the left to right and top to bottom input sequence order is kept unaltered in the DLM_1 memory region.

Figure 17:
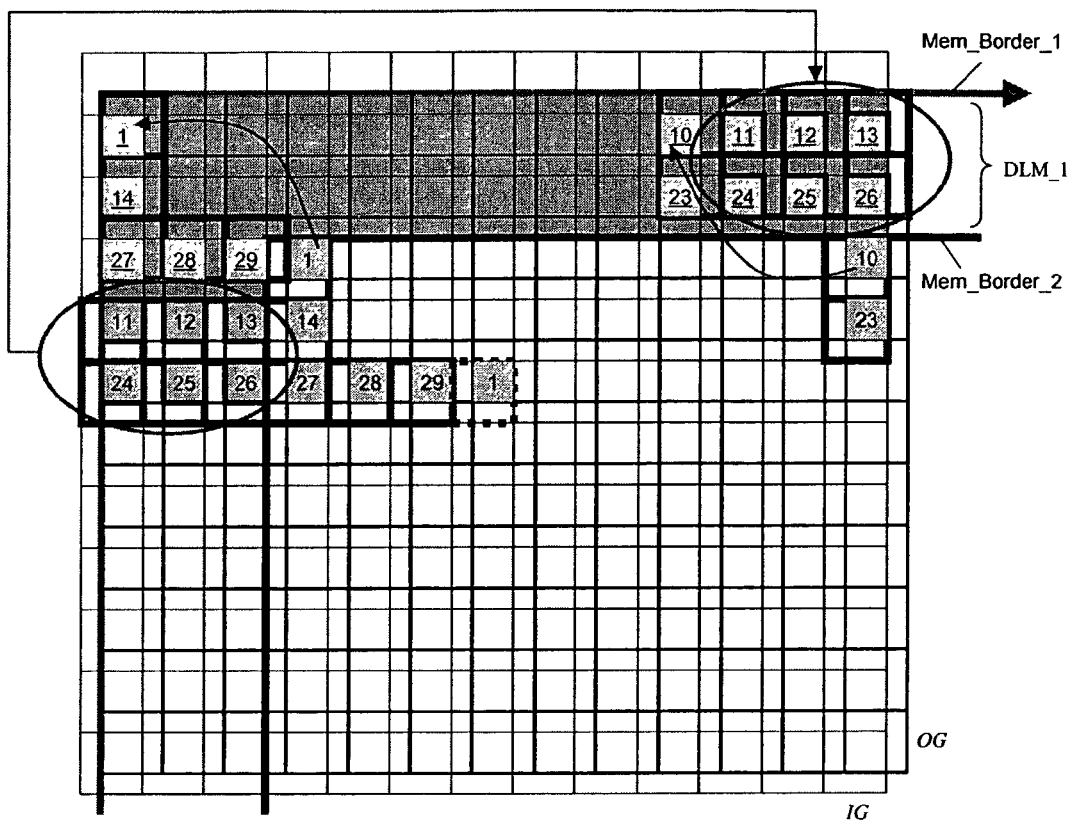
FIG. 17 is an illustration of one embodiment of sequential processing of type A input subblocks (plain numbers), in relation to the memory subblocks (underlined numbers).

The 2D delay line process of type A input subblocks, following the raster scan image traversal, can thus be summarized as shown in FIG. 17. All input subblocks that are spatially coinciding with the DLM_1 memory region are just sequentially stored in memory. No output blocks are yet created. To keep track of the memory position, a counter (Memory Counter MC_A) is incremented for each new input subblock (thus from 1 to 29). Once the first delayed output block can be created (thus when input subblock 1 appears), the counter MC_A is reset to 1, pointing to the first subblock (i.e. 1) in the DLM_1 memory region. This subblock is output, for contributing to the final output block, and the input subblock 1 is stored in the freed memory space 1. This process is repeated for each next input subblock i: the counter MC_A is incremented (and reset to 1 if larger than 29), memory subblock MC A is output and the input subblock i is put at memory location MC_A.

Figure 18:
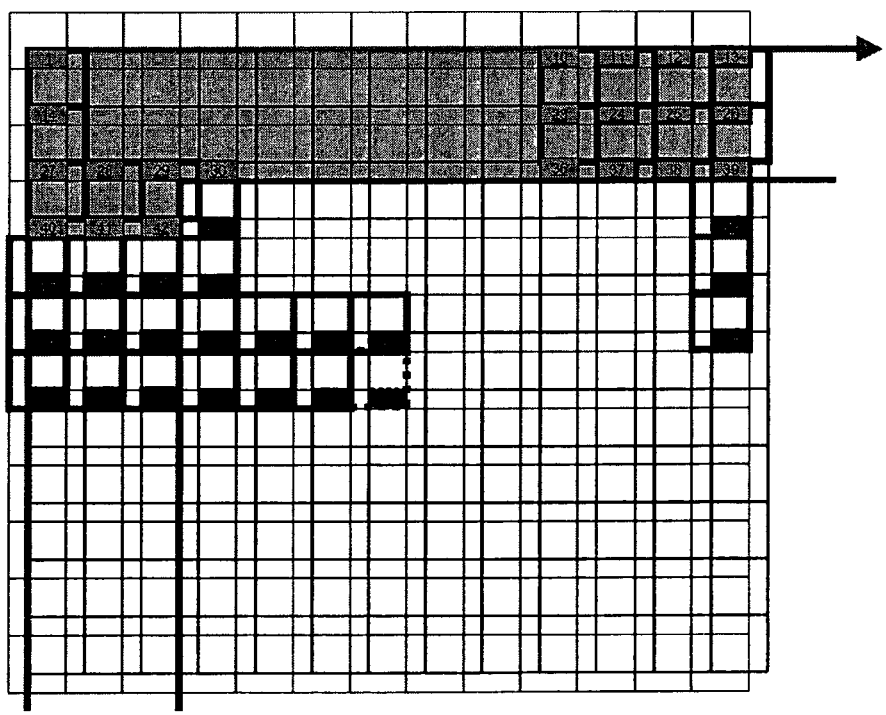
FIG. 18 is an illustration of one embodiment of sequential processing of type B input subblocks (plain numbers), in relation to the memory subblocks of FIG. 17.
Figure 19:
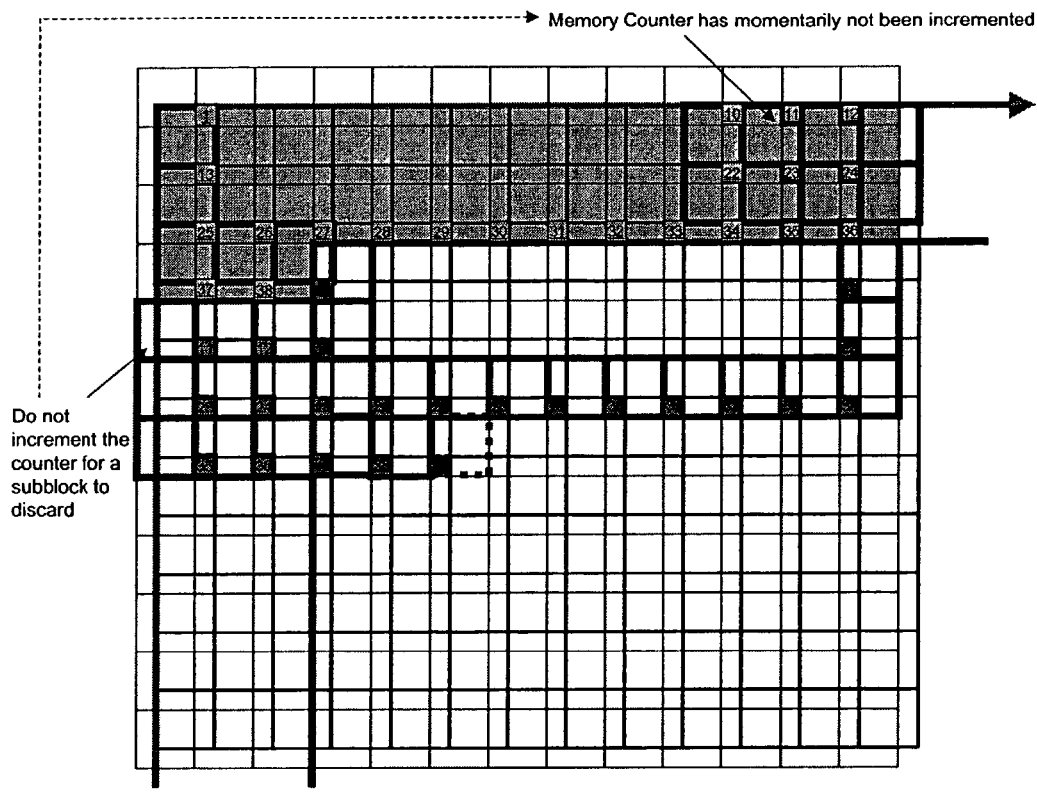
FIG. 19 is an illustration of one embodiment of sequential processing of type D input subblocks (plain numbers), in relation to the memory subblocks of FIG. 17.
Figure 20:
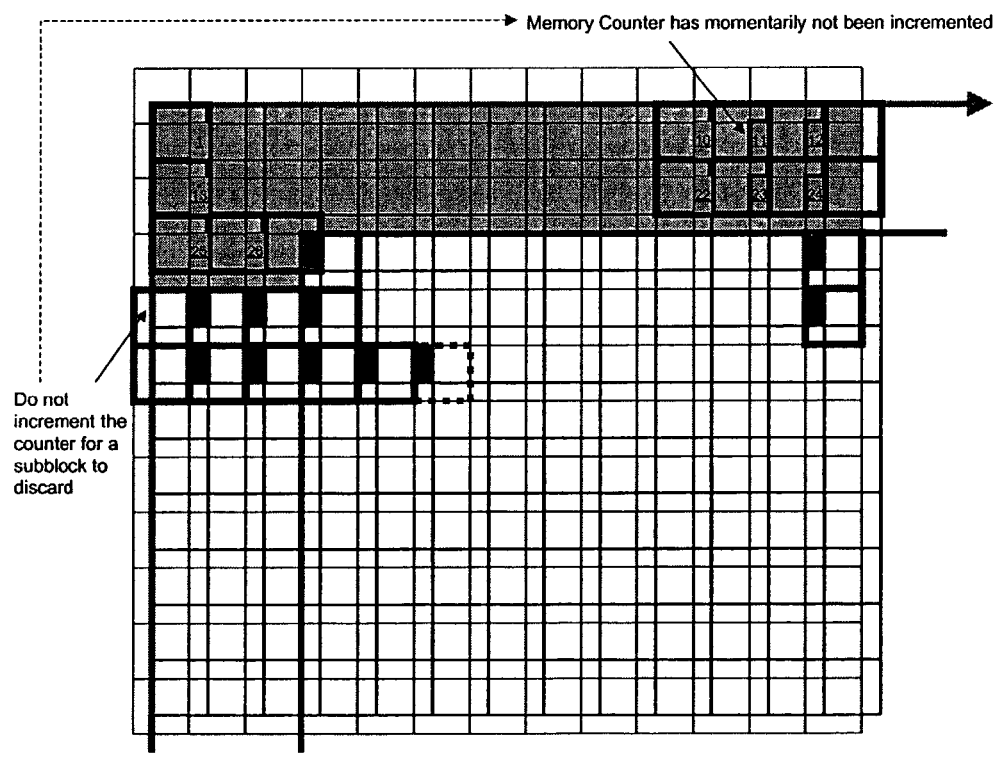
FIG. 20 is an illustration of one embodiment of sequential processing of type C input subblocks (plain numbers), in relation to the memory subblocks of FIG. 17.

The same process with appropriate parameter values is applied in FIG. 18, FIG. 19, and FIG. 20, for respectively the B-, D- and C-type input subblocks. The full process is formalized in Listing 2 for all subblock types. The Memory Counters MC_[X] for tracking the memory location for subblock type X are not counting synchronously, and are therefore kept separated in Listing 2. Indeed, when the D- and C-type subblocks of the left border input blocks of FIG. 19 and FIG. 20 are read, they are not stored to memory (since these subblocks are discarded, in accordance with FIG. 1 and FIG. 5). In contrast, for the same input blocks, the A- and B-type subblocks (FIG. 17 and FIG. 18) are always stored to memory. Since the corresponding memory counters MC_[X] are only incremented when the subblocks are actually stored, some memory counters are momentarily stopped (see FIG. 19 and FIG. 20) and therefore all memory counters are not synchronized with each other.

Another important aspect of Listing 2 is that the memory counters are reset when the corresponding memory size is reached. If the memory sizes are not calculated correctly, the full system gets confused w.r.t. which memory subblocks to process, resulting in a chaotic behavior. The process of Listing 2 can thus only work correctly if both memory sizes and memory counters are precisely controlled, e.g. by a suitable memory controller.

FIG. 21 shows the intermediate stages of the 2D delay line processing of Listing 2. FIG. 21(*c*) shows the memory behavior for the different subblock types separately, while in FIG. 21(*b*), all subblock types are interleaved in order to fill the DLM_1 memory region without any gaps. Observe how the input subblocks are spread over the DLM_1 memory region in an almost random fashion, but are still re-clustered correctly to create the delayed output image. The required memory size is shown in the second image of FIG. 21(*b*): it corresponds roughly the number of delayed pixels between input and output (actually, a little less since some input rows and columns are discarded).

An aspect of the invention to present a low memory cost MPEG-4 wavelet transform processor and method, more in particular the features of a hardware implementation of the Local Wavelet Transform (LWT) architecture [1][2] achieving close to the theoretical minimal memory size and memory access count. An embodiment of the present invention is the LWT architecture implemented as a dedicated wavelet processor. The LWT processor is capable of processing, for example, up to any 9/7 wavelet filter decomposed in with 1 prediction, 1 update and 1 scaling step according to Sweldens' lifting scheme [3]. Due to the block-based processing approach [1], this processor is capable of handling push-broom input images, while still extracting indivisible sets of parent-children trees. Additionally, the processor supports features such as region of interest and view-dependent progressive transmission of textures for 3D applications. As the LWT architecture is an improvement through a more localized 2D processing of the RPA wavelet processing architecture [4], it can also be configured for performing the RPA-based JPEG2000 wavelet transform [5].

Figure 22:
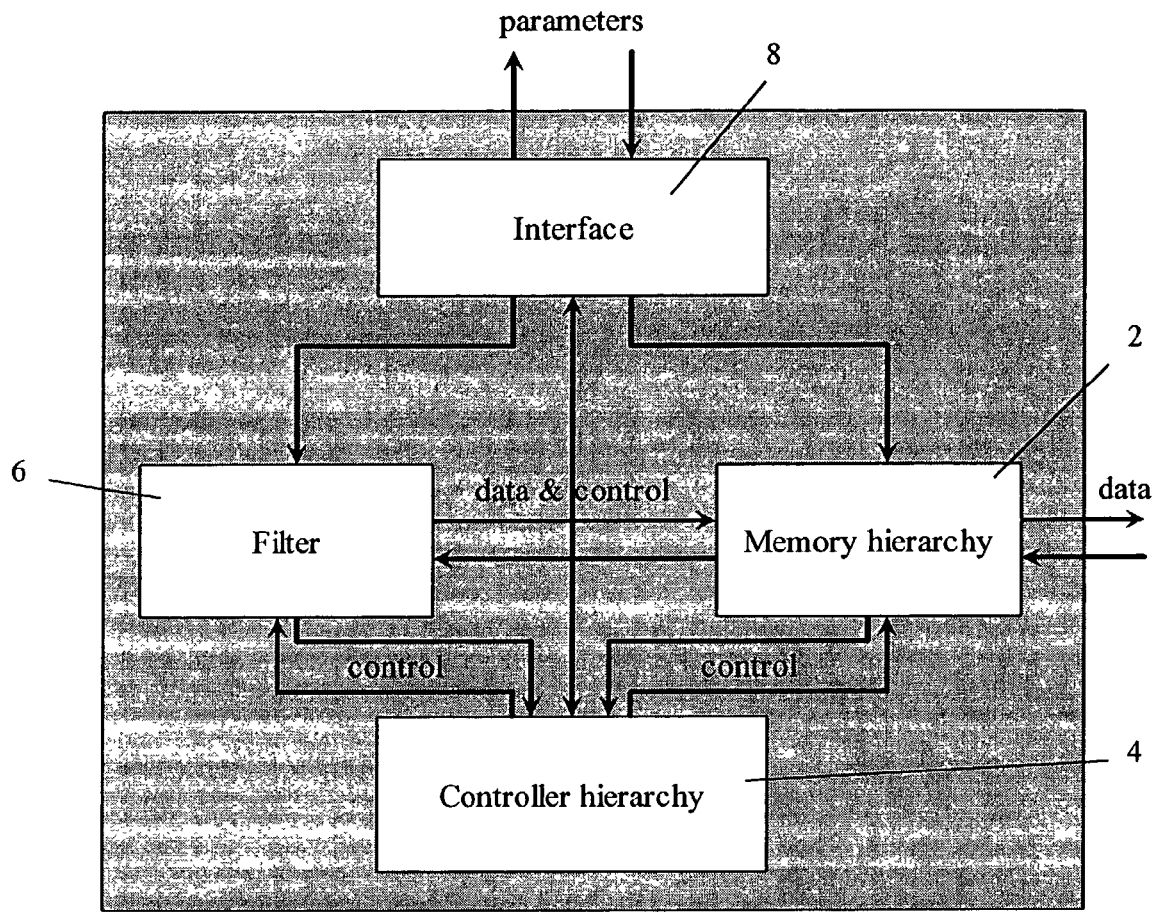
FIG. 22 is a block diagram of one embodiment of an LWT architecture.

An embodiment of the present invention relates to an LWT data transfer centric implementation constructed around three main parts shown in FIG. 22: the hierarchical memory architecture 2, the hierarchical controller architecture 4 and the filter block 6. The hierarchical memory architecture 2 contains five local and two external memories, that are interconnected according to FIG. 24. Each of these memories serves a specific function:

1. The Input Correction Memory 14 (ICM) synchronizes the input data blocks to the internal processing by introducing slight delays.
2. The InterPass Memories 16, 20 (IPM0 and IPM1) contain the intermediate wavelet coefficients during the horizontal and vertical filtering operations.
3. The Overlap Memory 22 (OM) stores the information for glueing seamlessly the processing of adjacent image blocks.
4. The Tree Memory 24 (TM) stores intermediate wavelet coefficients for correct parent-children data tree extraction.
5. The Input Memory 12 (input) contains a block of the externally stored input image.
6. The Output Memory 26 (output) contains the wavelet coefficients of a transformed block, organized in a parent-children tree data format.

Figure 24:
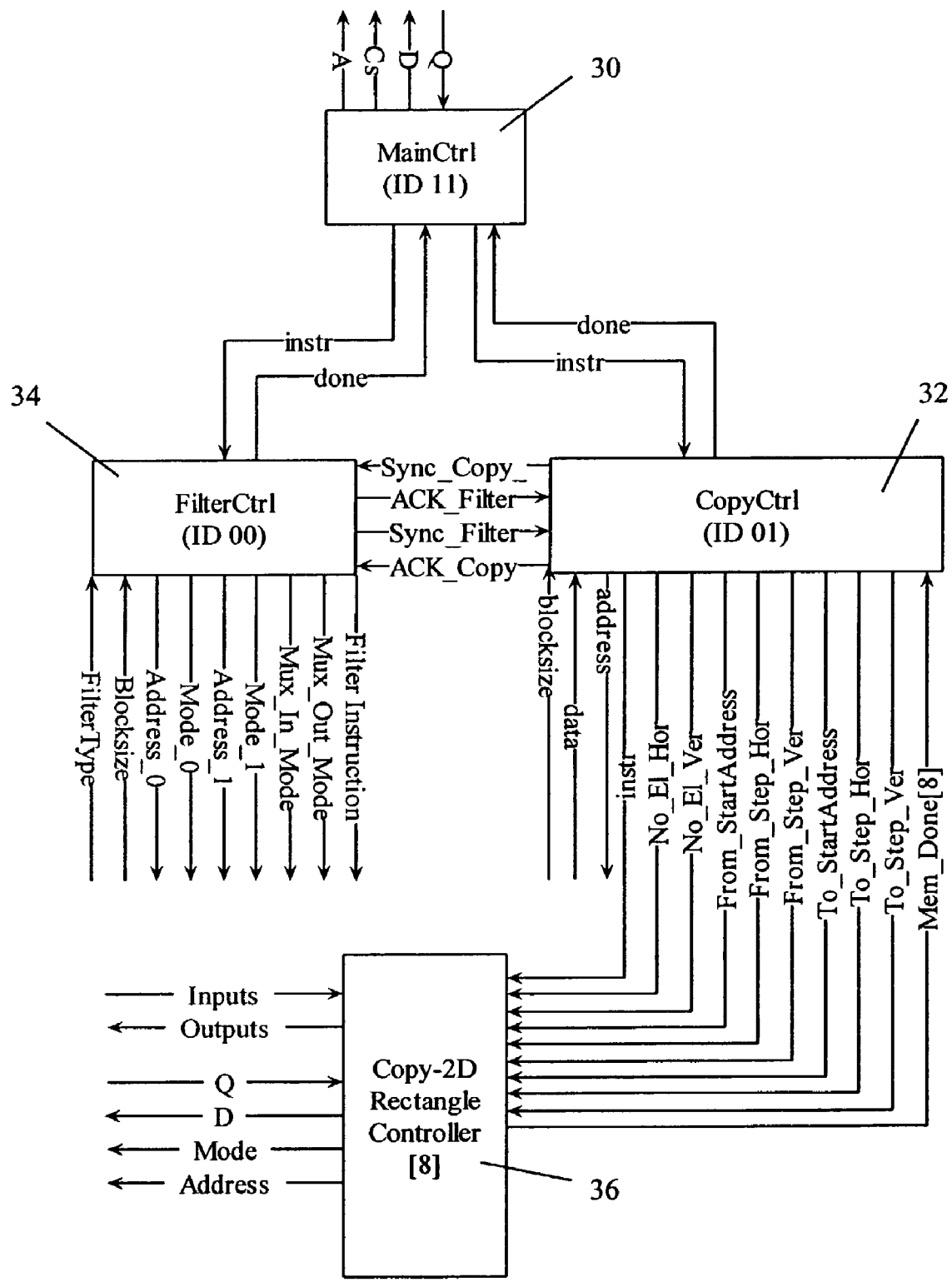
FIG. 24 is a block diagram of one embodiment of a memory controller architecture.

The hierarchical controller architecture is further decomposed in four different controllers as shown in FIG. 24: the main controller 30, the copy controller 32, the filter controller 34 and the local memory controller 36. The main controller 30 forms the first layer of control. It fetches the instructions out of the program memory and processes the sequencing and general control instructions. The filtering and memory transfer instructions are passed to the filter controller 34 and the copy controller 32 respectively. Synchronization instructions are foreseen between these second layer controllers. The local memory controller 36 is instantiated for each port of the memories. This approach allows independent, parallel data transfers between separate memory modules, resulting in a high processing throughput. Based on the high-level memory transfer instructions, the local memory controllers 36 generate the address sequence and the low-level RAM access control signals.

Figure 34:
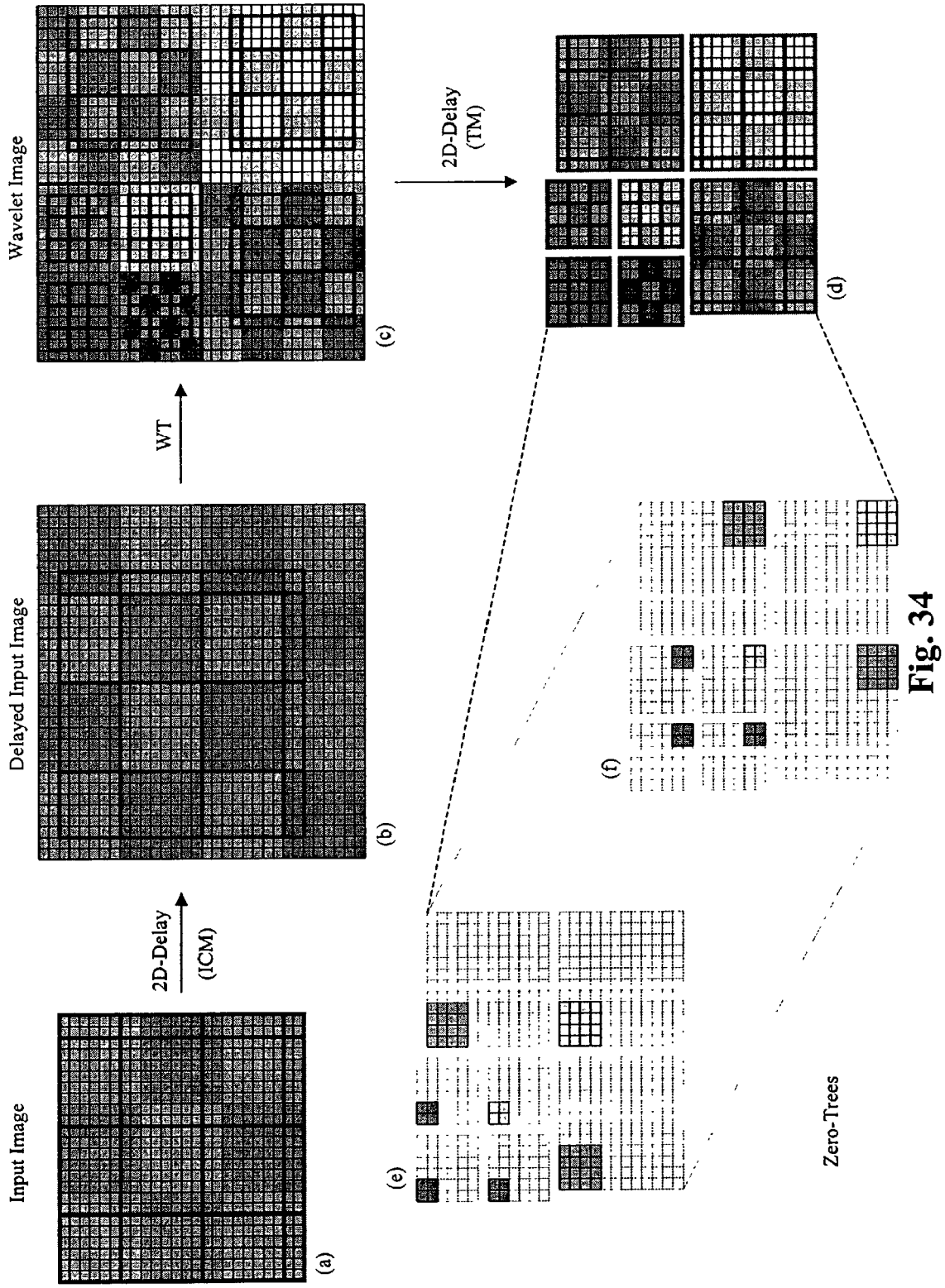
FIG. 34 is an illustration of the use of 2D delay lines in resynchronization processes of the Local Wavelet Transform.

FIG. 34 shows the different sub-operations involved in the Local Wavelet Transform. As shown in the transition of (b) to (c) of FIG. 34, the calculation of the Wavelet Transform is basically performed block by block (light and dark colored blocks). Unfortunately, due to data-dependencies in the Wavelet Transform calculations, it is not possible to perform all calculations directly on blocks having a fixed size: the relevant data is clustered into quite irregular regions. Only the regions well inside the image have a fixed size (e.g. steady-state blocks of 8×8 pixels at the input and $2^{3-i} \times 2^{3-i}$ pixels in level i); all border blocks are always smaller. Therefore, a specialized control is required to handle border blocks correctly. One way to perform the control is to constantly track in which part of the image the calculations are performed and adapt the parameters accordingly. This process is however very sensitive and error-prone.

Figure 35:
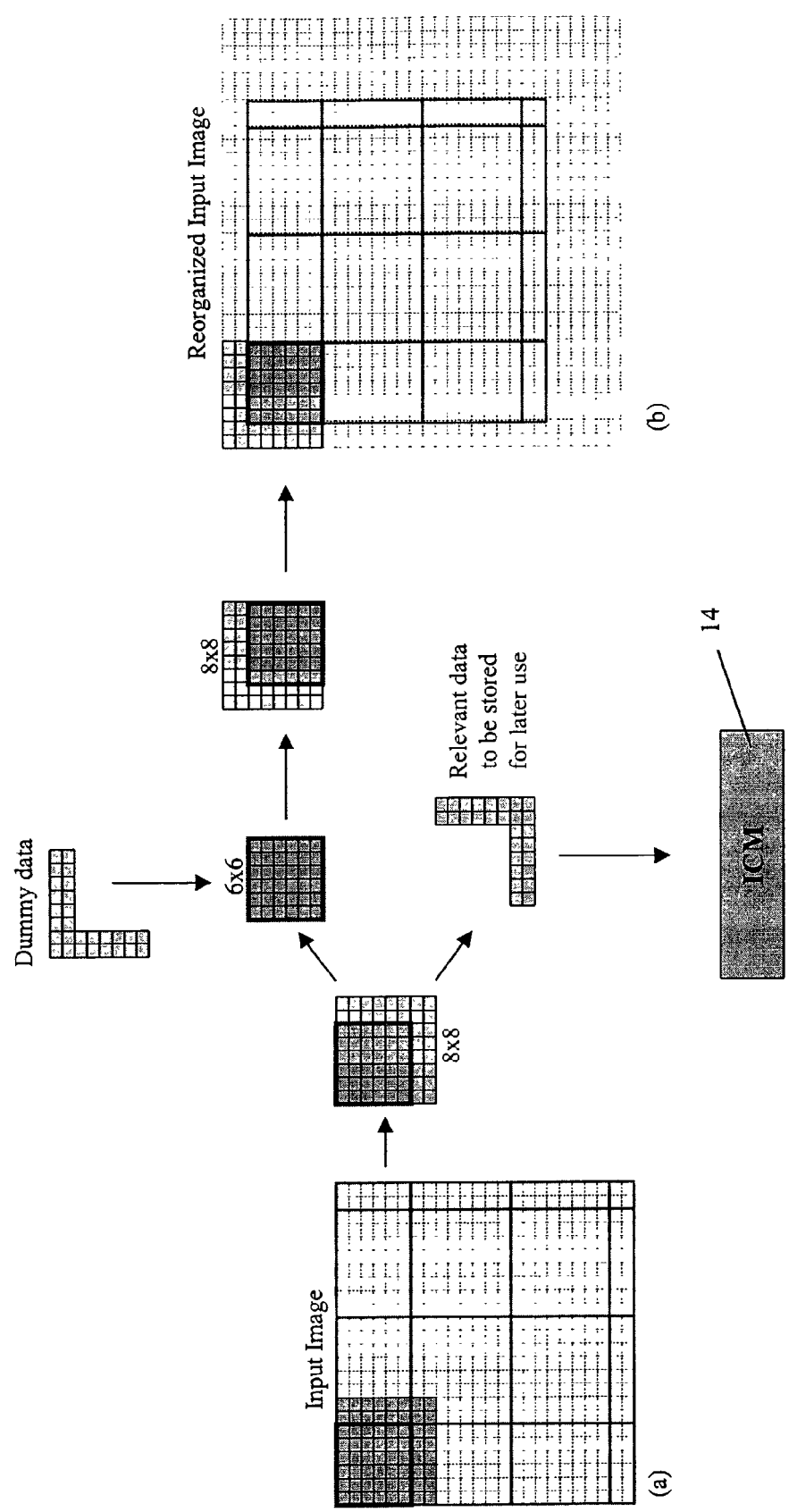
FIG. 35 is an illustration of a 2D-delay line process for reorganizing input data.

One aspect of the present invention is a regular memory reorganization process that is continuously applied, independently of the position in the image, and that mimics the former specialized control naturally. The basic idea consists of regularly performing memory copy commands, in such a way that irregular blocks are enlarged with dummy data to the steady-state size, while steady-state blocks are left unchanged. This is shown in FIGS. 34(a) and (b) for the input: for instance, in FIG. 34(a), the first relevant data of 6×6 pixels is extended to an 8×8 block in FIG. 34(b). The first block to be processed is not the 6×6 pixel block of the input image but rather an enhanced 8×8 pixel block. For this first block of processing the situation of FIG. 35 is achieved: an 8×8 pixel block is input, from which the 6×6 relevant pixels are copied and extended by a left/top border of 2 pixel dummy data. The unused right/bottom border of 2 pixels in the original 8×8 block is stored into memory (the Input Correction Memory ICM) for later use. Obviously, some pixels that have already been input, are temporarily stored and will only be used in later time slots. Hence, the above process is a kind of delay line that works in 2D.

Figure 36:
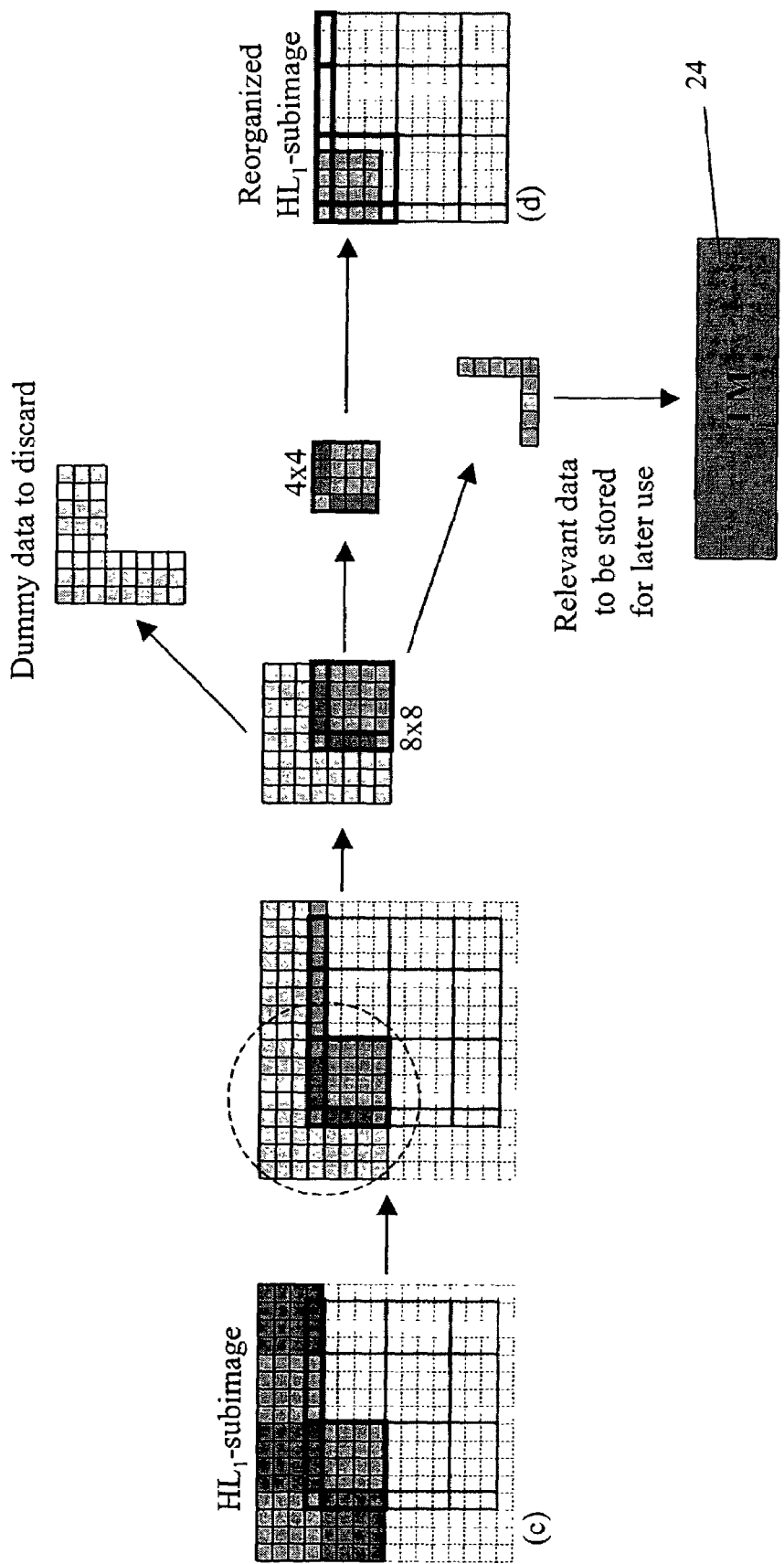
FIG. 36 is an illustration of a 2D-delay line process for reorganizing wavelet data in extracting Zero-Trees.

A similar delay line is also used in the Zero-Tree resynchronization process: from all the data created in the wavelet filtering process (see FIG. 34(c)), only certain data included certain regions is valid (see transition from FIG. 34(c) to FIG. 34 (d)). As can be seen in FIG. 36 for the HL-subimage of level 1, the situation is slightly different from the one described in FIG. 35: instead of extending pixel regions with dummy data, as in FIG. 35, some irrelevant data is dropped, as shown in FIG. 36. Surprisingly, both phenomena (FIG. 35 and FIG. 36) are implemented using the same code, as will be explained in more detail in later sections.

Figure 37:
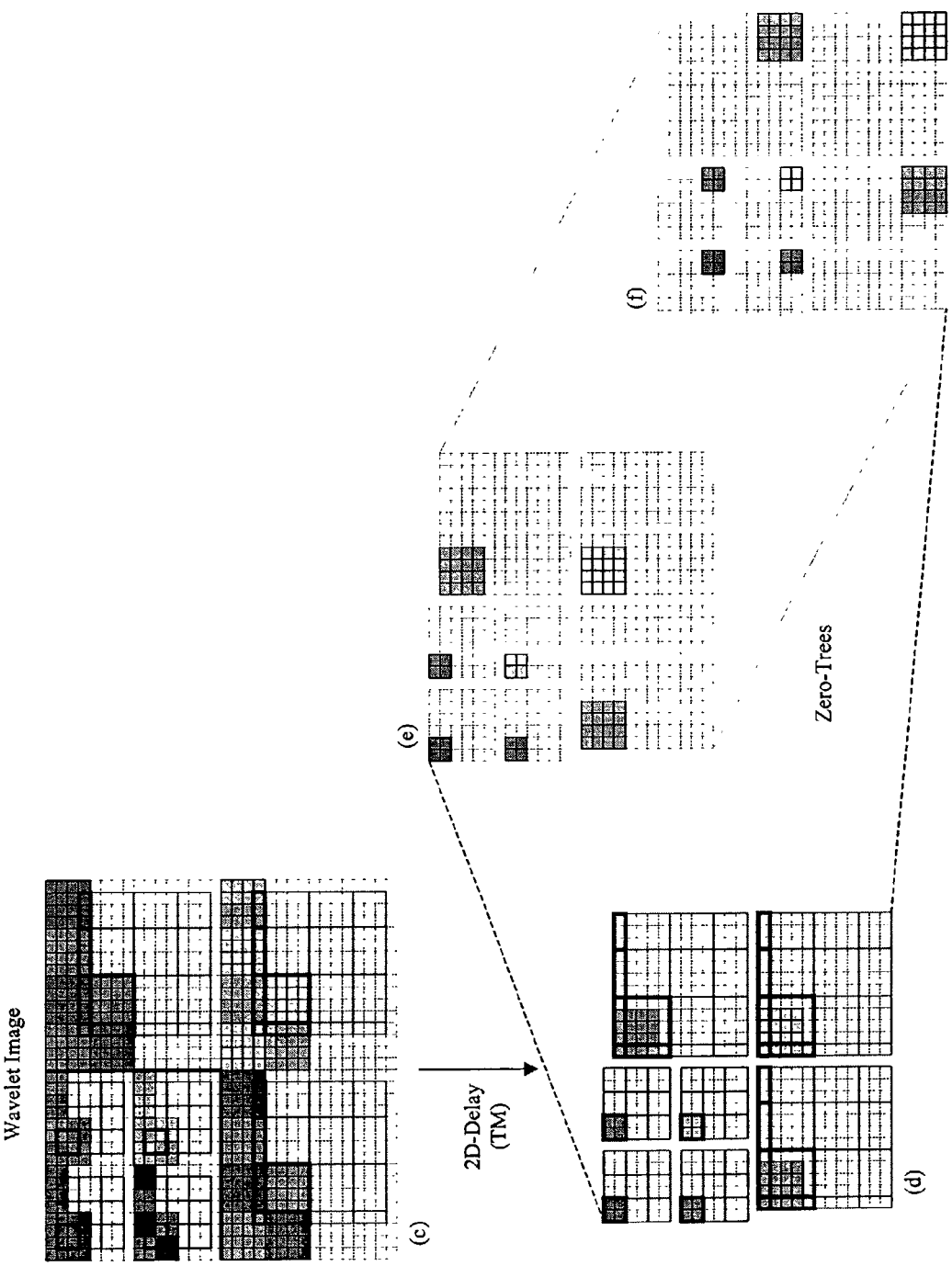
FIG. 37 is an illustration of the creation of the first set of Zero-Trees by applying the process illustrated in FIG. 36 to all subimages.

Of course, the process of FIG. 36 should be repeated for every subimage in the wavelet transform. Doing so, we end up in the configuration of FIG. 37. Observe that for each new level in the wavelet transform, the parameter settings (e.g. the number of pixels to discard) changes. As a result, different parameter sets should be calculated for applying FIG. 36, while only one parameter set is required for reorganizing the input data according to FIG. 35.

Figure 38:
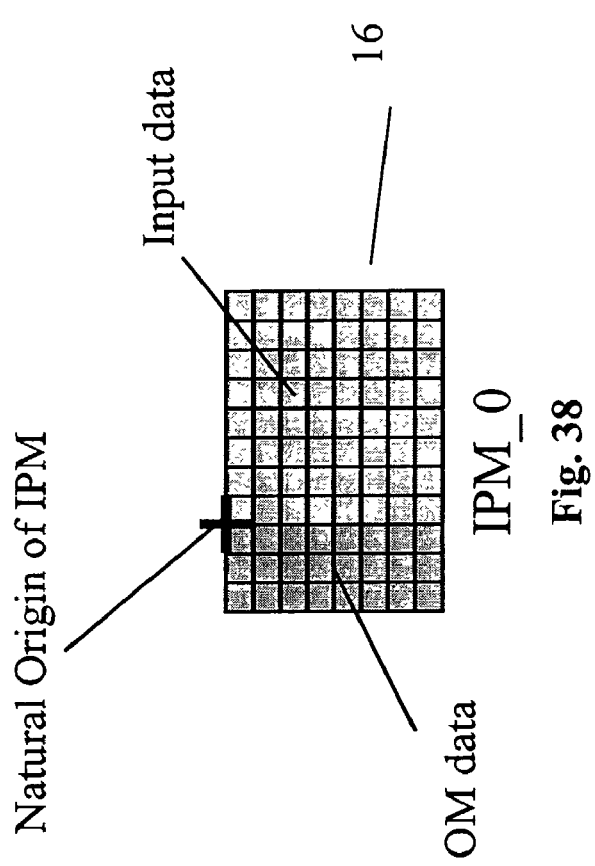
FIG. 38 is an illustration showing the natural origin of the IPM.
Figure 39:
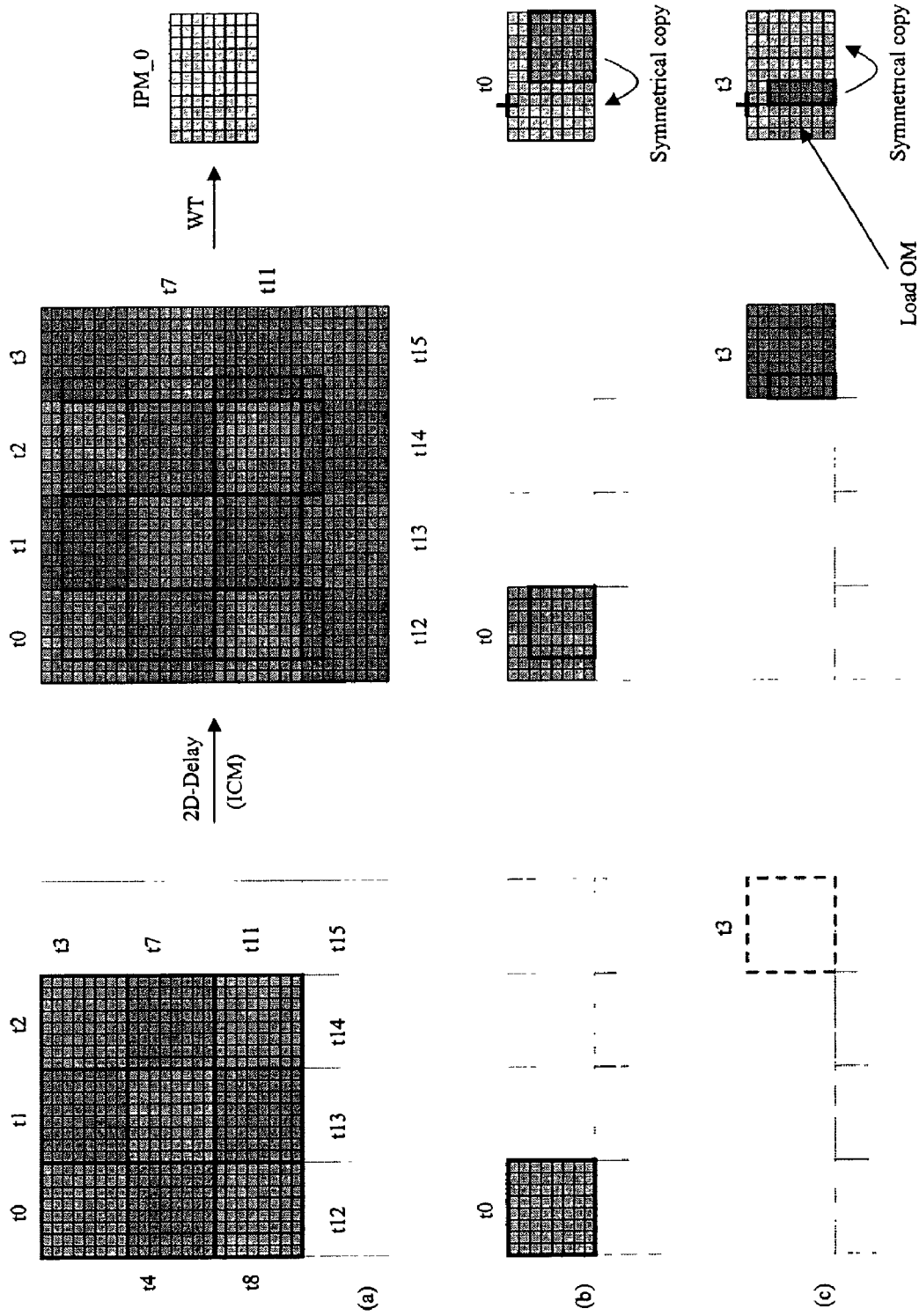
FIG. 39 is an illustration of one embodiment of an input reorganization process (a) at time stamps t0 (b) and t3 (c)

At the input image borders, data should be copied within the IPM 16, 20, i.e. not necessarily starting at the "natural origin" of the IPM (see cross in FIG. 38). Due to the memory reorganization process of FIG. 35, it is now possible to handle fixed-sized blocks of for instance 8×8 pixels. This has the advantage that always the "reorganized" input block at the same position in the IPM is copied, i.e. at its natural origin. For example, in FIG. 39(b), an input block of 8×8 pixels is read from the image and transformed via the 2D-delay line into an 8×8 block, from which the left/top border of 2 pixels contains dummy data. This latter 8×8 block is copied at the natural origin of the IPM, putting the relevant data of 6×6 pixels (the pixels included in the red rectangle) directly at the correct position. Of course, since we handle a border block, symmetrical copies must be performed, as indicated in the third column of FIG. 39(b). In a similar way, the top/right-most relevant data of 6×2 pixels (pixels in the top/right-most red rectangle in FIG. 39(a)-second column) is automatically extended to an 8×8 block at time stamp t3 (FIG. 39(c)), which is also copied at the natural origin of the IPM. Of course, since we deal with a right border image block, the Overlap Memory (OM 22) information should be loaded and symmetrical copies should be performed.

Figure 40:
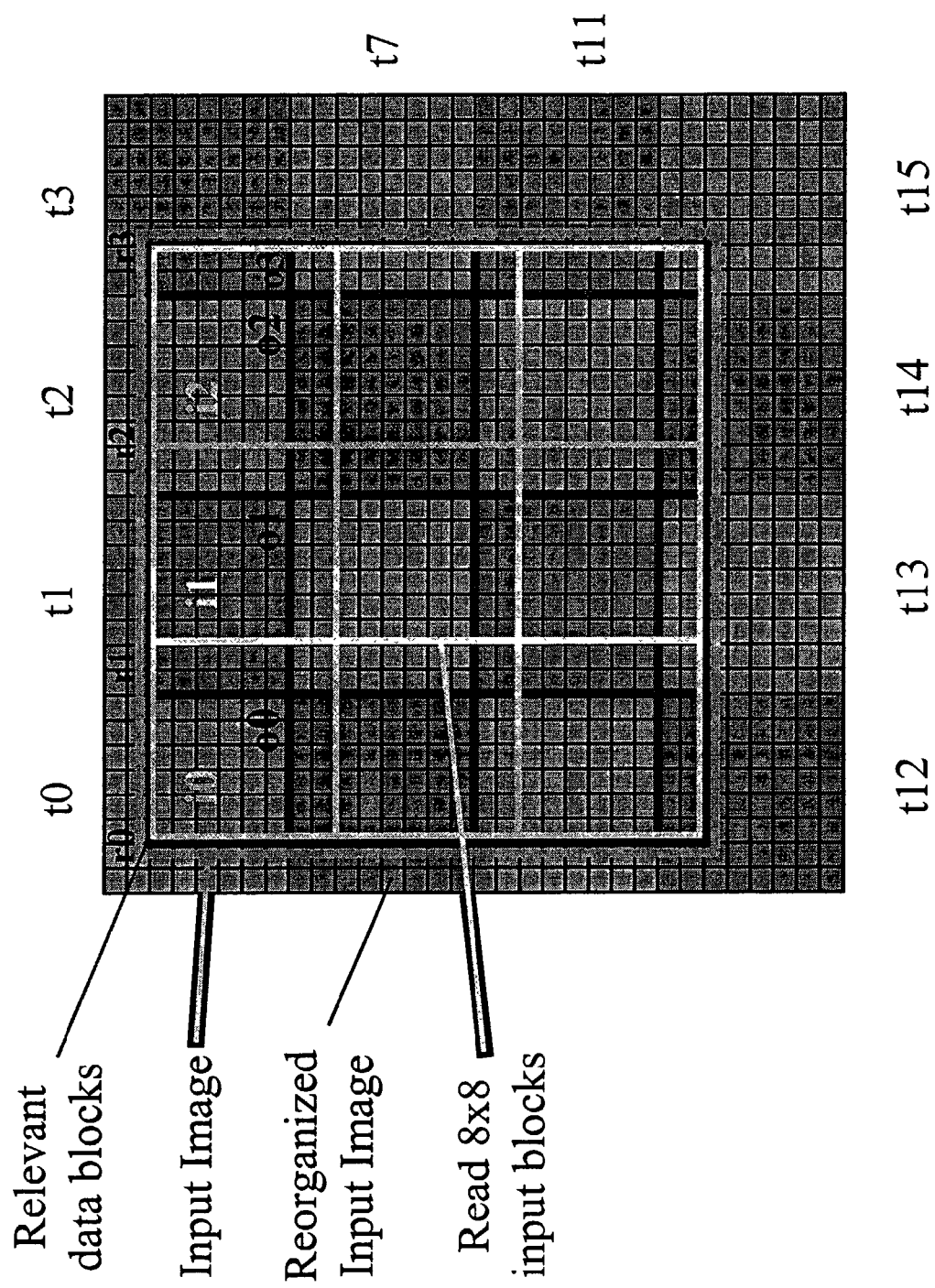
FIG. 40 is an illustration of one embodiment of a method of partitioning Input Image and Reorganized Input Image into regions.

In order to create the correct 8×8 block in FIG. 39(c)-second and third column, an "empty" input block of 8×8 pixels should be read from the input (FIG. 39(c)-first column). At first sight, this looks strange, but actually, this phenomenon can be explained as shown in FIG. 40. The blocks delineated with a light correspond to 8×8 input blocks, the blocks delineated with a darker line show the relevant data and the blocks of different shading correspond to the reorganized input blocks. As an example, the relevant 6×6 pixel data o0 corresponds to the left/top part of the 8×8 input data i0 and is copied to the bottom/right part of the first reorganized input block (light-blue block r0 at time stamp t0). In a similar way, when the last 8×8 input block i2 is read, the 8×8 reorganized input block r2 is created (at time stamp t2), containing the relevant 6×8 pixel data information o2. At the very same time stamp, the relevant 6×2 pixel data information o3 is already available, but momentarily stored into memory (ICM). In order to release this information o3, a fictive input block (at the right of i2) should be input at time stamp t3, releasing the reorganized 8×8 input block r3, containing o3.

Figure 41:
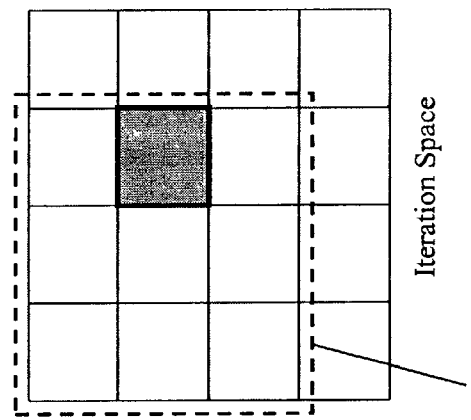
FIG. 41 is an exemplary illustration of an iteration space.

In summary, fictive input blocks at the right and bottom of the input image should be read, in order to release the right/bottom-most reorganized input blocks. FIG. 41 shows, in a simplified way, the same relationship between the input image and the iteration space.

Because the above memory reorganization processes always input and output fixed-sized blocks (e.g. 8×8 pixels at input $2^{3-i} \times 2^{3-i}$ pixels in level i of the wavelet transform), all blocks may be considered as a steady state block. Therefore, except for the symmetrical copies of FIG. 39, no special precautions need to be taken depending on the image position: border effects are automatically handled by the enlarged iteration space processing.

Figure 42:
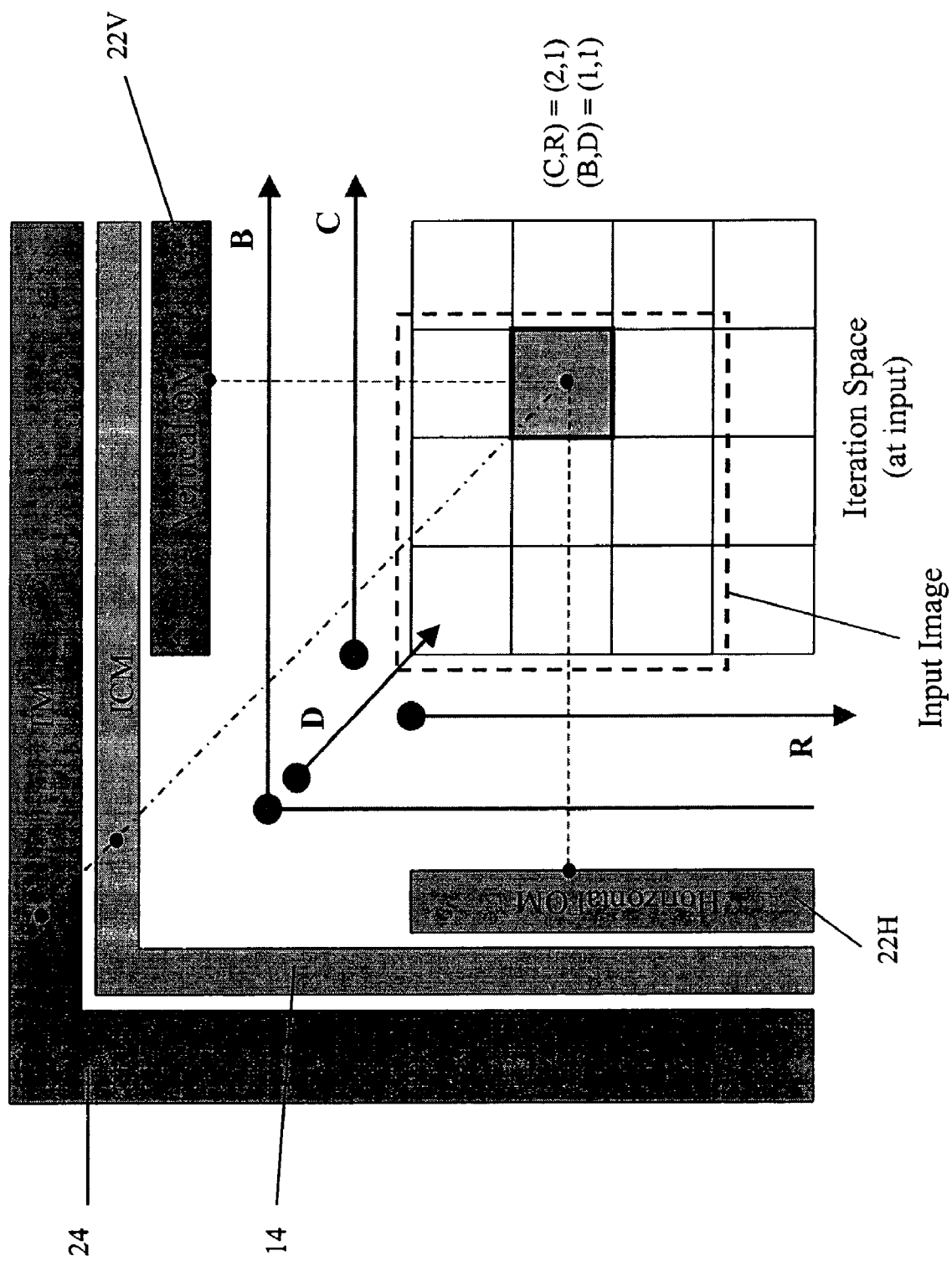
FIG. 42 is an exemplary illustration of the iteration space of FIG. 41 and associated memories, using different coordinate systems.

FIG. 42 shows the main aspects of the non-arithmetic operations, i.e. the data copying operations glueing all the arithmetic processes together. In order to better understand the issues, we introduce two different coordinate systems for traversing the iteration space. Each coordinate couple is associated to a specific 8×8 block location in the iteration space, and points to specific locations in memory, to/from which data should be transferred. The first coordinate system is the well-known Row-Column representation with horizontal and vertical coordinate axes C and R. This coordinate system is used for the Overlap Memories. A specific block in the iteration space uses the Row-index to point to the Horizontal Overlap Memory (for performing the calculations from IPM_0 to IPM_1), and uses the Column-index to point to the Vertical Overlap Memory (for performing the calculations from IPM_1 to IPM_0).

As suggested by FIG. 35 and FIG. 36, the processing of the 2D-delay line for input and wavelet data reorganization cannot be considered as a one-dimensional problem. Therefore, the associated Input Correction Memory (ICM) and Tree Memory (TM) are memories aligned along the image as a continuous 2D memory (see FIG. 42), where basically each block in the iteration space points to a memory block positioned along a 45 degrees diagonal. As suggested by FIG. 42, this index is mainly determined by the Border Index B, which is basically the distance along the left/top border of the image. More precisely, each block in the image is uniquely referenced by the so-called (Border,Depth)-indices (B,D) where:

$$\begin{cases} B = C - R \\ D = \text{Min}(C, R) \end{cases} \quad (16)$$

These indices are used for accessing specific ICM and TM blocks.

The origin of the axes is shown by the relevant solid circles in FIG. 42. As an example, a block with coordinates (2,1) in the Column/Row-representation, has Border/Depth-coordinates (1,1).

Figure 43:
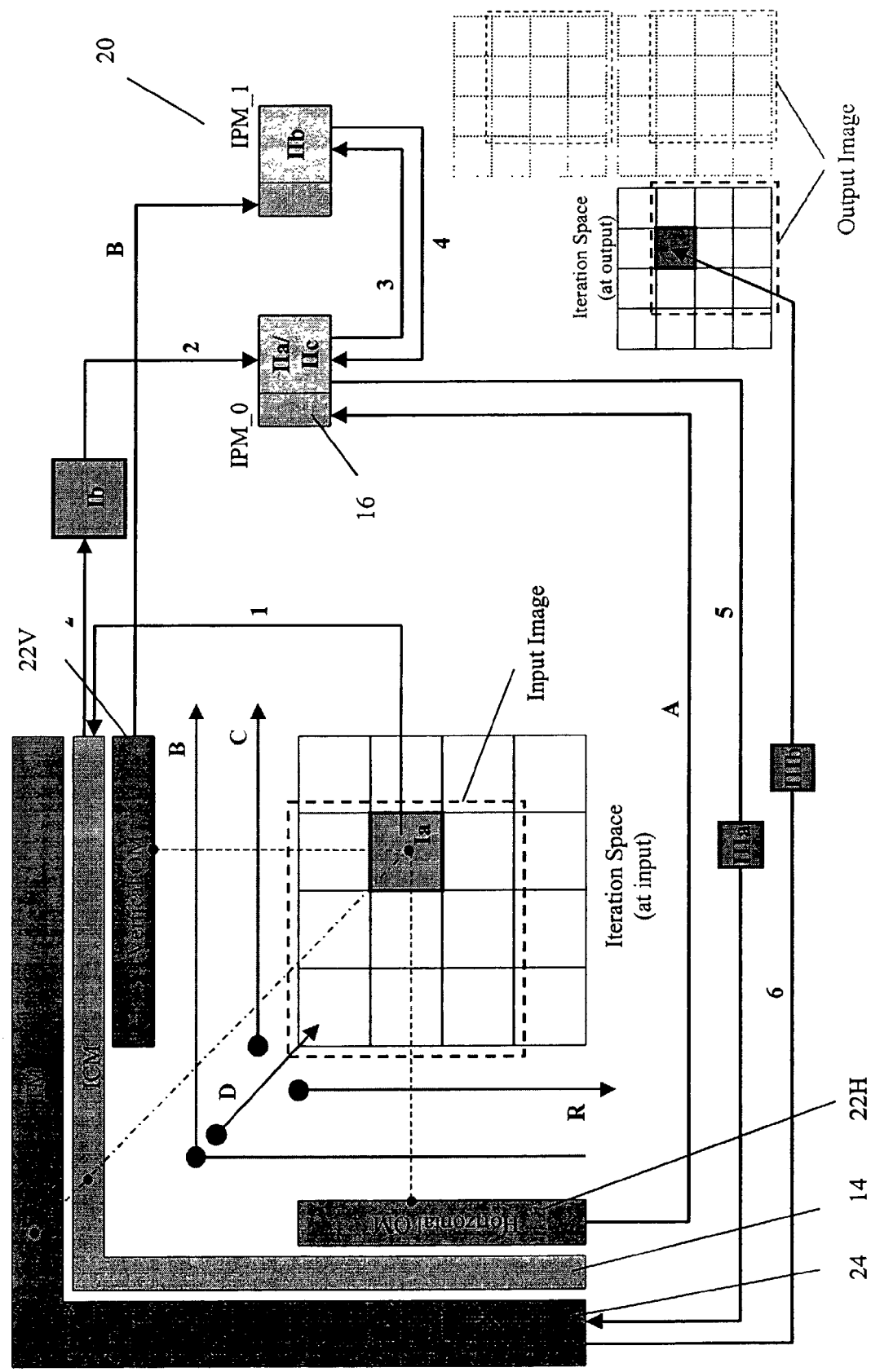
FIG. 43 is an illustration of memory interactions in the 2D-LWT

The processing 2D-LWT using fixed-sized input and output blocks and the interactions between the different memories will be indicated using the iteration space coordinates (C,R) or (B,D). The different processing steps are summarized in FIG. 43 (except the updating of the Overlap Memories for readability reasons). For each input block Ia at position (C,R) or (B,D), following processing steps are followed:

Input block Ia is transferred to the ICM at coordinates (B,D): see (1).

The input block is reorganized, yielding block Ib that is transferred to IPM_0 as IIa: see (2).

The horizontal filtering is about to start. Therefore, Horizontal OM-data at index R is loaded into IPM_0: see (A).

The horizontal filtering is performed, creating data block IIb that is transferred to IPM_1: see (3).

The vertical filtering is about to start. Therefore, Vertical OM-data at index C is transferred to IPM_1: see (B).

The vertical filtering is performed, creating data block IIc that is transferred to IPM_0: see (4).

The horizontal and vertical filtering actions are repeated as many times as the number of levels.

The data block IIc is now transferred to the TM, as IIIa, using coordinates (B,D): see (5).

The reorganized wavelet data block IIIb is written at position (C,R) in the iteration space for the output image (and correct subimage: here HL): see (6).

The previous action is repeated for all subimages with the appropriate parameters (not shown).

Observe that both the input and output images are only part of the iteration space. The input image is typically the Left-Top part of the iteration space, while the output image is the Right-Bottom part of the iteration space.

As the block-based processing embedded in the LWT architecture enables the reuse of obsolete temporary storage locations, the memory requirements are independent of the image length and proportional to the image width. As shown in Table 3, this results in an effective reduction of the required amount of memory by a factor of 32 and 500 for textures of 4 k×4 k and 64 k×64 k respectively compared to a straightforward wavelet transform.

TABLE 3

Memory requirements in function of the image dimensions

| Levels | Filter | 1k × 1k | | 4k × 4k | | 16k × 16k | | 64k × 64k | |
|---|---|---|---|---|---|---|---|---|---|
| 3 | 5/3 | 1 M | | 15k | 16 | 60k | 256 | 240k | 4 G | 959k |
| 3 | 9/7 | | | 37k | M | 149k | M | 594k | | 2.37 M |
| 4 | 5/3 | | | 25k | | 97k | | 386k | | 1.54 M |
| 4 | 9/7 | | | 75k | | 294k | | 1.17 M | | 4.68 M |
| 5 | 5/3 | | | 48k | | 178k | | 697k | | 2.77 M |
| 5 | 9/7 | | | 132k | | 511k | | 2.03 M | | 8.10 M |

The presented architecture has been implemented on a commercial FPGA board containing a Xilinx Virtex2000E-06 [6]. For the 5/3 filter, the internal block RAM memories of this Virtex FPGA (=640 kbit) are sufficient for producing a 5-level wavelet transform for images of up to 512 pixels wide. When the external memory on the FPGA board is used, images of up to 4 k pixels wide can be processed. The implementation details are summarized in Table 4.

TABLE 4

FPGA implementation results

| Number of slices: | or 28% |
| Number of memory blocks | or 90% |
| Clock frequency | 25 MHz |

Table 5 provides an overview of the processing performance in function of different wavelet transformation parameters. With the measured clock frequency of 25 MHz the maximum throughput equals 6.65 mega pixels per second (512×512).

TABLE 5

Processing delay performance expressed in cycles/pixel for different processing parameters

| Filter | Blocksize | 256 × 256 | 352 × 288 | 512 × 512 | 1k × 1k |
|---|---|---|---|---|---|
| 5/3 | 8 | 4.62 | 4.57 | 4.48 | 4.41 |
| | 32 | 4.22 | 4.04 | 3.76 | 3.54 |
| 9/7 | 8 | 6.66 | 6.59 | 6.46 | 6.36 |
| | 32 | 4.89 | 4.68 | 4.36 | 4.11 |

Figure 25:
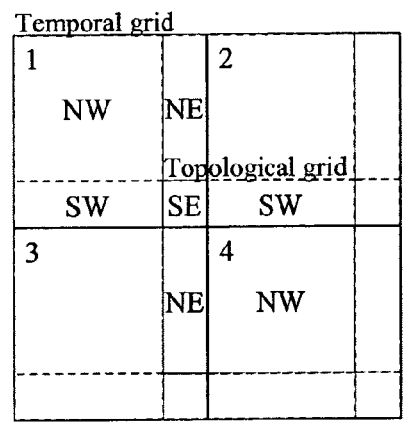
FIG. 25 is an illustration of one embodiment of a remapping process of Temporal to Topological grid.

Certain aspects of the present invention will now be described in more detail as implemented with the memory structure of FIG. 23. The basic principle of the 2D-delay is explained in FIG. 25. So-called temporal block (the blocks with solid lines) are split into 4 constituent subblocks (NW, NE, SW, SE) that are stored separately into memory. The subblocks are regrouped as indicated in FIG. 25 into so-called topological blocks (the blocks with dashed line). This remapping process has been described above. Furthermore, for minimized memory, the locations freed by the remapping process, are reused by the new computed subblock data. The lifetime of the different subblocks depends on the delay between the computation of the different temporal blocks.

Figure 26:
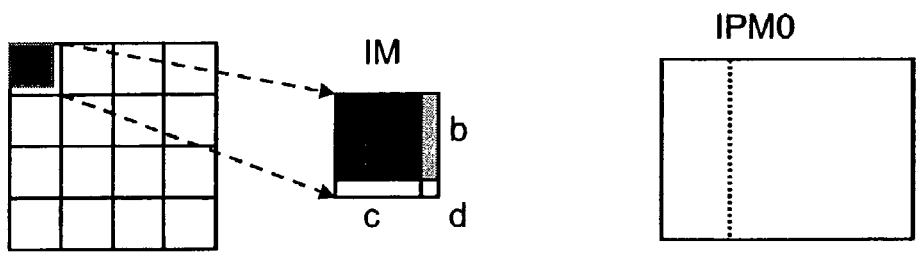
FIG. 26 is an illustration of the processing of a first input block, using the ICM for a 2D-delay line according to one embodiment of the invention.
Figure 26:
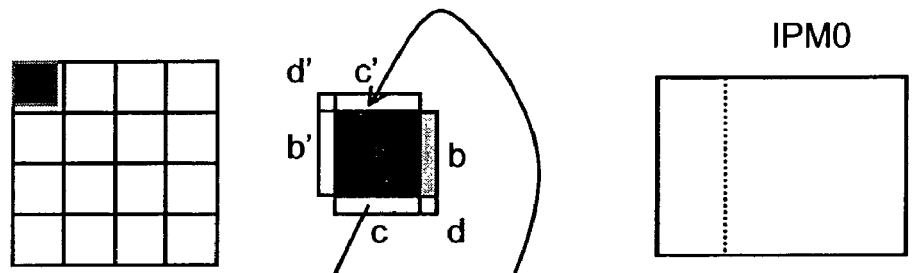
Figure 26:
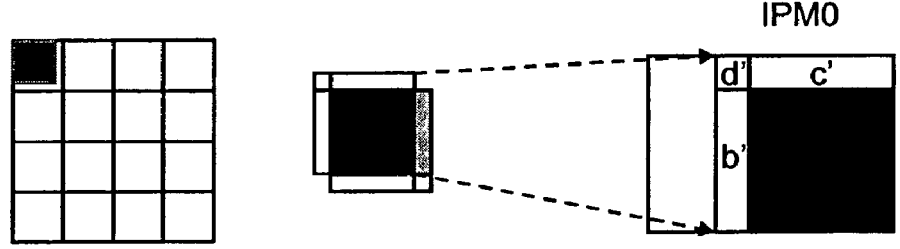

Due to filter-dependent transient effects, an image cannot be subdivided into uniform X by X pixel blocks. To avoid the implementation of difficult control logic to solve this problem, the use of a 2D-delayline at the input is implemented. By doing this, there is no difference anymore between transient and steady-state input blocks, and hence the control overhead is minimized. The actual process, using the different memories, is schematically given in FIG. 26 for the first block, and FIG. 27 for the horizontal adjacent block. The first step in the 2D-delayline process at the input is the copy of a block from the input image, stored in an external memory, into the Input Memory (IM) 12 (see FIG. 26a). The dimensions of the square blocks are, for example, 8×8, 16×16 or 32×32. Such a block is then divided in four subblocks, called a, b, c and d in the figure.

From this block, only subblock a is required for processing at this timestamp. Subblocks b, c and d are therefore stored in the ICM 14, for later use. Subblock a is completed with subblocks b', c' and d', coming from the ICM 14 (see FIG. 26b). At start-up, this will be dummy data, but in steady state, this will be data from the adjacent image blocks. Subblock b' will be from the adjacent left image block, subblock c' from the adjacent upper image block, and subblock d' from the adjacent upper/left image block. This newly formed block is then placed in the IPM0 16, where it is ready for filtering (see FIG. 26c). In practice, subblock a will be directly copied from the IM 12 to the IPM0 16, and so will the subblocks b', c' and d': they will be copied from the ICM 14 to the IPM0 16.

Figure 27:
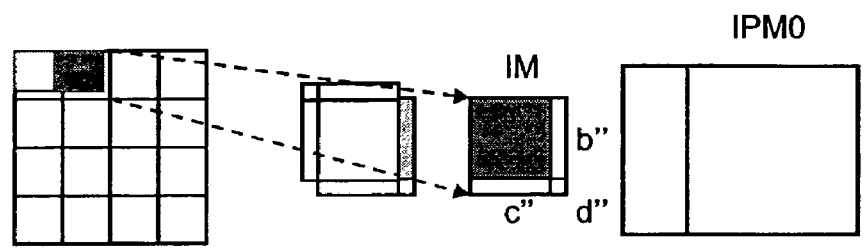
FIG. 27 is an illustration of the processing of the adjacent block of FIG. 26.
Figure 27:
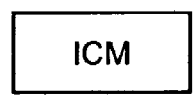
Figure 27:
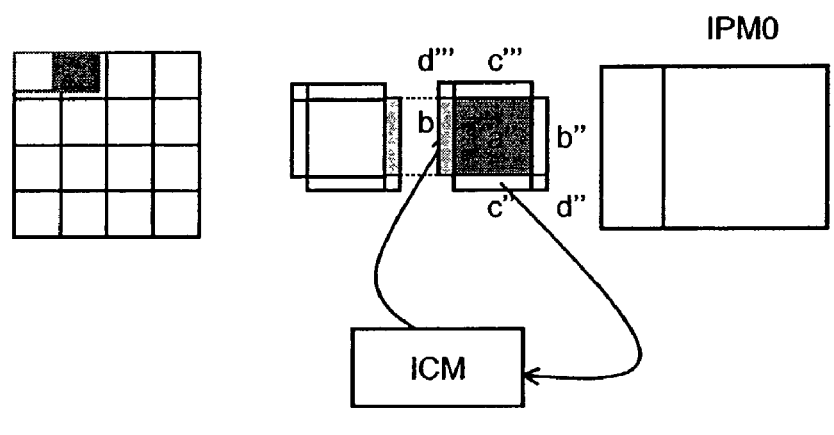
Figure 27:
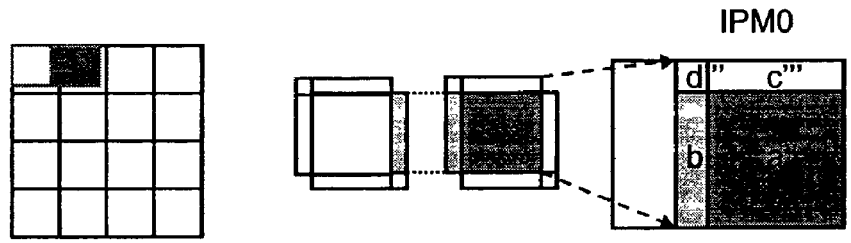
Figure 27:

The processing of the adjacent block is quite similar (FIG. 27). Here, the shaded block of FIG. 27 is required, which overlaps with the previous block. The image block is copied from the external memory to the IM 12. Now there are again four subblocks, namely a", b", c" and d" (see FIG. 27a).

Figure 28:
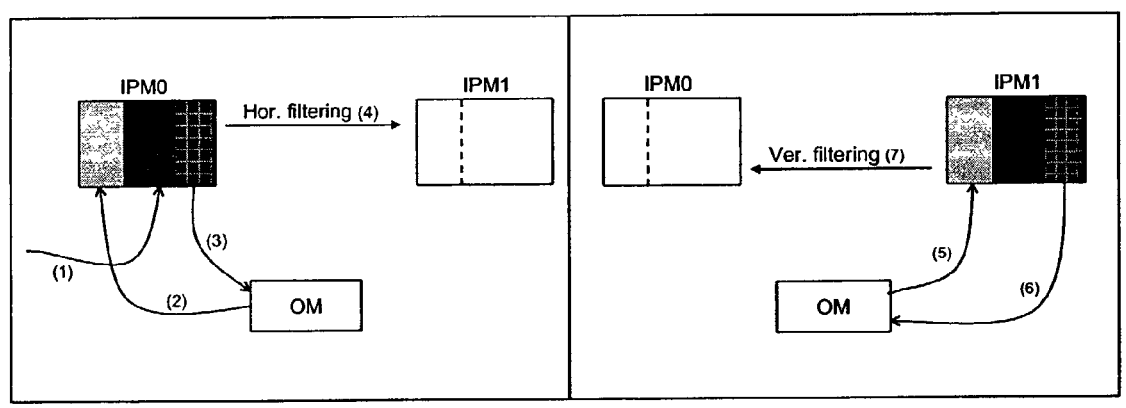
FIG. 28 is an illustration of the use of the OM in interaction with the IPM's according to one embodiment of the invention.

The latter subblocks (b", c", and d") are copied into the ICM 14. Due to the memory organization of the ICM 14, subblock b (stored in the ICM 14 since the previous step) is copied at the left side of subblock a", forming the desired block (see FIG. 27b). Here the processing is already in steady state. Subblocks c'" and d'" are still dummy data, but from the second row on, this will contain also relevant information from the subblocks from the previous row. These new subblocks are again copied on the appropriate positions in the IPM0 16, and the block is ready to be filtered (see FIG. 27c). The input image size is extended to an iteration space. Indeed, at the right and bottom border there are some rows/columns left unprocessed, unless an extra block at the end of each blockrow/blockcolumn is taken into account. The overlap memory is used to store/fetch information from/to the IPM memories 16, 20 for adjacent image blocks. This copying process has to be done for the different levels in the wavelet transform. FIG. 28 shows a further detail of the process.
1. First, the IPM0 16 is initialized with an image block from the input.
2. The left side of the IPM0 16 has to be filled with data from adjacent blocks before the filtering process can start.
3. The right side of the IPM0 16 is copied to the OM 22, for the filtering of the next image block.
4. The horizontal filtering can start. Results are stored in IPM1 20.
5. Again, the left side of IPM1 20 has to be updated with data from the OM 22 before the vertical filtering can start.
6. Data for the next image block is copied from the right side of IPM1 20 to the OM 22.
7. The vertical filtering can start, and results are stored in the IPM1 16.

This process goes on for the next levels in the wavelet transform.

The copying from the OM 22 to the IPM's 16, 20 only has to be done in steady-state. Transient blocks get their required pixels for filtering by means of symmetrical copies.

The use of the TM 24 is quite similar to the use of the ICM 14, as they both make use of a 2D-delayline. Each subimage (three for each additional level of transform) has its own 2D-delayline, and hence its own part in the TM 24. Moreover, the delay becomes filter and level dependent.

Figure 29:
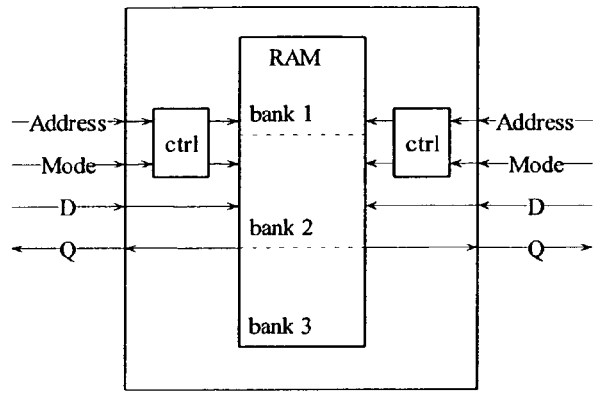
FIG. 29 is a block diagram of one embodiment of a dual port/triple bank implementation, as implemented for the IPM0.

The implementation of the IPM0 memory 16 is preferably as a dual port memory and needs some special explanation. FIG. 29 shows the white box representation of such a dual port/triple bank memory.

Table 6 provides an overview of the scheduling for a steady state block. For the $4^{th}$ and the $5^{th}$ wavelet transformation level the operation of the $3^{rd}$ level are repeated, the width (W) and the height (H) are divided by 8 and 16 respectively.

TABLE 6

Overview of the steady state schedule. Where W is equal to the block width, H is equal to the block height and O is equal to the filter startup length (for the 5/3 filter this is equal to 5).

| Filter operation | cycles | copy operations | cycles | conflict |
|---|---|---|---|---|
| Level 1 horizontal | (W + O) × H | Input to IPM0-1 | W × H | x |
|  |  | ICM to IPM0-1 | O × H | x |
|  |  | IPM0-2 to OM (port1) | O × H | x |
|  |  | OM (port2) to IPM1 | W × H |  |
|  |  | TM to Output |  |  |
| Level 1 vertical | (W + O) × H | IPM0-3 to TM | W × H | x |
|  |  | OM (port1) to IPM0-2 | O × H/2 | x |
|  |  | IPM1 to OM (port2) | O × H |  |
| Level 2 horizontal | (W/2 + O) × H/2 | Input to ICM |  |  |
|  |  | IPM0-2 to OM (port1) | O × H/2 |  |
|  |  | OM (port2) to IPM1 | O × H/2 |  |
| Level 2 vertical | (W/2 + O) × H/2 | OM (port1) to IPM0-1 | O × H | x |
|  |  | OM (port1) to IPM0-2 | O × H/4 | x |
|  |  | IPM1 to OM (port2) | O × H/2 |  |
| Level 3 horizontal | (W/4 + O) × H/4 | IPM0-2 to OM (port1) | O × H/4 |  |
|  |  | OM (port2) to IPM1 | O × H/4 |  |
| Level 3 vertical | (W/4 + O) × H/4 | OM (port1) to IPM0-2 | O × H/8 |  |
|  |  | IPM1 to OM (port2) | O × H/4 |  |

In steady state new input is collected in IPM0 bank 1 (IPM0–1), while the current data is being filtered in bank 2 (IPM0–2). The previous transformed data is stored in bank 3 (IPM0–3).

From this schedule it is clear that the data transfer operations are carefully matched to the filtering operations. Especially for the first level of the wavelet transformation, careful scheduling of the operations is required: the filtering operations and the memory transfer operations require an equal amount of cycles.

The LWT processor described above can be mapped on commercial 0.18 micron UMC standard cell technology. Timing results are based on estimated RAM delays of 5 ns (worst case delays are estimated at 3.36 ns (http://www.umc.com/english/process/d_3.asp)). Synthesis was performed to obtain a critical path of 20 ns, this did not require any timing related optimizations during the Synopsys compilation phase. As a consequence we assume the ASIC implementation of the LWT can at least be clocked at 50 MHz. The processing throughput in this case is 12.5 megapixels per second. Table 7 gives a summary of the 0.18 micron synthesis results.

TABLE 7

0.18 mm synthesis results.

| Block | Size | delay |
|---|---|---|
| FilterCore Controller | 7.2 kgates | |
| MainController | 1.0 kgates | |
| MemCopy controller | 3.8 kgates | |
| Input controller | 2.3 kgates | |
| ICM controller | 3.1 kgates | |
| IPM0 controller | 4.5 kgates | |
| IPM1 controller | 2.7 kgates | |
| OM controller | 5.5 kgates | |
| TM controller | 5.0 kgates | |
| Output controller | 4.7 kgates | |
| Total | 39.8 kgates | 20 ns |

Figure 30:
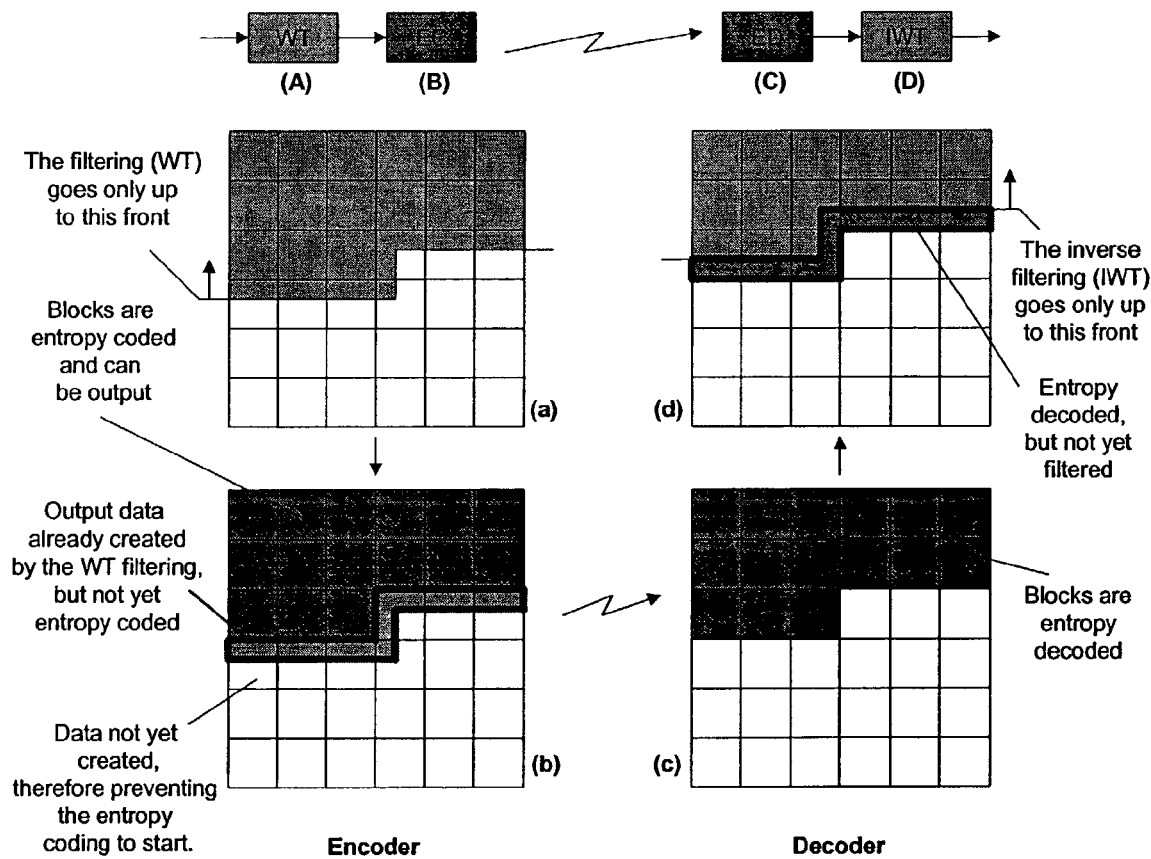
FIG. 30 is an illustration of one embodiment of a method of data processing in one level of a wavelet-based image coding scheme.

In the following a decoder and a decoding process in accordance with embodiments of the present invention will be described. FIG. 30 shows the processing in one level of a wavelet-based image coding application, using a pipeline of (A) a Wavelet Transform (WT), (B) an Entropy Coder (EC), (C) the corresponding Entropy Decoder (ED) and (D) the Inverse Wavelet Transform (IWT) in accordance with an embodiment of the present invention. The corresponding stages of the processing are pictorially represented in FIG. 30(a)-(d). During the processing, filtering operations are performed, creating data that can only partially be used in the Entropy Coding module (see FIG. 30(a)-(b)), since the Entropy Coder needs data blocks of a pre-defined size for each particular level of the WT. The Entropy Coded data blocks are transmitted to the decoder (see FIG. 30(c)-(d)). The Entropy Decoder recreates data (wavelet coefficients) that again can only partially be involved in the Inverse Wavelet Filtering process (see FIG. 30(d)). The not yet consumed data (the CACLA) should therefore be stored into memory: the regions bounded by the thicker lines in FIGS. 30(b) and (d).

Figure 31:
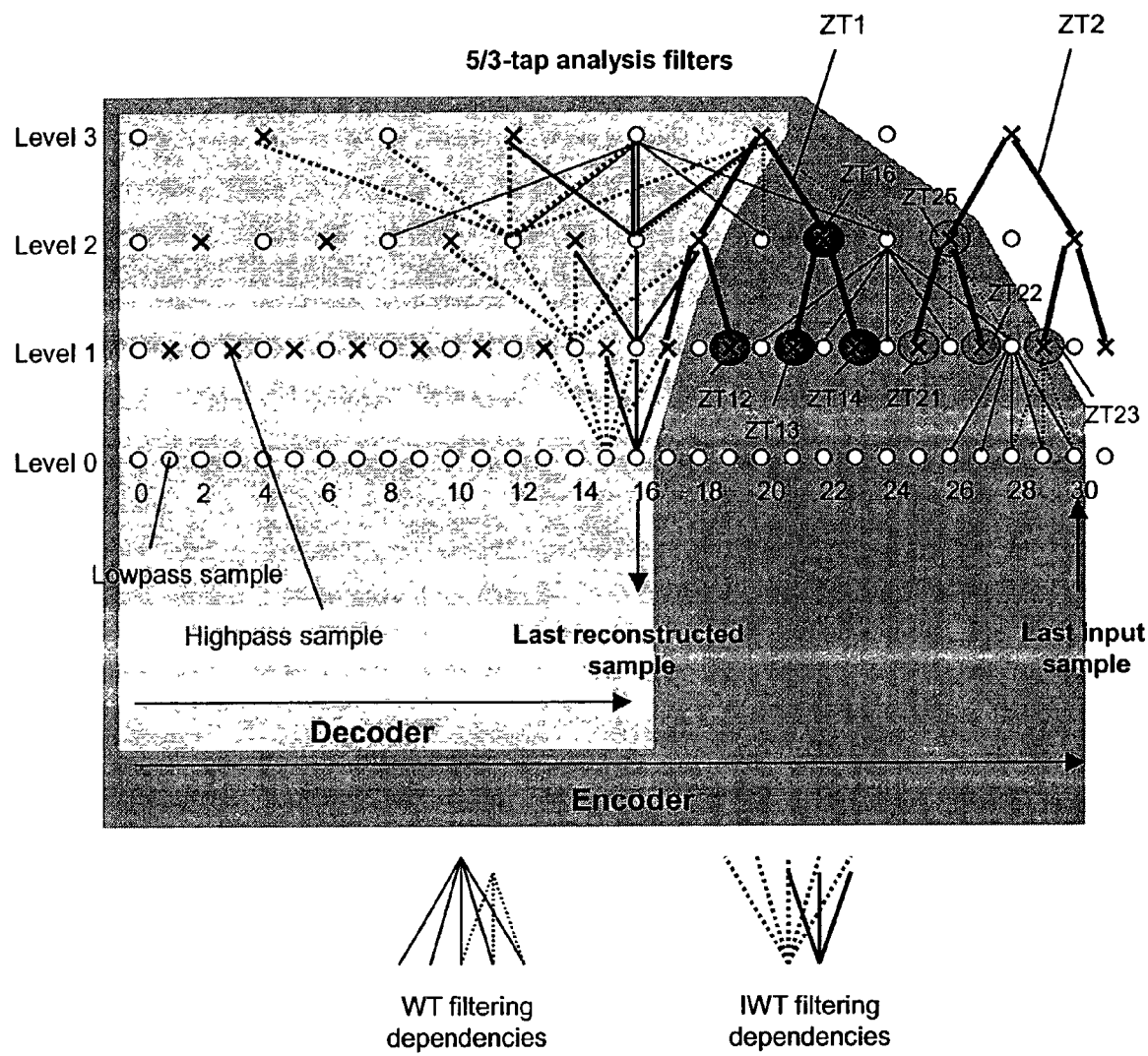
FIG. 31 is an illustration of data dependencies in a 1D wavelet based encoder-decoder transmission scheme.

FIG. 31 gives a glimpse about the intrinsic reasons of the existence of the CACLA for the example of a zero-tree based wavelet coding system, using 5/3-tap analysis wavelet filter pairs. The methods in accordance with the present invention can be transposed to other wavelet-based coding schemes like JPEG2000, and even to other image processing application systems.

In FIG. 31, all input samples up to sample 30 are wavelet transformed into different levels by successive Lowpass and Highpass filtering operations. Highpass samples and the highest (level 3) Lowpass samples are collected into so-called parent-children trees for starting the Entropy Coder engine, which itself uses the concept of zero-tree coding. Two parent-children (zero-) trees are shown in FIG. 31: ZT1 and ZT2. During the WT processing throughout the levels and starting from sample 30, parent-children tree ZT1 is fully erected, while from parent-children tree ZT2 only the samples ZT21, ZT22, ZT23 and ZT25 are created. These samples should thus be kept in memory since they cannot readily be consumed by the Entropy Coder. In 2D, this memory would correspond to the CACLA of FIG. 30(b). All other parent-children tree samples, e.g. those of ZT1, are Entropy Coded and transmitted to the decoder. They are then Entropy Decoded, before starting the Inverse Wavelet Transform along the data dependencies shown in FIG. 31. Observe that the data can only be reconstructed by the decoder up to sample 16, because of delays emanating from the data dependencies throughout the WT and IWT. As a consequence, only some samples of ZT1 are used in the IWT. All others (ZT12, ZT13, ZT14 and ZT16) cannot directly be used in the decoding process and should therefore be stored in memory. In 2D, this would correspond to the CACLA of FIG. 30(d) (for one wavelet level).

Note that the CACLAs of FIG. 30 are the 2D equivalents of only one level of the 1D wavelet representation of FIG. 31.

Figure 32:
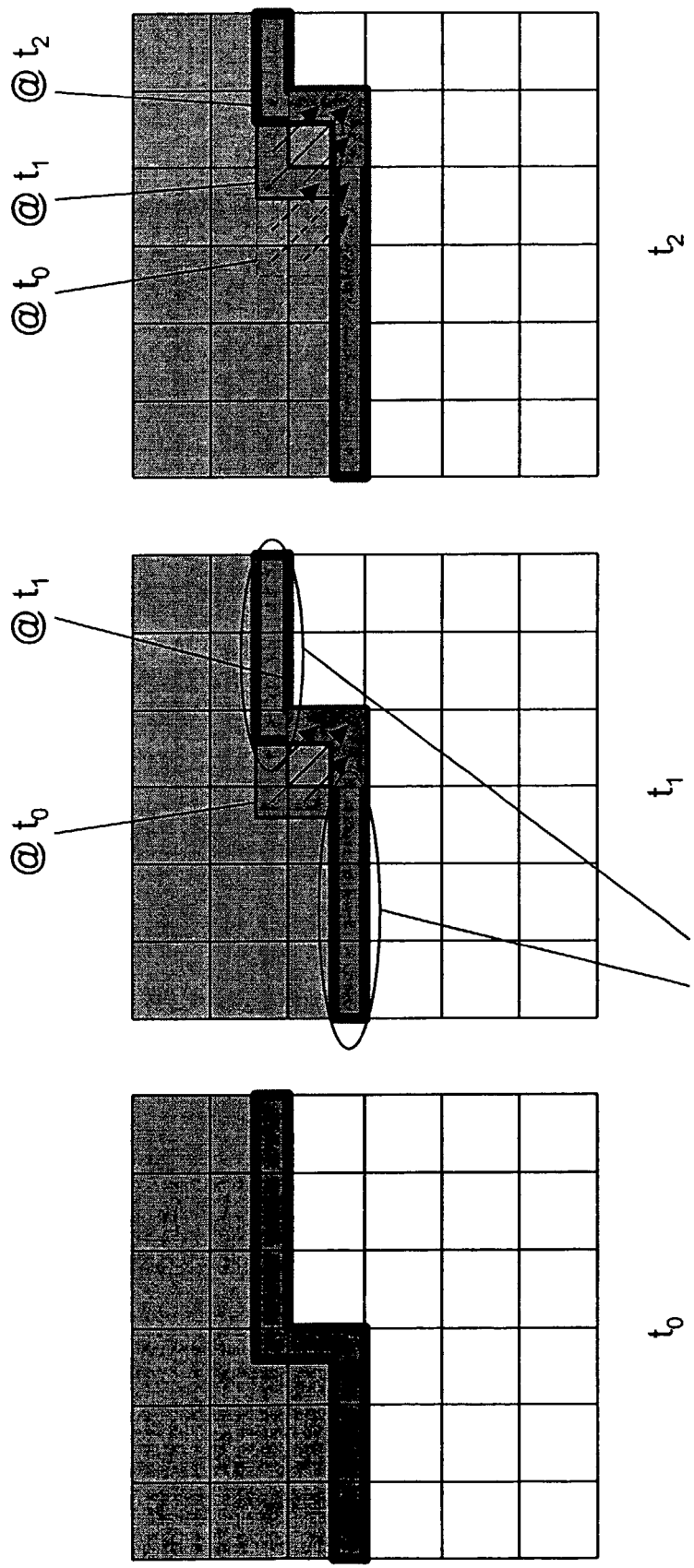
FIG. 32 is an illustration of CACLA movements in time (t0->t2) according to one embodiment of the invention.

During the processing of the image, the CACLA memories are moving around, as illustrated in FIG. 32. As a consequence, special memory management systems are preferred for guaranteeing that with a limited size physical memory, the data is correctly stored without overwriting data that should not be overwritten: see FIG. 32. The decoder processes also involve 2D delay line processing as described above.

Figure 33:
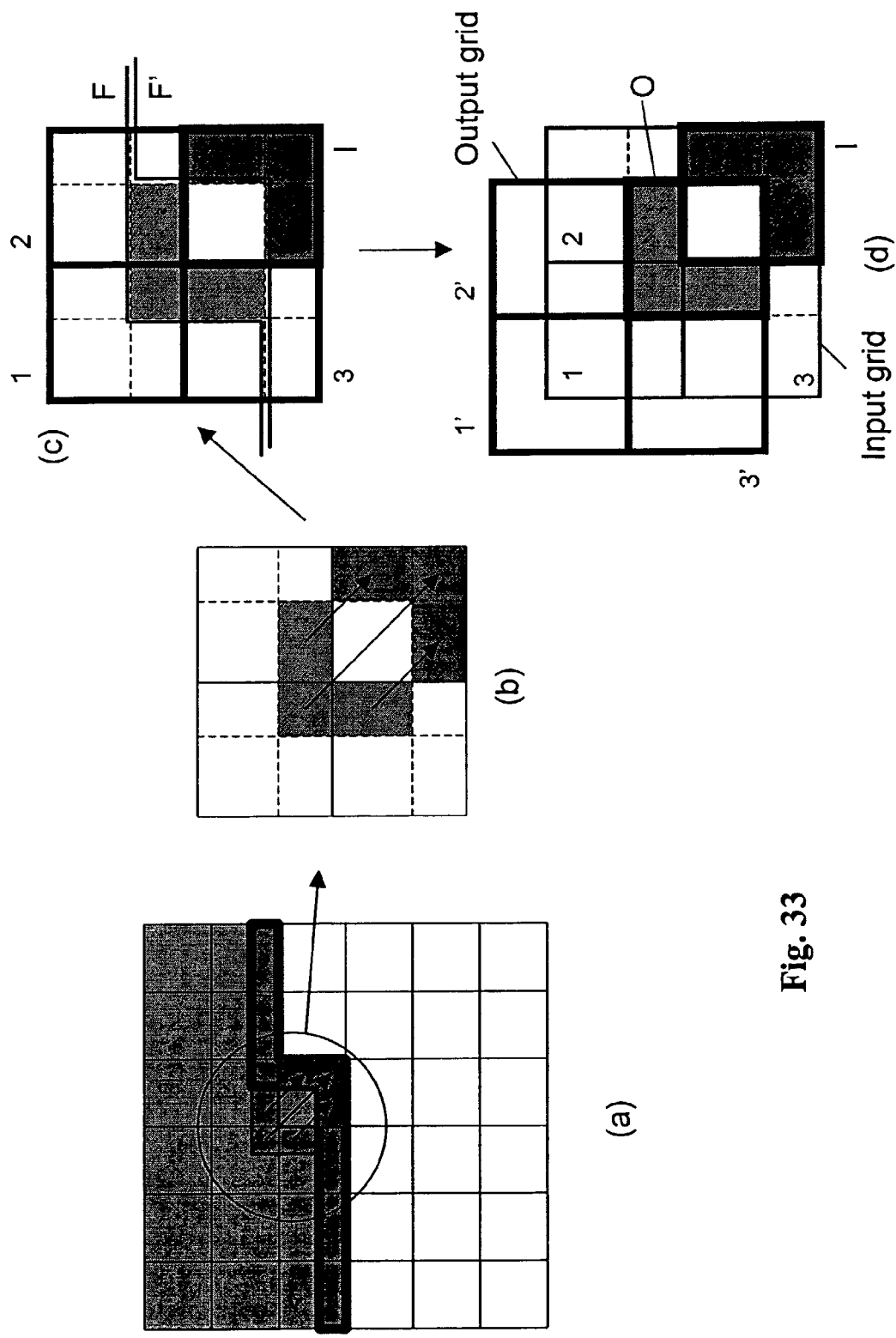
FIG. 33 is an illustration of allocated memory area movements in relation to input-output grid realignment according to one embodiment of the invention.

An embodiment of a decoder processing of FIG. 30(d) will now be described where only a portion of the Entropy Decoded data blocks is actually involved in the filtering processing of the IWT. Focusing on the region of interest, a possible movement of the CACLA memory is shown (for one level) in FIG. 33(b). Before the movement of the CACLA memory, the filtering of the IWT can be performed up to the front F of FIG. 33(c). After having Entropy Decoded an additional data block (I in FIG. 33(c)), the IWT filtering process can be continued up to the front line F'. As shown in FIG. 33(d), the front lines F and F' delimit an IWT filtered block O, that in this example is partially overlapping block I. In general however, this overlapping feature is not strictly necessary. The important phenomenon however is that the block O is aligned along an Output grid (1', 2', 3', . . . ) that is not aligned with the Input grid around block I. As a consequence, the process of fully entropy decoding data blocks, but only partially using their data for subsequent IWT filtering, inevitably creates misaligned grids in a similar fashion as what has been explained above for encoding. The data block subdivision and re-clustering through a memory management system, is applicable for the decoding stage described in FIG. 30(d) and FIG. 33. The memory movement suggested by the arrows in FIGS. 33(a) and (b) merely indicate how the allocated memory area moves, it does not necessarily relate to memory addressing for the 2D-delay line of the present invention.

It is an aspect of the invention to present a 2D FIFO memory, being memory-efficient (hence at a minimal memory (access and size) cost) in image block decoding applications. With a 2D FIFO is meant a device and associated scheduling mechanism used in said device for enabling storing and retrieving a block-by-block coded input signal such as a coded image (e.g. a JPEG, JPEG2000, MPEG-4 or similar image) in an arbitrary number of lines and columns, in such a way that the decoded output image is still produced in a block-by-block schedule.

The skilled person will appreciate from the above that an aspect of the invention is the use of such a 2D tailored FIFO memory schedule mechanism for achieving the realignment process during decoding at reduced or minimal memory (access and size) cost. The process is functionally identical to delaying the rows and columns of the input coded image along a set of horizontal and vertical FIFOs except that the pixels remain clustered in blocks rather than lines.

Figure 44:
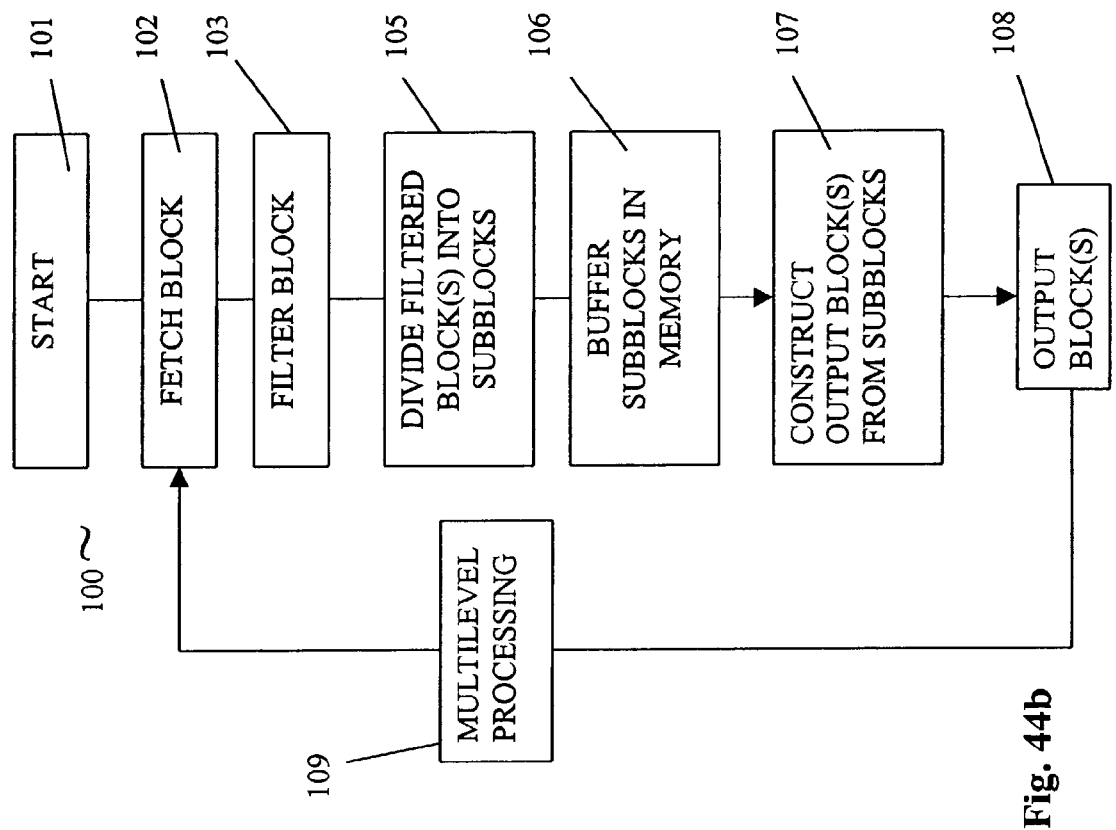
FIG. 44 is a flow diagram of one embodiment of a method of steady state processing of blocks.
Figure 44:
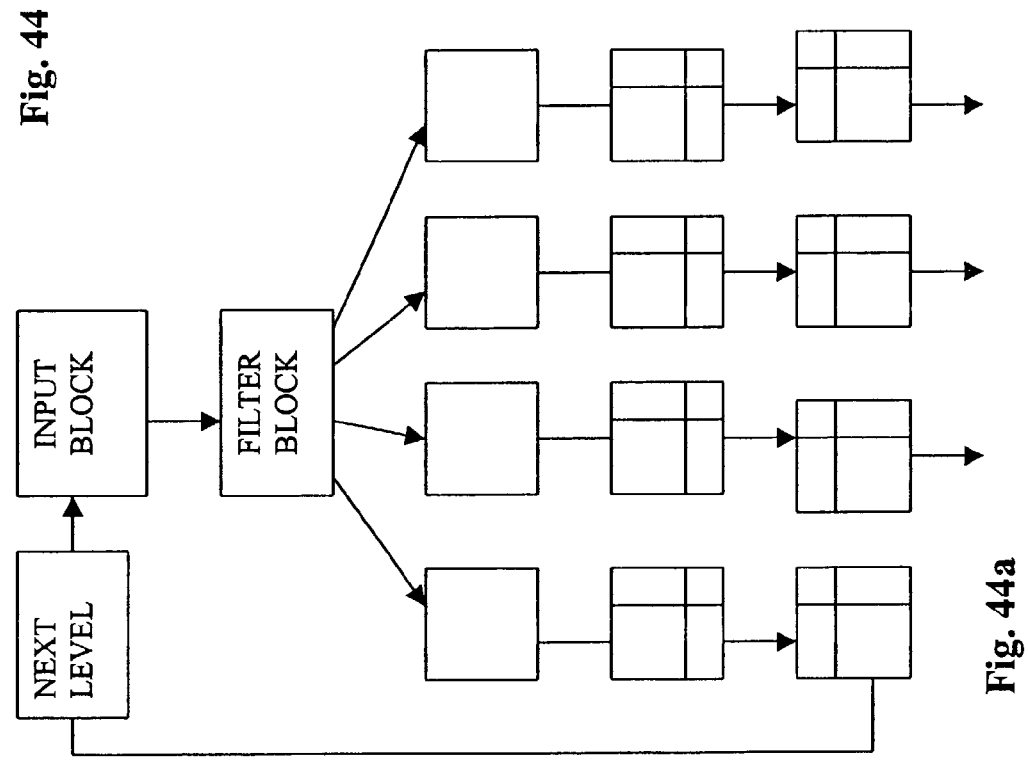

The process is shown for encoding only schematically in FIGS. 44 and 45. FIG. 44 shows the steady state process 100. FIG. 44a is a schematic representation of the output of subroutine 100 of FIG. 44b. In step 102 the next block is fetched. This block is filtered in step 103. Typically this will result in several different subband images as shown in FIG. 44a. In step 105, the filtered blocks are divided into subblocks and buffered in step 106. In step 107 the output blocks are constructed and output in step 108. If the coding transform used is multilevel, one of the output blocks will be returned as an input block in step 109 and the same process repeated for each level.

FIG. 45 shows a process 200 which can be used on initial blocks of an image. FIG. 45a is a schematic representation of the output of the subroutine 200 of FIG. 45b. In step 202 the next block is fetched. Dummy data is added to this block in step 203. This block is filtered in step 104. In step 205, the filtered blocks are divided into subblocks and buffered in step 206. In step 207 the output blocks are constructed and output in step 208. If the coding transform used is multilevel, one of the output blocks will be returned as an input block and the same process repeated for each level.

Figure 46:
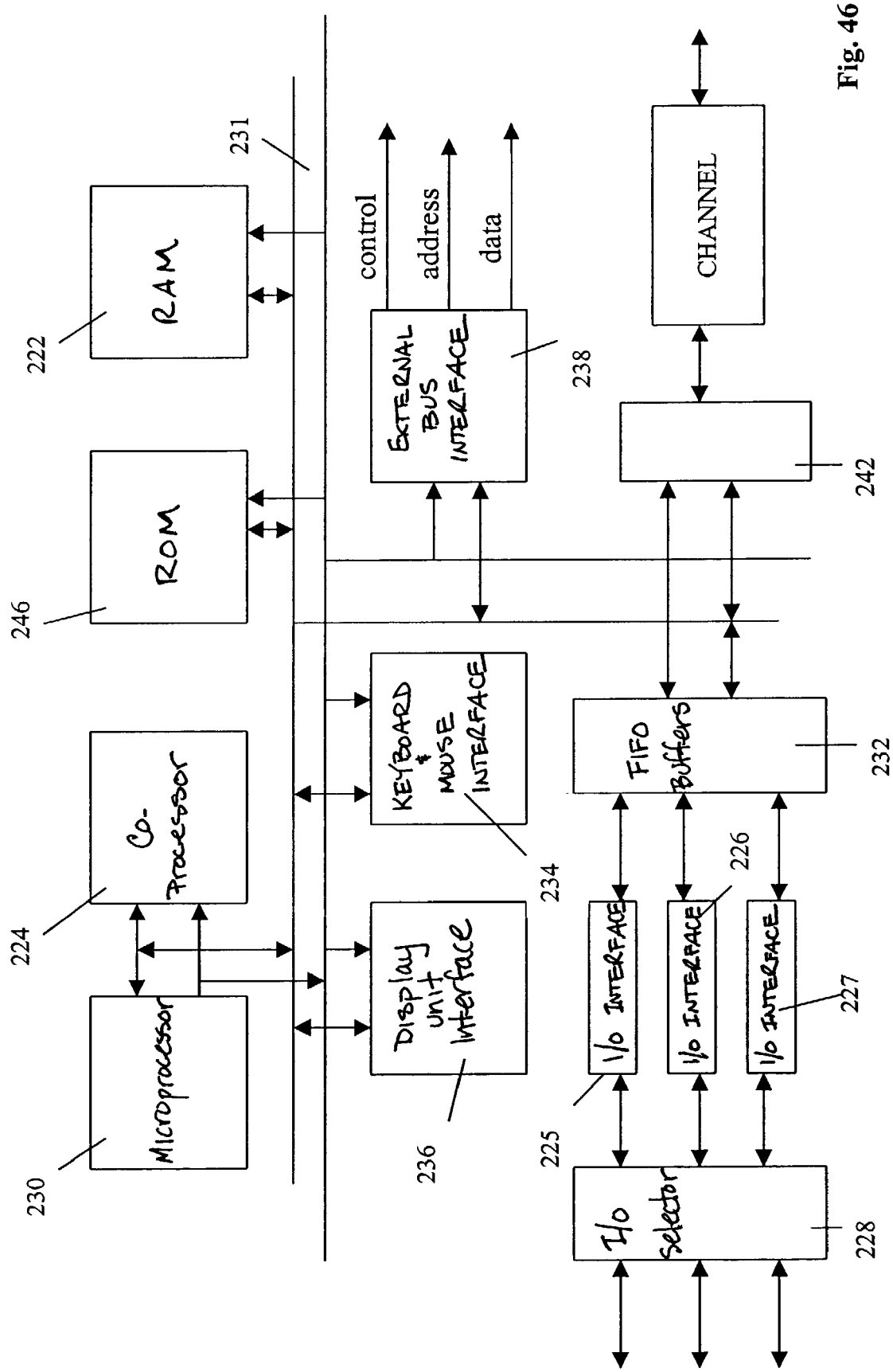
FIG. 46 is a block diagram of one embodiment of a coding/encoding circuit.

FIG. 46 shows the implementation of a coder/decoder which can be used with the present invention implemented using a microprocessor 230 such as a Pentium IV from Intel Corp. USA, e.g. in a Personal Computer. The microprocessor 230 may have an optional element such as a co-processor 224, e.g. for arithmetic operations or microprocessor 230–224 may be a bit-sliced processor. A RAM memory 222 may be provided, e.g. DRAM. Various I/O (input/output) interfaces 225, 226, 227 may be provided, e.g. UART, USB, I²C bus interface as well as an I/O selector 228. FIFO buffers 232 may be used to decouple the processor 230 from data transfer through these interfaces. A keyboard and mouse interface 234 will usually be provided as well as a visual display unit interface 236. Access to an external memory such as a disk drive may be provided via an external bus interface 238 with address, data and control busses. The various blocks of the circuit are linked by suitable busses 231. The interface to the channel is provided by block 242 which can handle the encoded images as well as transmitting to and receiving from the channel. Encoded data received by block 242 is passed to the processor 230 for processing.

Alternatively, this circuit may be constructed as a VLSI chip around an embedded microprocessor 230 such as an ARM7TDMI core designed by ARM Ltd., UK which may be synthesized onto a single chip with the other components shown. A zero wait state SRAM memory 222 may be provided on-chip as well as an optional cache memory 224. Various I/O (input/output) interfaces 225, 226, 227 may be provided, e.g. UART, USB, I²C bus interface as well as an I/O selector 228. FIFO buffers 232 may be used to decouple the processor 230 from data transfer through these interfaces. A counter/timer block 234 may be provided as well as an interrupt controller 236. Access to an external memory may be provided an external bus interface 238 with address, data and control busses. The various blocks of the circuit are linked by suitable busses 231. The interface to the channel is provided by block 242 which can handle the encoded images as well as transmitting to and receiving from the channel. Encoded data received by block 242 is passed to the processor 230 for processing.

Software programs may be stored in an internal ROM (read only memory) 246. Software programs for carrying out coding and/or encoding in accordance with any of the methods of the present invention may also be stored on the system in executable form. In particular software programs may be provided for digital filters according to embodiments of the present invention described above to be applied to blocks of data to generate one or more transforms such as the LWT. That is the software, for executing on the processor has code for carrying out the function of coding an input signal or decoding an input coded signal, the input signal or the input coded signal being in the form of a plurality of blocks in rows and columns, coding of the input signal or decoding of the input coded signal including filtering each block to form an output block, the code having means for receiving blocks derived from the input signal as input blocks, filtering each input block, splitting each filtered input block into a number of subblocks to form a plurality of subblocks, means for storing in a buffer at least some of the plurality of subblocks in a memory, and means for constructing an output block from a number of selected subblocks which is the same number as the number of subblocks in which a filtered input block is split. The software code when executed may derive the selected subblocks from at least two filtered input blocks. The software code when executed provides a buffering time for the selected subblocks in the memory which is the time for reading in a non-integer number of input blocks, in other words, reading in an integer number of whole input blocks and partial input blocks, and for reading in an integer number of subblocks. The buffering time for the selected subblocks in the memory is preferably the minimum time for the construction of the output block.

The method according to any previous claims wherein the subblocks to be selected for an output block are stored at memory addresses of the memory so that they can be read out sequentially to form the output block. The software code when executed immediately stores further subblocks split from filtered input blocks when memory locations are freed by the selection of subblocks for an output block. With the software code when executed, the subblocks split from filtered input blocks have a predetermined geometrical position with respect to the filtered input blocks and the output block is constructed from subblocks so that the subblocks have a different geometrical position in the output block. The software code may also have means for adding dummy data to the input blocks to form enhanced input blocks, splitting each enhanced input block into a number of subblocks to form a plurality of subblocks, buffering at least some of the plurality of subblocks in a memory, and constructing an output block from a number of selected buffered subblocks which is the same number as the number of subblocks into which a filtered input block is split.

The methods described above may be written as computer programs in a suitable computer language such as C and then compiled for the specific processor in the design. For example, for the embedded ARM core VLSI described above the software may be written in C and then compiled using the ARM C compiler and the ARM assembler. Reference is made to "ARM System-on-chip", S. Furber, Addison-Wiley, 2000. The present invention also includes a data carrier on which is stored executable code segments, which when executed on a processor such as 230 will execute any of the methods of the present invention, in particular will execute digital filtering according to embodiments of the present invention described above to be applied to images. The data carrier may be any suitable data carrier such as diskettes ("floppy disks"), optical storage media such as CD-ROMs, DVD ROM's, tape drives, hard drives, etc. which are computer readable.

Figure 47:
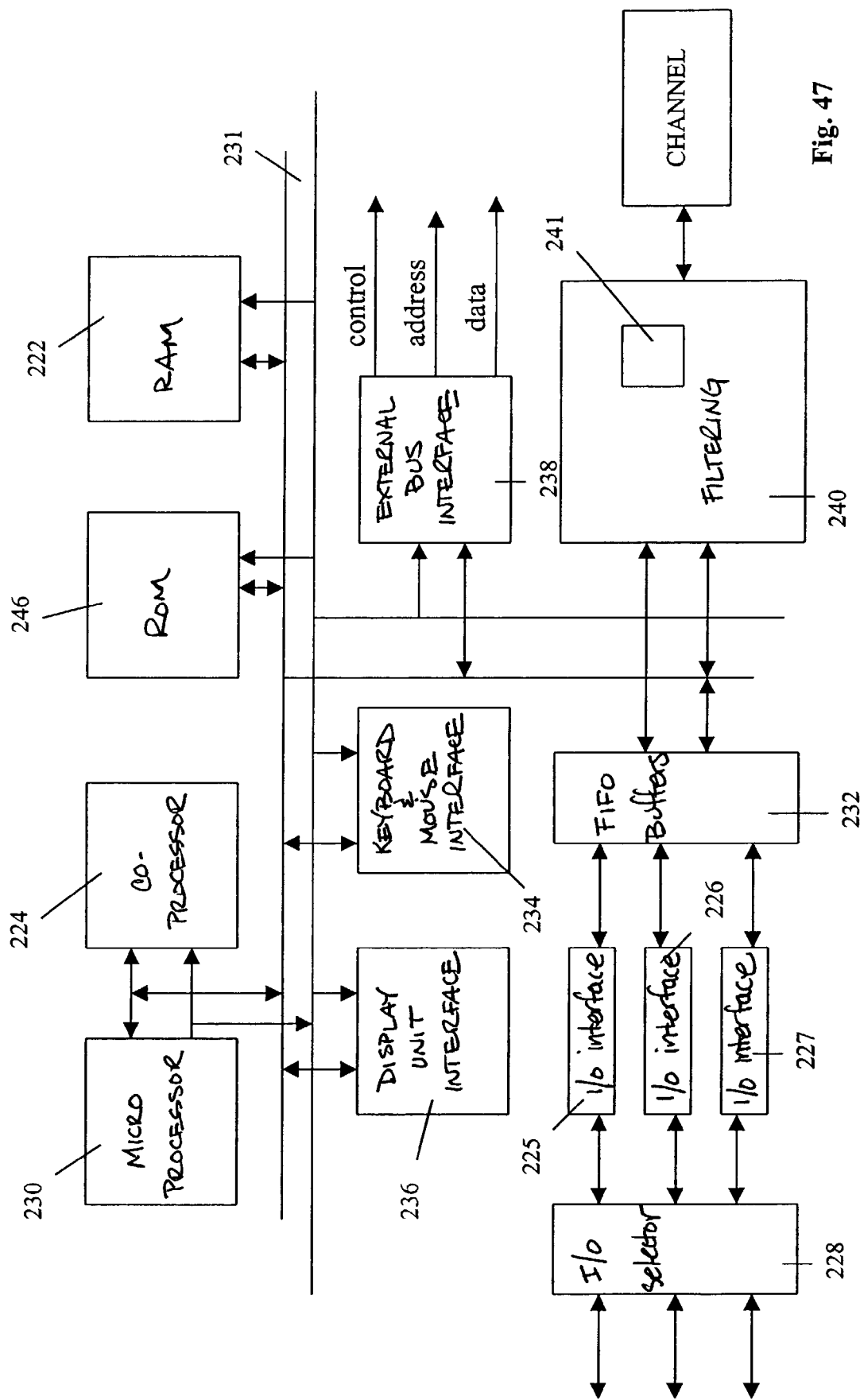
FIG. 47 is a block diagram of another embodiment of a coding/encoding circuit.

FIG. 47 shows the implementation of a coder/decoder which can be used with the present invention implemented using an dedicated filter module. Reference numbers in FIG. 47 which are the same as the reference numbers in FIG. 46 refer to the same components—both in the microprocessor and the embedded core embodiments.

Only the major differences in FIG. 47 will be described with respect to FIG. 46. Instead of the microprocessor 230 carrying out methods according to the present invention this work is now taken over by a filtering module 240. Module 240 may be constructed as an accelerator card for insertion in a personal computer. The module 240 has means for carrying out digital filtering according to embodiments of the present invention described above. These filters may be implemented as a separate filter module 241, e.g. an ASIC (Application Specific Integrated Circuit) or an FPGA (Field Programmable Gate Array) having means for digital filtering according to embodiments of the present invention.

Similarly, if an embedded core is used such as an ARM processor core or an FPGA, a module 240 may be used which may be constructed as a separate module in a multi-chip module (MCM), for example or combined with the other elements of the circuit on a VLSI. The module 240 has means for carrying out digital filtering according to embodiments of the present invention. As above, these filters may be implemented as a separate filter module 241, e.g. an ASIC (Application Specific Integrated Circuit) or an FPGA (Field Programmable Gate Array) having means for digital filtering according to embodiments of the present invention described above.

Figure 23:
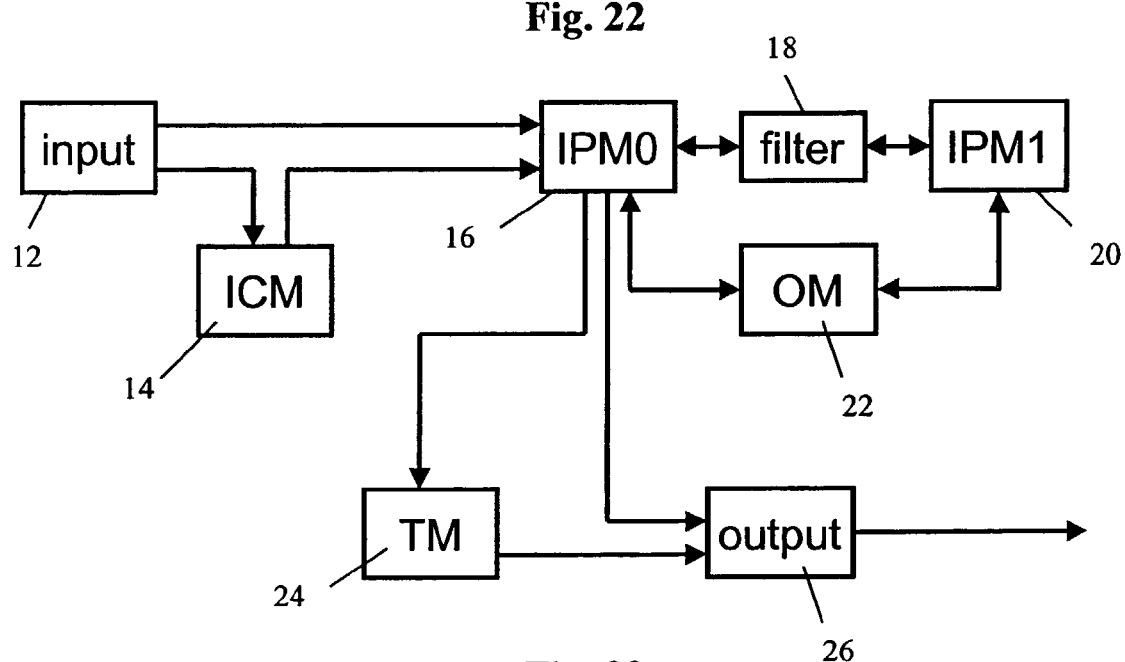
FIG. 23 is a block diagram of one embodiment of a hierarchical memory architecture.

Module 240 may include the memory arrangement of FIG. 23 and the controller of FIG. 24 for controlling the memories.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. The scope of the invention is indicated by the appended claims rather than by the foregoing description. All changes which come within the meaning and range of equivalency of the claims are to be embraced within their scope.

REFERENCES

[1] G. Lafruit, L. Nachtergaele, J. Bormans, M. Engels, I. Bolsens, "*Optimal Memory Organization for scalable texture codecs in MPEG-4*" IEEE trans. on Circuits & Systems for Video technology Vol. 9, No. 2, March 1999, pp. 218–243.

[2] G. Lafruit, L. Nachtergaele, B. Vanhoof, F. Catthoor, "*The Local Wavelet Transform: a memory-efficient, high-speed architecture optimized to a Region-Oriented Zero-Tree Coder*", Integrated Computer-Aided Engineering Vol. 7, No. 2, pp. 89–103, March 2000.

[3] W. Sweldens, "*The Lifting Scheme: A New Philosophy in Biorthogonal Wavelet Constructions*", Proceedings of the SPIE Vol. 2569, 1995, pp. 68–79.

[4] Vishwanath M., et al., "*VLSI Architectures for the Discrete Wavelet transform*", IEEE trans. on Circuits and Systems-II, Vol. 42, No. 5, May 1995, pp. 305–316.

[5] D. TaubMan, "*High Performance Scalable Image Compression with EBCOT*", IEEE trans. on Image Processing, Vol. 9, No. 7, July 2000, pp. 1158–1170.

[6] http://www.alpha-data.co.uk/dsheet/adm-xrc.html

[7] M. Nibouche, et al., "*Design and FPGA implementation of biorthogonal discrete wavelet transforms*", EUROCON'2001, pp103–106.

[8] M. Nibouche, et al., "*Rapid prototyping of orthonormal wavelet transforms on FPGA's*", proc. of the ISCAS 2001, pp. 577–580.

[9] M. Nibouche, et al., "*Design and FPGA implementation of orthonormal discrete wavelet transforms*", proc. of the ICECS 2000, pp. 312–315.

[10] Ming-Hwa Sheu, et al., "*A VLSI architecture design with lower hardware cost and less memory for separable 2-D discrete wavelet transform*", proc. of the ISCAS 1998, pp. 457–460.

[11] Si Juang Chang, et al., "*A high speed VLSI architecture of discrete wavelet transform for MPEG-4*", IEEE trans. On consumer electronics, Vol. 43 No 3, August 1997, pp. 623∝627.

[12] G. Knowles, "*VLSI architecture for the discrete wavelet transform*", Electronics-Letters. vol.26, no.15; Jul. 19, 1990; p.1184–5.

[13] R. Y. Omaki, et al., "*Realtime wavelet video coder based on reduced memory accessing*", proc. of the ASP-DAC 2001, pp. 15–16.

[14] C. Chrysafis, et al., "*Line-based, reduced memory, wavelet image compression*", IEEE trans. On Image Processing, Vol. 9, No 3, March 2000, pp. 378–389.

[15] T. Simon, et al. "*An ultra low-power adaptive wavelet video encoder with integrated memory*", IEEE JSSC, Vol. 35 No 4, April 2000, pp. 572–582.

[16] J. Singh, et al., "*A distributed memory and control architecture for 2D discrete wavelet transform*", proc. of the ISCAS 1999, pp. 387–390.

[17] Chung-Jr Lian, et al., "*Lifting Based Discrete Wavelet Transform Architecture for JPEG2000*", IEEE International symposium on Circuits and Systems, 2001, pp. 445–448.

[18] G. Lafruit, et al., "*Optimal Memory Organization for scalable texture codecs in MPEG-4*" IEEE transactions on Circuits & Systems for Video technology Vol. 9, No. 2, pp. 218–243, March 1999.

[19] G. Lafruit, et al., "*The Local Wavelet Transform: a memory-efficient, high-speed architecture optimized to a Region-Oriented Zero-Tree Coder*", Integrated Computer-Aided Engineering Vol. 7, No. 2, pp. 89–103, March 2000.

[20] Y. Andreopoulos, et al., "*A wavelet-tree image coding system with efficient memory utilization*", proceeding of ICASSP 2001, pp. 1709–1712.

[21] Y. Andreopoulos, et al., "*A Local Wavelet Transform implementation versus an optimal Row-Column algorithm for the 2D multilevel decomposition*", accepted for ICIP-2001.

[22] Y. Andreopoulos, et al., "*Analysis of Wavelet Transform Implementations For Image and Texture Coding Applications in Programmable Platforms*", accepted for SiPS 2001, to appear in September.

[23] J. M. Shapiro, "Embedded Image Coding using Zerotrees of Wavelet Coefficients," *IEEE Transactions on Signal Processing*, Vol. 41, No. 12, pp. 3445–3462, December 1993.

[24] Yiliang Bao, C.-C. Jay Kuo, "Design of Wavelet-Based Image Codec in Memory-Constrained Environment," *IEEE Transactions on Circuits and Systems for Video Technology*, Vol. 11, No. 5, pp. 642–650, May 2001.

What is claimed is:

1. A method of coding an input signal or decoding an input coded signal, wherein the input signal or the input coded signal is in the form of a plurality of blocks arranged in rows and columns, and wherein coding of the input signal or decoding of the input coded signal includes filtering each of the plurality of block to form an output block, the method comprising:

receiving the blocks from the input signal as a plurality of input blocks;

filtering each input block to generate a plurality of filtered input blocks;

splitting each of the filtered input blocks into a number of subblocks to form a plurality of subblocks;

buffering at least some of the plurality of subblocks in a memory; and constructing an output block from a number of selected subblocks, wherein the number of selected subblocks is the same number as the number of subblocks into which one of the filtered input blocks is split, wherein the subblocks to be selected for the output block are stored at memory addresses of the memory such that they can be sequentially read out of the memory to form the output block, wherein the selected subblocks are derived from at least two of the filtered input blocks.

2. A method of coding an input signal or decoding an input coded signal, wherein the input signal or the input coded signal is in the form of a plurality of blocks arranged in rows and columns, and wherein coding of the input signal or decoding of the input coded signal includes filtering each of the plurality of block to form an output block, the method comprising:

receiving the blocks from the input signal as a plurality of input blocks;

filtering each input block to generate a plurality of filtered input blocks;

splitting each of the filtered input blocks into a number of subblocks to form a plurality of subblocks;

buffering at least some of the plurality of subblocks in a memory; and constructing an output block from a number of selected subblocks, wherein the number of selected subblocks is the same number as the number of subblocks into which one of the filtered input blocks is split, wherein the subblocks to be selected for the output block are stored at memory addresses of the memory such that they can be sequentially read out of the memory to form the output block, wherein a buffering time for the selected subblocks in the memory is the time for reading in an integer number of whole input blocks and partial input blocks and for generating an integer number of the subblocks.

3. The method of claim 2, wherein a buffering time for the selected subblocks in the memory is the minimum time for the construction of the output block.

4. A method of coding an input signal or decoding an input coded signal, wherein the input signal or the input coded signal is in the form of a plurality of blocks arranged in rows and columns, and wherein coding of the input signal or decoding of the input coded signal includes filtering each of the plurality of block to form an output block, the method comprising:

receiving the blocks from the input signal as a plurality of input blocks;

filtering each input block to generate a plurality of filtered input blocks; splitting each of the filtered input blocks into a number of subblocks to form a plurality of subblocks;

buffering at least some of the plurality of subblocks in a memory; and constructing an output block from a number of selected subblocks, wherein the number of selected subblocks is the same number as the number of subblocks into which one of the filtered input blocks is split, wherein a plurality of memory locations freed by the selection of subblocks for the output block immediately store additional subblocks split from the filtered input blocks.

5. A method of coding an input signal or decoding an input coded signal, wherein the input signal or the input coded signal is in the form of a plurality of blocks arranged in rows and columns, and wherein coding of the input signal or decoding of the input coded signal includes filtering each of the plurality of block to form an output block, the method comprising:

receiving the blocks from the input signal as a plurality of input blocks;

filtering each input block to generate a plurality of filtered input blocks;

splitting each of the filtered input blocks into a number of subblocks to form a plurality of subblocks;

buffering at least some of the plurality of subblocks in a memory; and constructing an output block from a number of selected subblocks, wherein the number of selected subblocks is the same number as the number of subblocks into which one of the filtered input blocks is split, wherein the filtering comprises sliding window filtering, and wherein the size of the window is larger than one of the blocks.

6. A method of coding an input signal or decoding an input coded signal, wherein the input signal or the input coded signal is in the form of a plurality of blocks arranged in rows and columns, and wherein coding of the input signal or decoding of the input coded signal includes filtering each of the plurality of block to form an output block, the method comprising:

receiving the blocks from the input signal as a plurality of input blocks;

filtering each input block to generate a plurality of filtered input blocks;

splitting each of the filtered input blocks into a number of subblocks to form a plurality of subblocks;

buffering at least some of the plurality of subblocks in a memory; and constructing an output block from a number of selected subblocks, wherein the number of selected subblocks is the same number as the number of subblocks into which one of the filtered input blocks is split, wherein the subblocks to be selected for the output block are stored at memory addresses of the memory such that they can be sequentially read out of the memory to form the output block, wherein the filtering is part of a wavelet transform.

7. A method of coding an input signal or decoding an input coded signal, wherein the input signal or the input coded signal is in the form of a plurality of blocks arranged in rows and columns, and wherein coding of the input signal or decoding of the input coded signal includes filtering each of the plurality of block to form an output block, the method comprising:

receiving the blocks from the input signal as a plurality of input blocks;

filtering each input block to generate a plurality of filtered input blocks;

splitting each of the filtered input blocks into a number of subblocks to form a plurality of subblocks;

buffering at least some of the plurality of subblocks in a memory; and constructing an output block from a number of selected subblocks, wherein the number of selected subblocks is the same number as the number of subblocks into which one of the filtered input blocks is split, wherein the subblocks to be selected for the output block are stored at memory addresses of the memory such that they can be sequentially read out of the memory to form the output block, wherein the subblocks split from filtered input blocks have a predetermined geometrical position with respect to the filtered input blocks, and wherein the output block is constructed from the subblocks such that the subblocks have a different geometrical position in the output block.

8. A method of coding an input signal or decoding an input coded signal, wherein the input signal or the input coded signal is in the form of a plurality of blocks arranged in rows and columns, and wherein coding of the input signal or decoding of the input coded signal includes filtering each of the plurality of block to form an output block, the method comprising:

receiving the blocks from the input signal as a plurality of input blocks;

filtering each input block to generate a plurality of filtered input blocks;

splitting each of the filtered input blocks into a number of subblocks to form a plurality of subblocks;

buffering at least some of the plurality of subblocks in a memory; and constructing an output block from a number of selected subblocks, wherein the number of selected subblocks is the same number as the number of subblocks into which one of the filtered input blocks is split, wherein receiving the blocks from the input signal includes adding dummy data to the blocks of the input signal to form the input blocks.

9. A method of coding an input signal or decoding an input coded signal, wherein the input signal or the input coded signal is in the form of a plurality of blocks arranged in rows and columns, and wherein coding of the input signal or decoding of the input coded signal includes filtering each of the plurality of block to form an output block, the method comprising:

receiving the blocks from the input signal as a plurality of input blocks;

filtering each input block to generate a plurality of filtered input blocks;

splitting each of the filtered input blocks into a number of subblocks to form a plurality of subblocks;

buffering at least some of the plurality of subblocks in a memory;

constructing an output block from a number of selected subblocks, wherein the number of selected subblocks is the same number as the number of subblocks into which one of the filtered input blocks is split, wherein the filtering is part of a multi-level transform, wherein constructing the output block is repeated on the plurality of filtered input blocks to generate a plurality of first output bocks;

inputting the first output blocks as a first input block;

filtering the first input block to generate a plurality of first filtered input blocks;

splitting each of the first filtered input blocks into a number of subblocks to form a first plurality of subblocks;

buffering at least some of the first plurality of subblocks in a memory; and constructing a second output block from a number of selected subblocks of the first plurality of subblocks, wherein the number of selected subblocks is the same number as the number of subblocks into which one of the filtered input blocks is split.

10. A coder configured to code an input signal or decode an input coded signal, wherein the input signal or the input coded signal is in the form of a plurality of blocks, wherein coding of the input signal or decoding of the input coded signal includes performing a transform on each of the blocks to form an output block, the coder comprising:

means for receiving the plurality of blocks from the input signal as input blocks;

a filter configured to filter each input block so as to provide a filtered input block;

means for splitting each filtered input block into a number of subblocks to form a plurality of subblocks;

a memory configured to buffer at least some of the plurality of subblocks in a memory; and means for constructing an output block from a number of selected subblocks, wherein the number of selected subblocks is the same number as the number of subblocks into which one of the filtered input blocks is split, wherein the filter is adapted for a sliding window filter, and wherein the size of the window is larger than the size of one of the blocks.

11. The coder of claim 10, wherein the means for constructing the output block includes means for deriving the selected subblocks from at least two of the filtered input blocks.

12. The coder of claim 10, further comprising a memory controller configured to control a buffering time for the selected subblocks in the memory, wherein the buffering time is the same as the time for reading an integer number of whole input blocks and partial input blocks and for generating an integer number of the subblocks.

13. The coder of claim 12, wherein the memory controller controls a buffering time for the selected subblocks in memory such that the buffering time is the minimum time for the construction of the output block.

14. The coder of claim 12, wherein the memory controller is configured to control the storage of the subblocks to be selected for the output block at memory addresses of the memory such that the subblocks can be sequentially read out from the memory to form the output block.

15. The coder of claim 12, wherein the memory controller immediately stores additional subblocks split from the filtered input blocks when memory locations are freed by the selection of subblocks for the output block.

16. The coder of claim 10, wherein the means for splitting is configured to split the subblocks from the filtered input blocks so that the subblocks have a predetermined geometrical position with respect to the filtered input blocks, and wherein the means for constructing is configured to construct the output block from the subblocks so that the subblocks have a different geometrical position in the output block.

17. A coder configured to code an input signal or decode an input coded signal, wherein the input signal or the input coded signal is in the form of a plurality of blocks, wherein coding of the input signal or decoding of the input coded signal includes performing a transform on each of the blocks to form an output block, the coder comprising:
- means for receiving the plurality of blocks from the input signal as input blocks;
- a filter configured to filter each input block so as to provide a filtered input block;
- means for splitting each filtered input block into a number of subblocks to form a plurality of subblocks;
- a memory configured to buffer at least some of the plurality of subblocks in a memory;
- means for constructing an output block from a number of selected subblocks, wherein the number of selected subblocks is the same number as the number of subblocks into which one of the filtered input blocks is split; and
- means for adding dummy data to the blocks of the input signal to form the input blocks.

* * * * *